Nov. 16, 1965 E. V. HEITLINGER 3,217,984
SECTIONALIZED, SOLENOID-ACTUATED CALCULATING MACHINES
Filed April 28, 1960 21 Sheets-Sheet 1

INVENTOR.
Eugene V. Heitlinger
BY Horton Davis,
Brewer & Brugman
Attorneys

Nov. 16, 1965     E. V. HEITLINGER     3,217,984
SECTIONALIZED, SOLENOID-ACTUATED CALCULATING MACHINES
Filed April 28, 1960     21 Sheets-Sheet 3
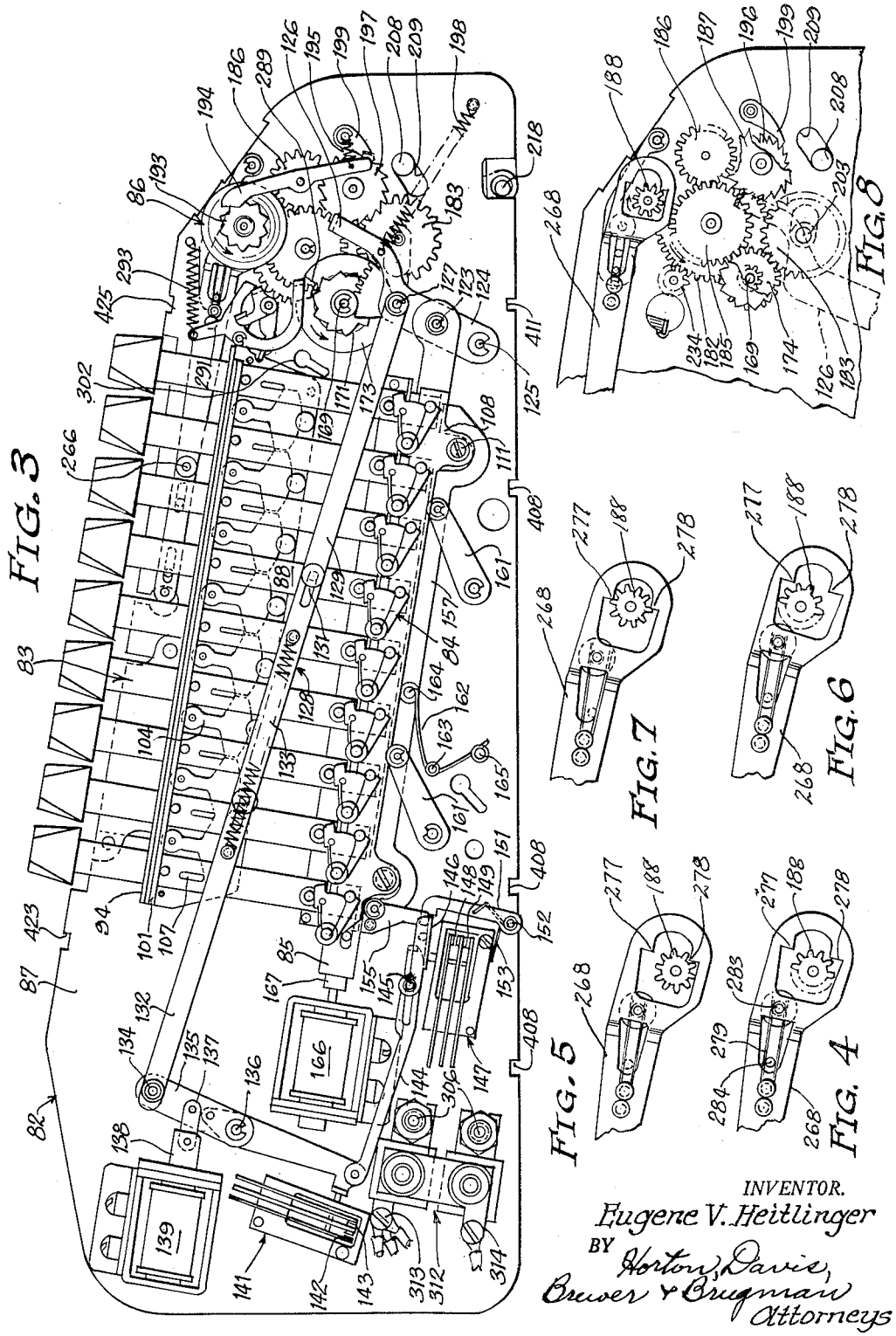
INVENTOR.
Eugene V. Heitlinger
BY Horton, Davis,
Brewer & Brugman
Attorneys

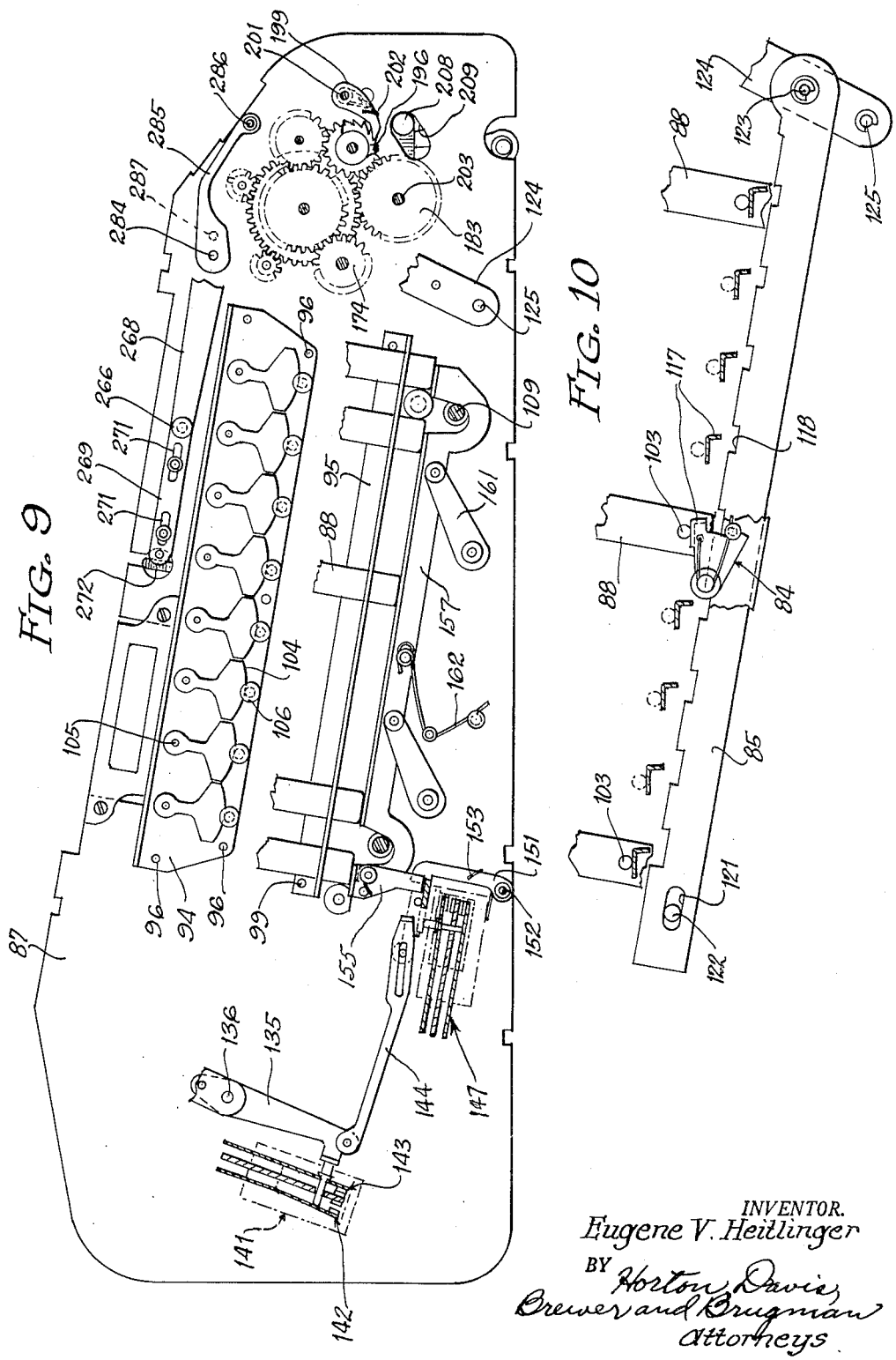

Nov. 16, 1965    E. V. HEITLINGER    3,217,984
SECTIONALIZED, SOLENOID-ACTUATED CALCULATING MACHINES
Filed April 28, 1960    21 Sheets-Sheet 5
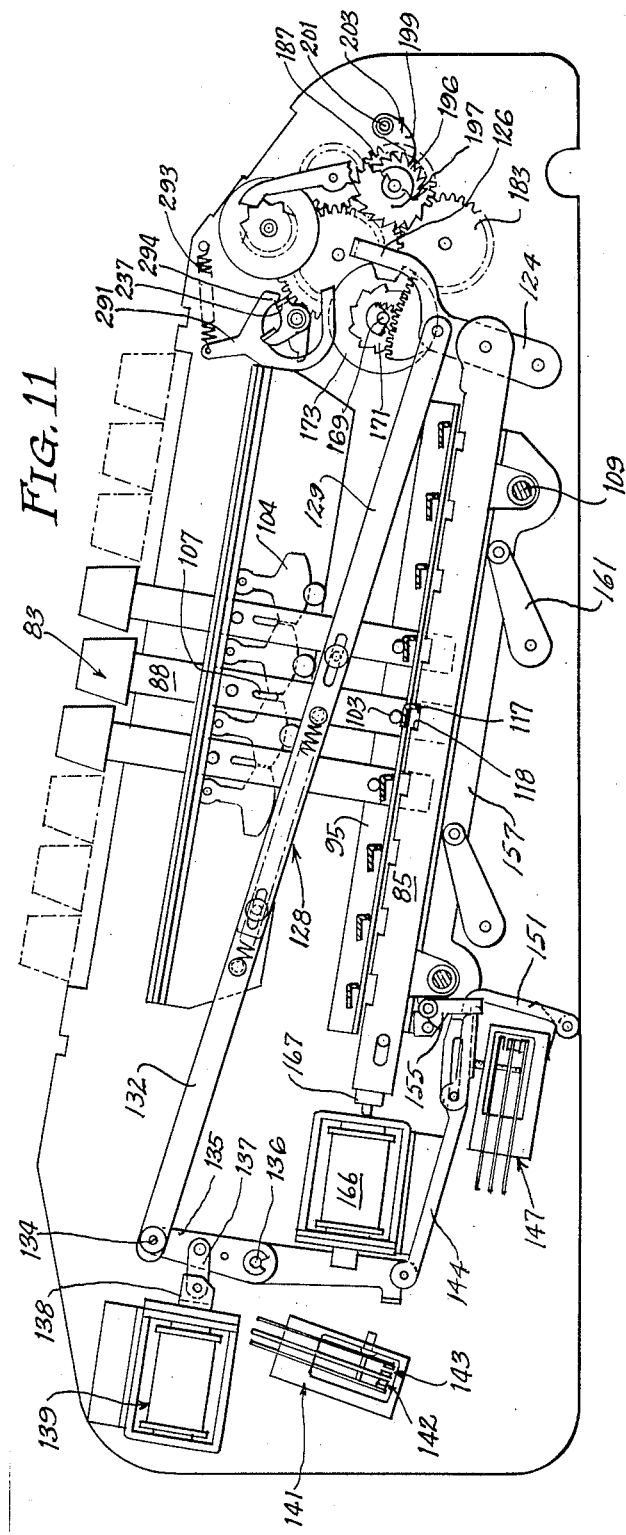
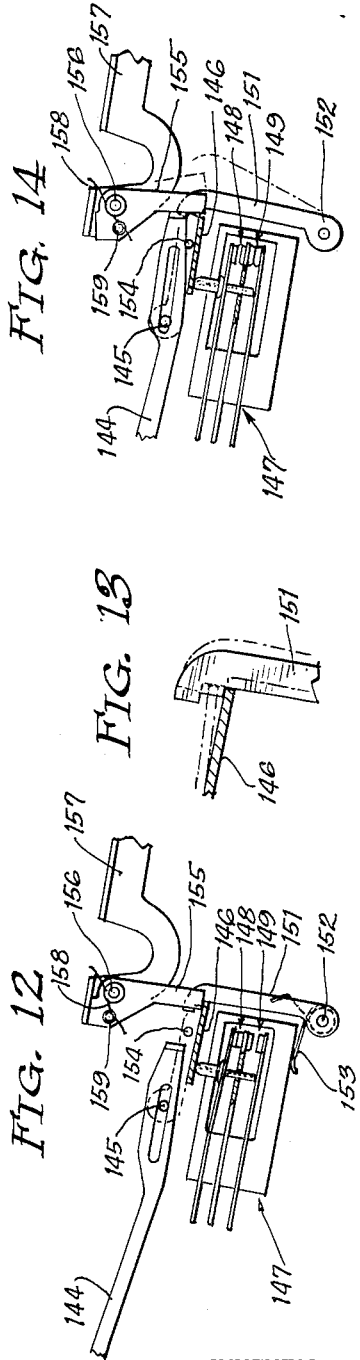
INVENTOR.
Eugene V. Heitlinger
BY Horton, Davis,
Brewer and Brugman
Attorneys Nov. 16, 1965  E. V. HEITLINGER  3,217,984
SECTIONALIZED, SOLENOID-ACTUATED CALCULATING MACHINES
Filed April 28, 1960  21 Sheets-Sheet 6
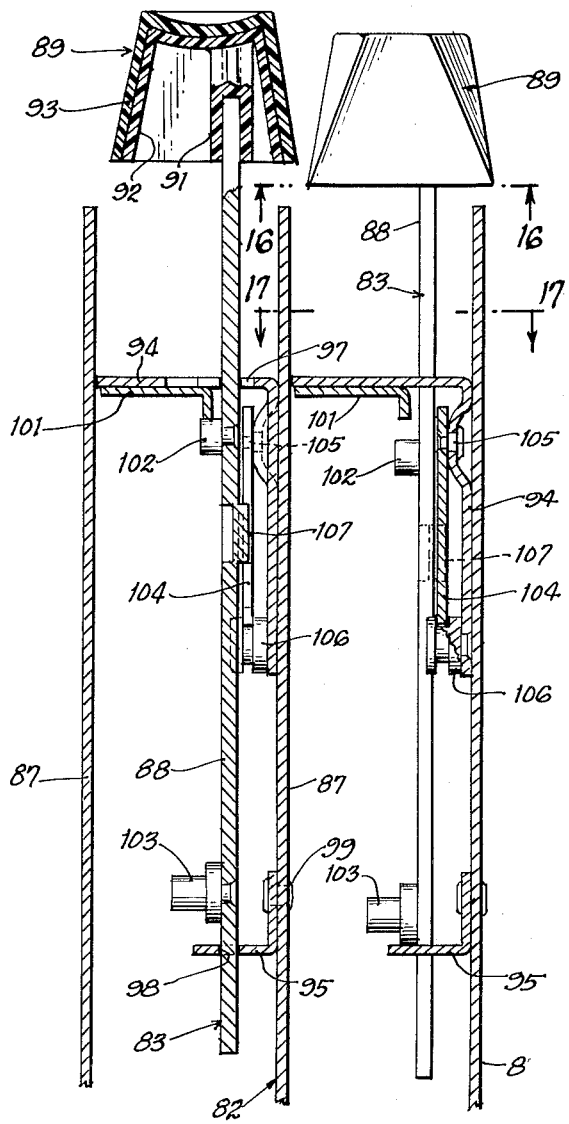
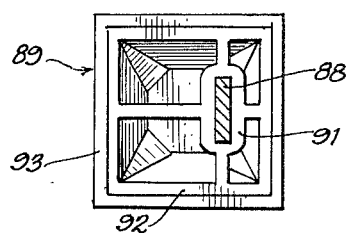
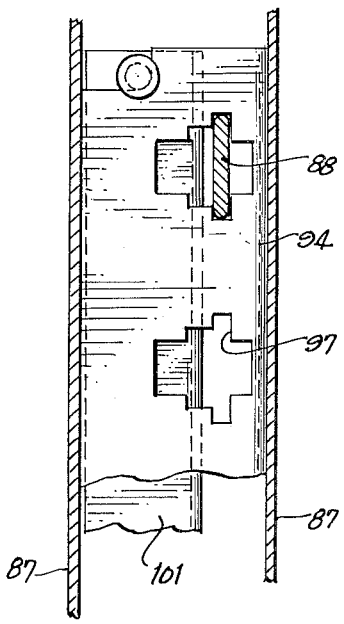
INVENTOR.
Eugene V. Heitlinger
BY Horton, Davis,
Brewer & Brugman
Attorneys Nov. 16, 1965  E. V. HEITLINGER  3,217,984
SECTIONALIZED, SOLENOID-ACTUATED CALCULATING MACHINES
Filed April 28, 1960  21 Sheets-Sheet 7
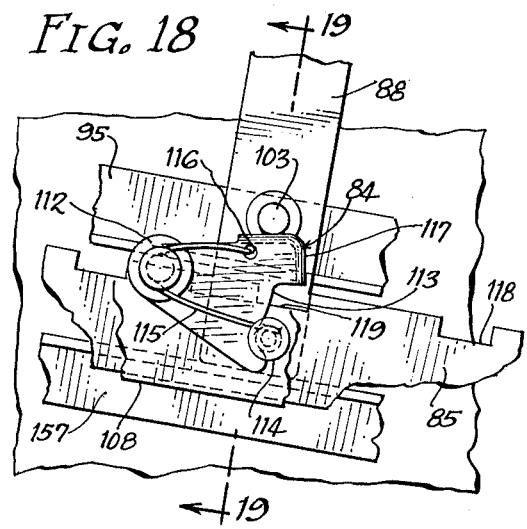
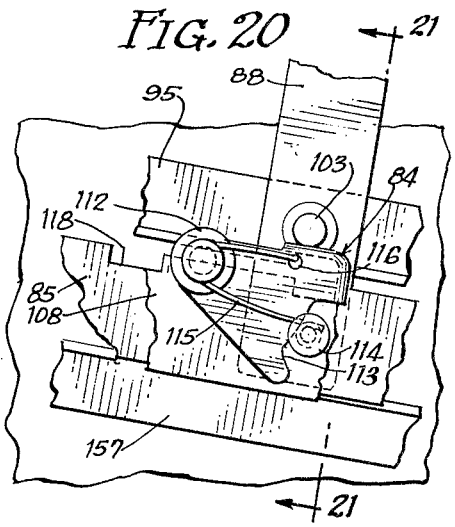
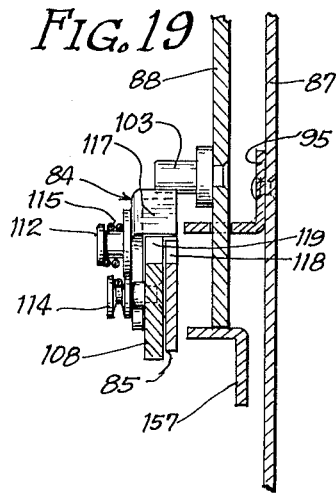
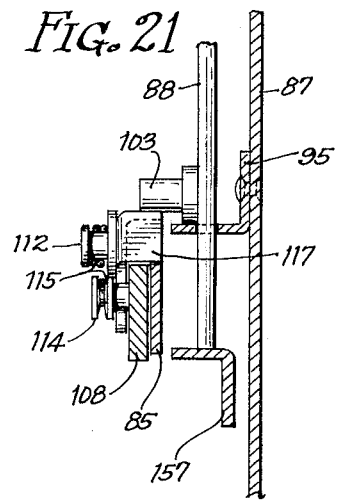
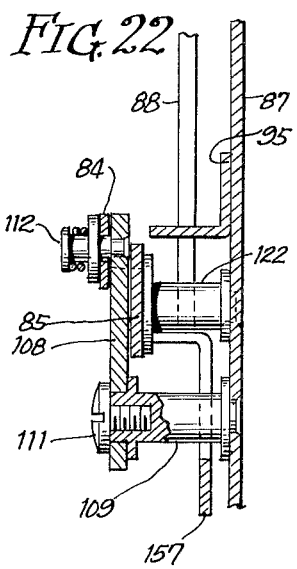
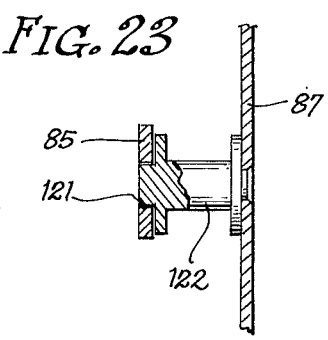
INVENTOR.
Eugene V. Heitlinger
BY Horton, Davis,
Brewer & Brugman
Attorneys INVENTOR.
Eugene V. Heitlinger
BY Horton, Davis,
Brewer & Brugman
Attorneys Nov. 16, 1965    E. V. HEITLINGER    3,217,984
SECTIONALIZED, SOLENOID-ACTUATED CALCULATING MACHINES
Filed April 28, 1960    21 Sheets-Sheet 9

INVENTOR.
Eugene V. Heitlinger
BY
Horton, Davis, Brewer & Brugman
Attorneys

Nov. 16, 1965   E. V. HEITLINGER   3,217,984
SECTIONALIZED, SOLENOID-ACTUATED CALCULATING MACHINES
Filed April 28, 1960   21 Sheets-Sheet 10
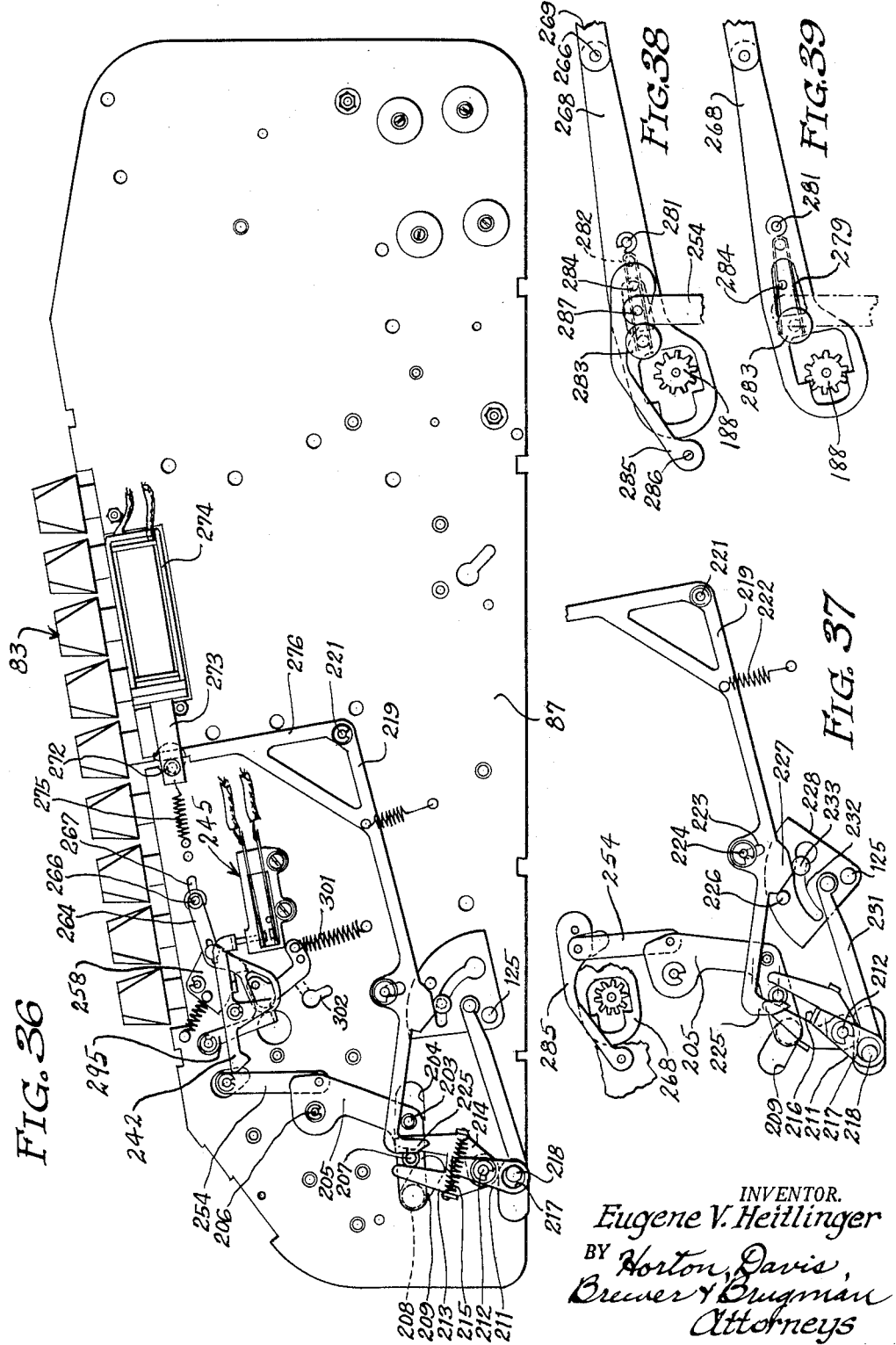
INVENTOR.
Eugene V. Heitlinger
BY Horton, Davis,
Brewer & Brugman
Attorneys INVENTOR.
Eugene V. Heitlinger
BY
Horton, Davis,
Brewer & Brugman
Attorneys

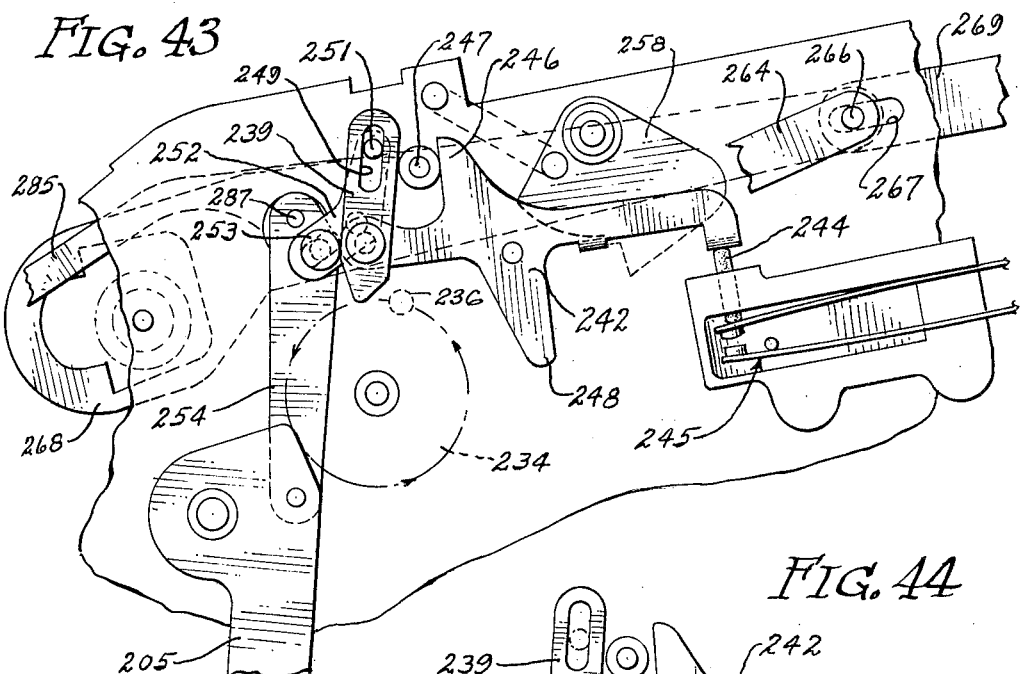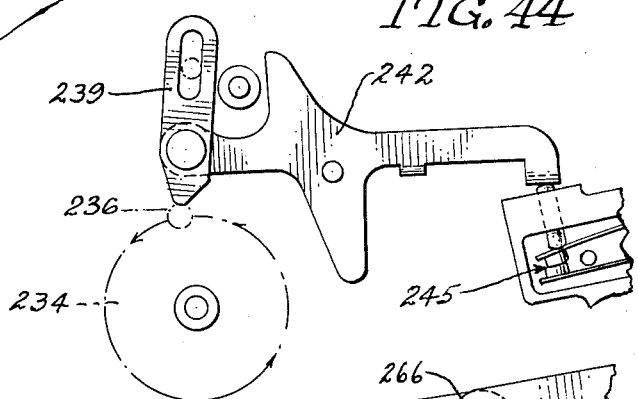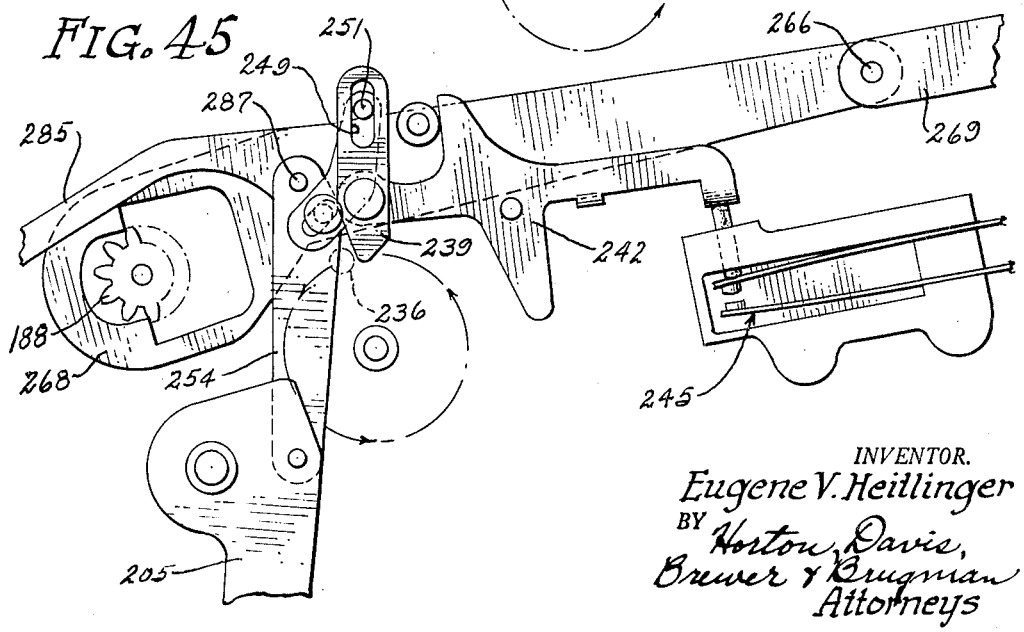

INVENTOR.
Eugene V. Heitlinger
BY
Horton, Davis, Brewer & Brugman
Attorneys

Nov. 16, 1965  E. V. HEITLINGER  3,217,984
SECTIONALIZED, SOLENOID-ACTUATED CALCULATING MACHINES
Filed April 28, 1960  21 Sheets-Sheet 14
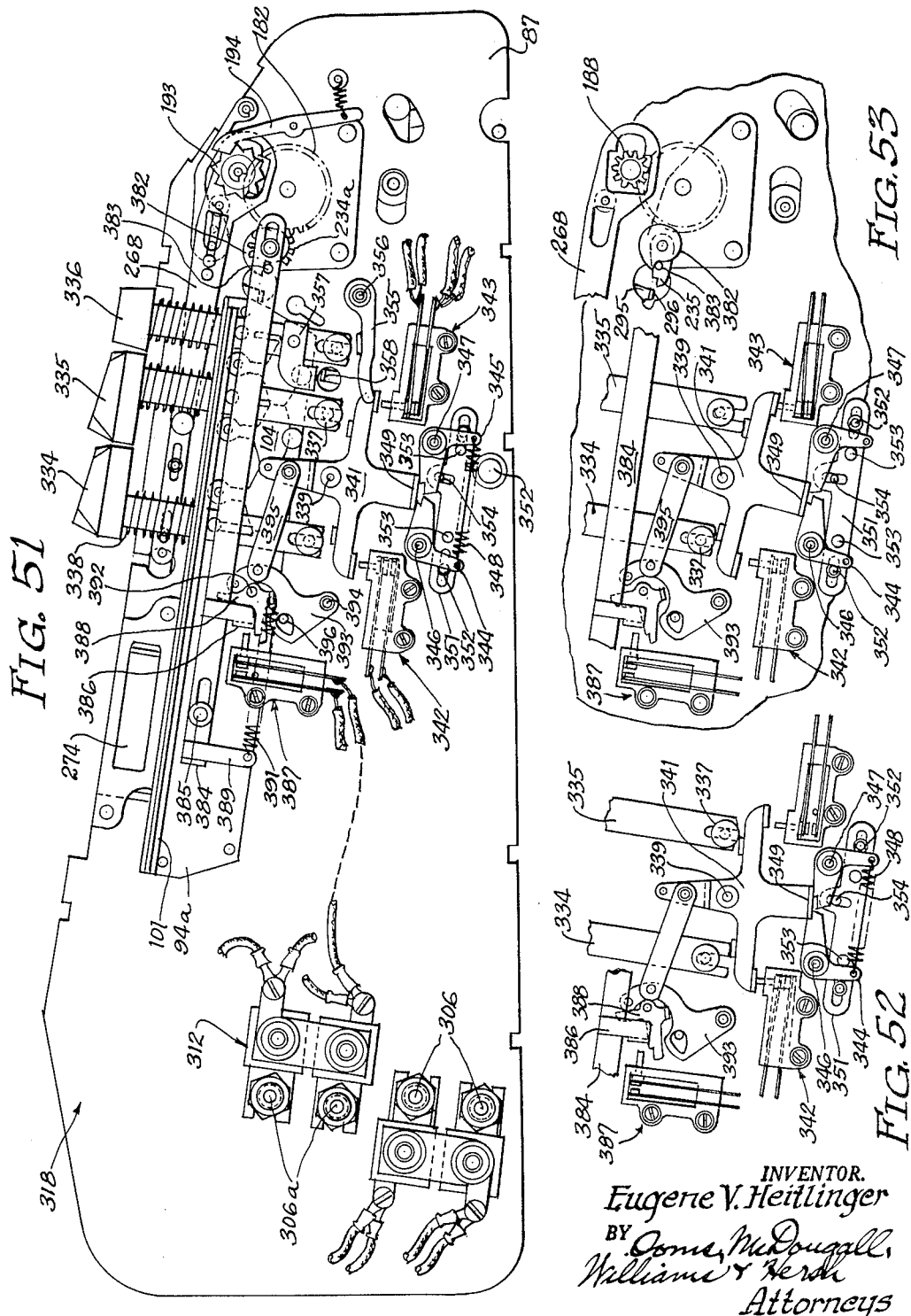
INVENTOR.
Eugene V. Heitlinger
BY
Attorneys

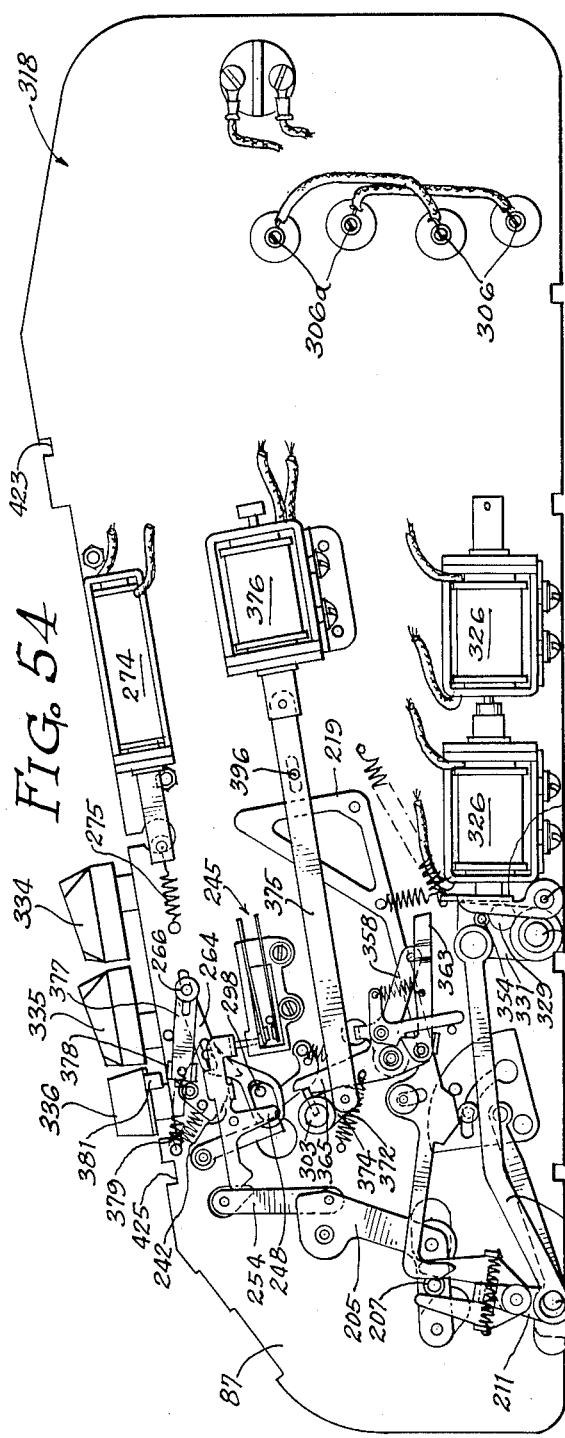
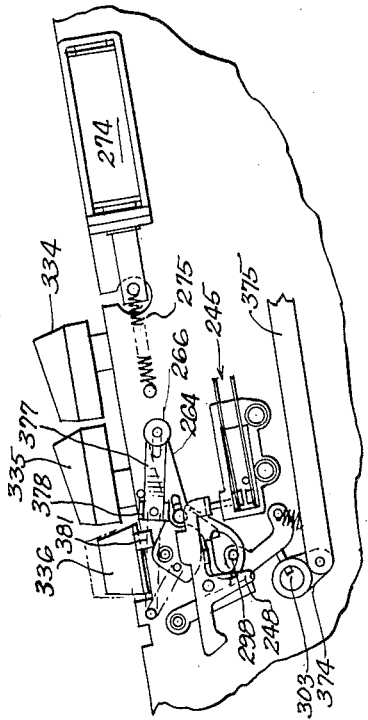
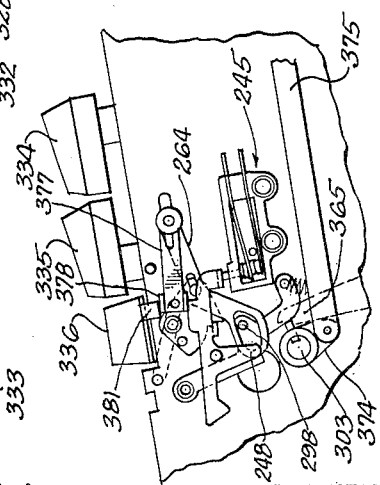

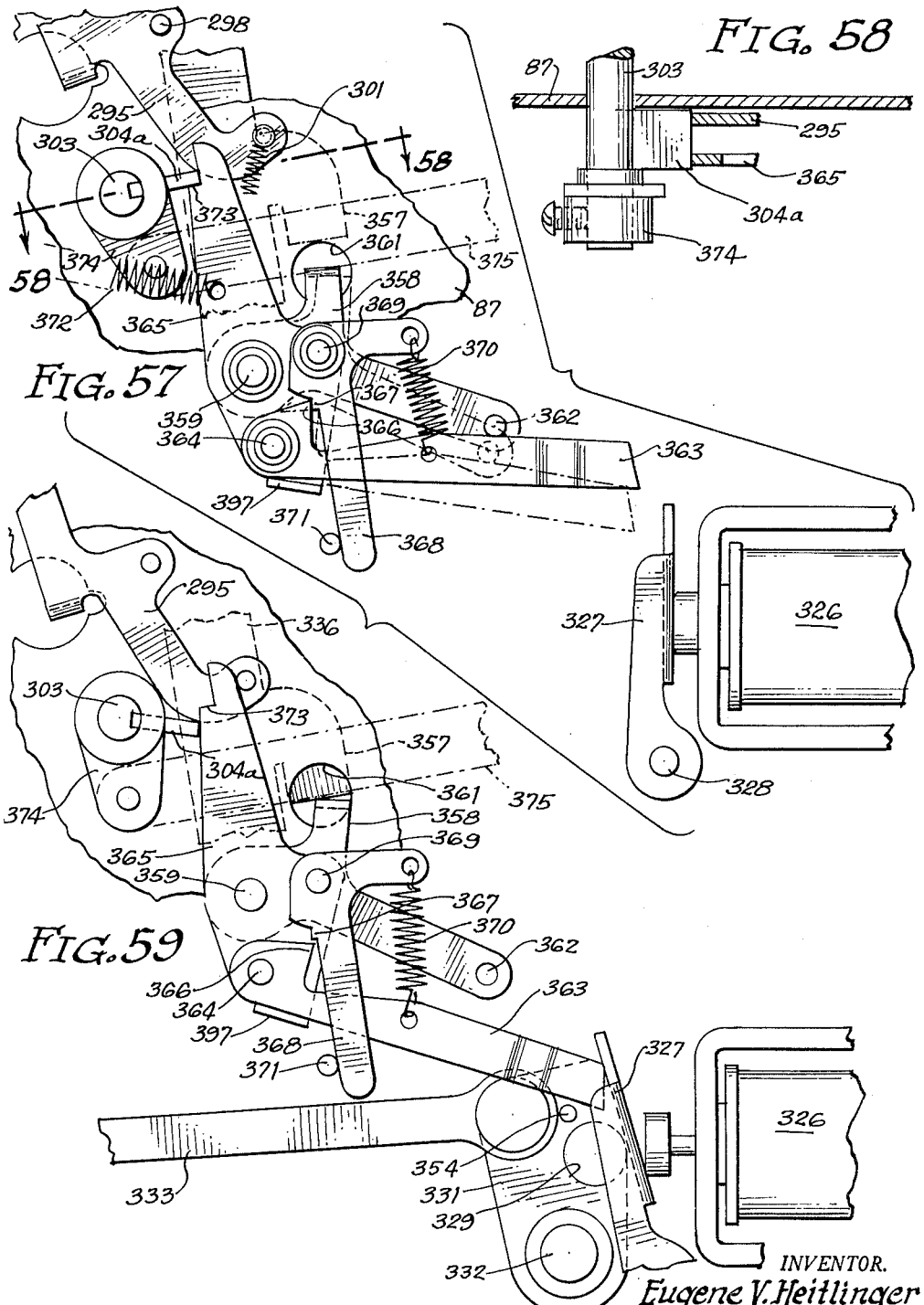

Nov. 16, 1965  E. V. HEITLINGER  3,217,984
SECTIONALIZED, SOLENOID-ACTUATED CALCULATING MACHINES
Filed April 28, 1960  21 Sheets-Sheet 17
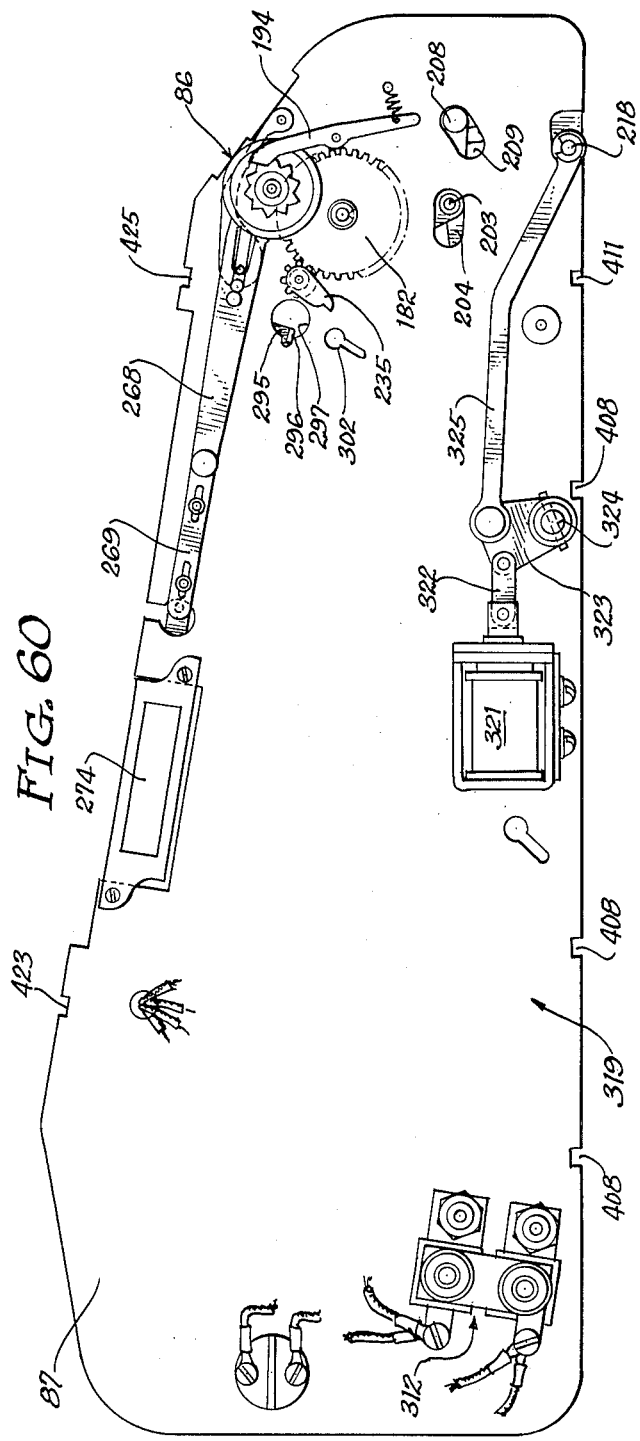
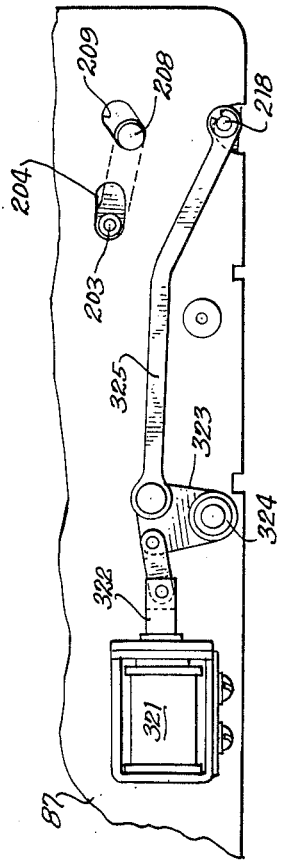
INVENTOR.
Eugene V. Heitlinger
BY Horton, Davis,
Brewer & Brugman
Attorneys

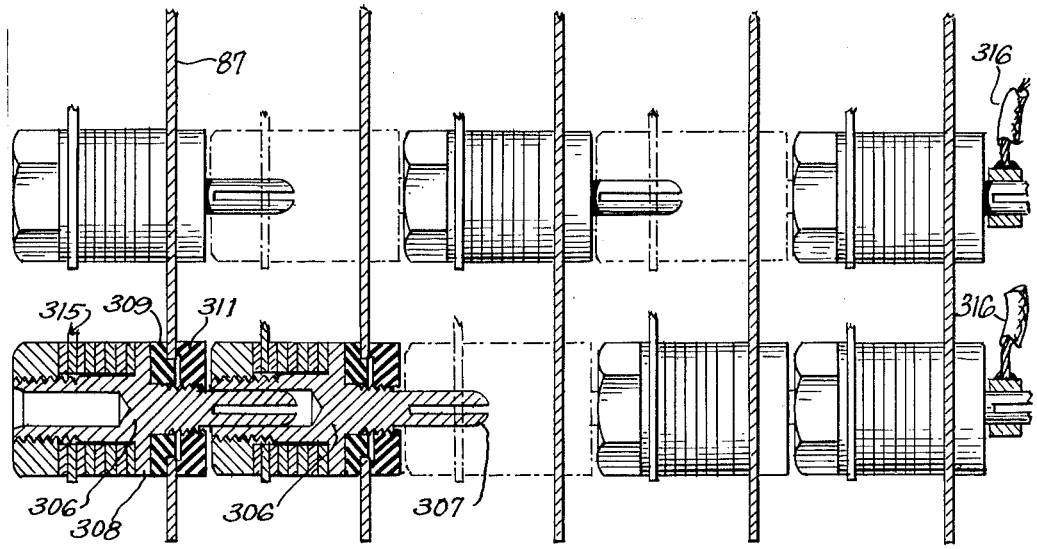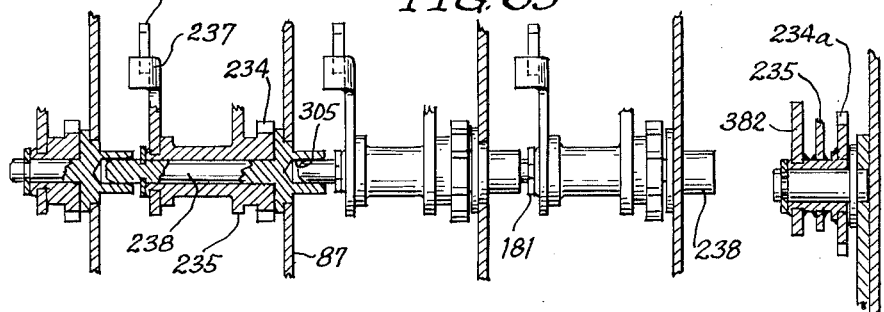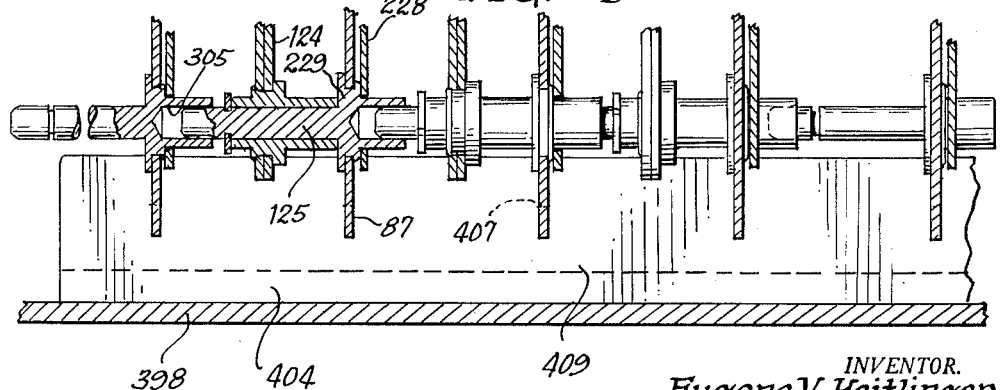

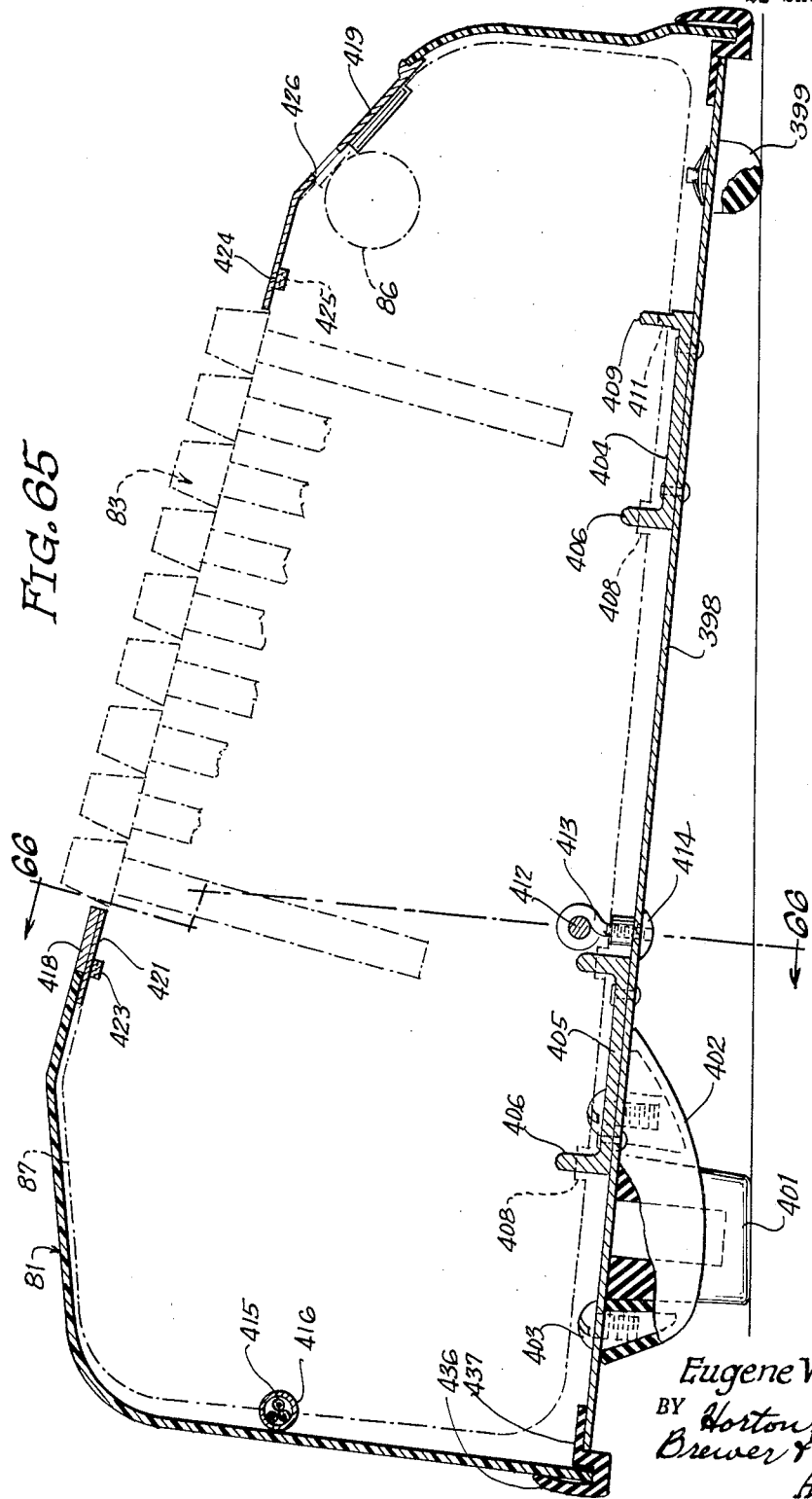

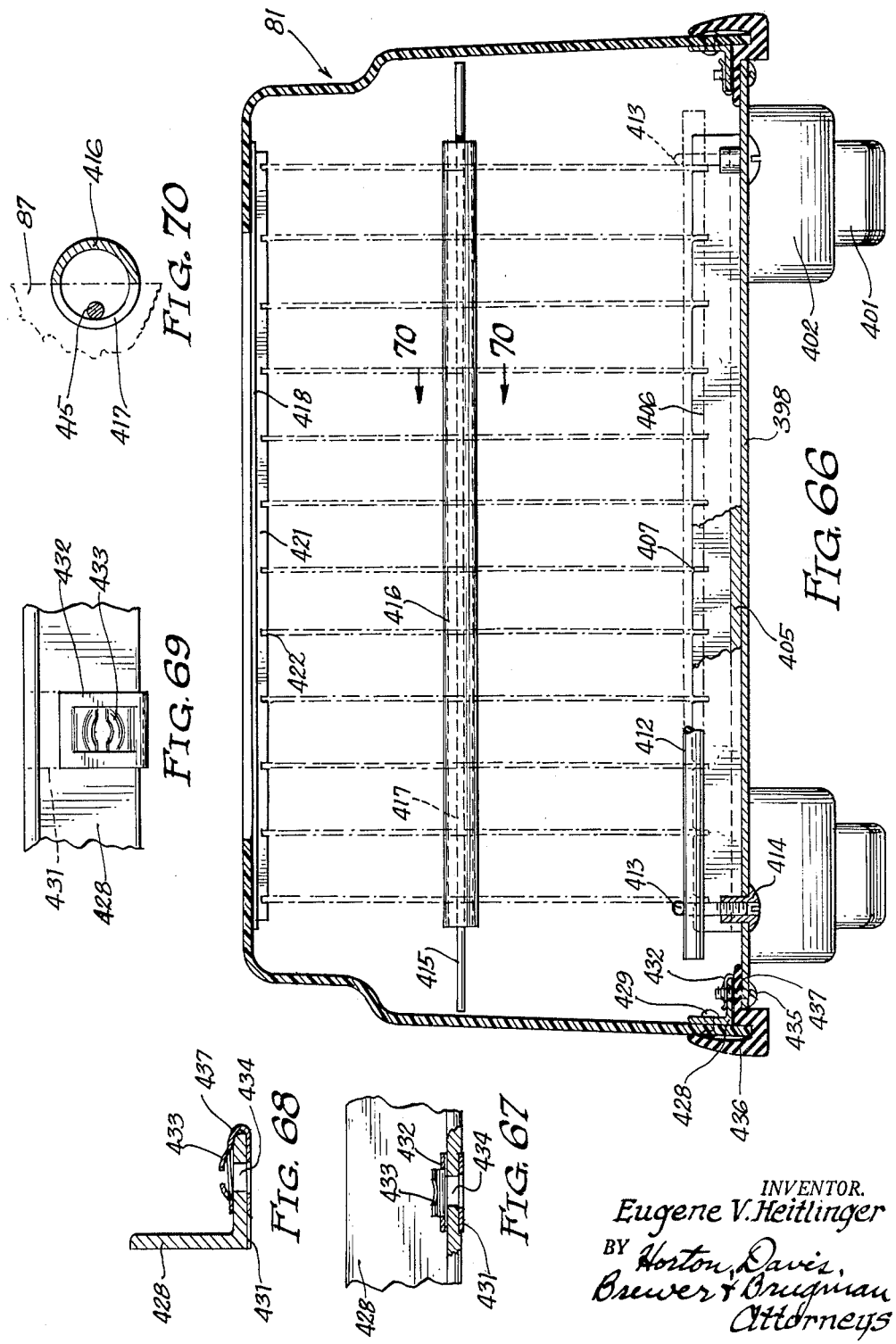

INVENTOR.
Eugene V. Heitlinger

United States Patent Office 3,217,984
Patented Nov. 16, 1965

3,217,984
SECTIONALIZED, SOLENOID-ACTUATED
CALCULATING MACHINES
Eugene V. Heitlinger, Franklin Park, Ill., assignor, by mesne assignments, to Victor Comptometer Corporation, Chicago, Ill., a corporation of Illinois
Filed Apr. 28, 1960, Ser. No. 25,366
43 Claims. (Cl. 235—62)

This invention relates in general to calculating machines, and more particularly to those adapted to perform direct subtraction, as well as addition, multiplication, and division.

A principal object of the invention is to facilitate and simplify the manufacture and repair of calculating machines by providing independently powered and individually complete columnar units which may be assembled together to form a multi-denominational order machine merely by laterally stacking together any desired number of such columnar units.

Another important object is to increase the speed of operation of a desk type calculating machine and to reduce the physical and mental efforts required of an operator in its use.

A further object of the invention is to decrease the cost of operating a multi-denominational order calculating machine, which is attained by providing separate electric motor means in each order which consume a small fraction of the electrical energy that it takes to run a single motor of sufficient capacity to actuate the mechanism in all orders, as has been customary heretofore.

Another important object of the invention is to provide for the performance of direct subtraction in a calculating machine having uni-directional actuating mechanism.

A further important object is the provision of ten's carrying mechanism for an accumulator which is operable both positively and negatively and receives its energy from a source other than the digital actuating means.

A further object is to provide improved means for insuring against loss of a carry under any circumstances and regardless of the speed with which duplex actuations of the register elements are effected.

Another object of the invention is to provide novel and improved means to prevent movement of the register elements in a calculating machine either positively or negatively except by their actuating mechanism and which includes means releasable during a ten's carrying operation by the ten's carrying mechanism to permit movement by the latter of the proper register element for an extent equivalent to a single unit of value.

Another object is to further simplify the construction of a calculating machine by providing control means selectively operable to use such ten's carrying mechanism for zeroizing the accumulator.

A further object is to provide a full powered cycle in a calculating machine having reciprocable actuators, and to eliminate the necessity of using more power than that required to move the actuators. This is accomplished by employing two separate sources of energy, one for moving the actuators in each direction, rather than the common practice of using a single source of sufficient magnitude not only to move the actuators in one direction but also to energize spring means for moving the actuators in the opposite direction. In the preferred embodiment, electrically energizable means comprising separate electrically operated sources of mechanical energy in the form of solenoids are employed.

Another important object of the invention is to reduce the cost of manufacturing a key-controlled mechanical calculating machine while assuring absolute accuracy of its operation with regard to each digital degree of movement of the actuating mechanism. The required accuracy is costly and difficult to attain in the production of prior machines in which the stems of the digit keys are contacted directly by stop means to limit the digital degree of operation of the actuating mechanism, primarily because mounting of the key stems is the most difficult of the required assemblies to effect accurately. With the present invention, it is no longer necessary to mount the key stems within close tolerances because of novel digital stop members that are operable by the keys and are very easy to manufacture and mount within extremely close tolerances; the digit keys thereby being relieved of the function of physically and directly stopping the actuating mechanism.

A further object is to materially reduce the length of key stroke required to operate the digit keys of a key-controlled calculating machine.

Another important object of the invention is to insure accuracy of operation of a reciprocable actuating member in a calculating machine by providing a source of power which reaches its maximum output as the work stroke of the actuating member is completed.

A further object is to simplify and increase the life of reciprocable actuating mechanism in a calculating machine by providing improved and novel compensating means interconnecting that portion of the mechanism having a constant stroke and that having a varying stroke.

Another object is to provide maximum over-load protection in a calculating machine employing electric motor means.

Numerous other objects and advantages of the invention will be apparent as it is better understood from the following description, which, when taken in connection with the accompanying drawings, discloses a preferred embodiment thereof.

In the drawings:

FIG. 3 is a side elevation of one of the digital columnar units as seen from the left side thereof;

FIG. 4 is a detail elevation of a ten's carry striker at rest in negative or subtract position;

FIG. 5 is a similar view showing a carry striker engaged with its numeral wheel pinion during a subtraction operation thereof;

FIG. 6 is a view similar to FIG. 4 showing a carry striker at rest in positive or add position;

FIG. 7 is a view similar to FIG. 6 showing a carry striker at the completion of its positive operation stroke;

FIG. 8 is a detail elevational view similar to the right-hand end of FIG. 3 showing the drive transmitting mechanism in subtract position;

FIG. 9 is an elevation similar to FIG. 3 with parts stripped therefrom to better illustrate the key locks and switch bar mechanisms;

FIG. 10 is a detail vertical section through the ordinal stops to illustrate the relationship between the same and the associated stop bar;

FIG. 11 is a view similar to FIG. 3 with the ordinal stops in vertical section as in FIG. 10 and showing the No. 5 digit key depressed;

FIG. 12 is a detail elevation of the push-pull solenoid switch as displaced and latched in response to depression of a digit key;

FIG. 13 is a similar detail elevation showing the latch for maintaining the switch of FIG. 12 in actuated position in full lines and in released position in broken lines;

FIG. 14 is a view similar to FIG. 12 showing the parts as the latch is released in response to operation of the pull solenoid, with broken lines indicating permissible overtravel due to impact;

FIG. 15 is a transverse vertical section through two adjacent columnar units to show details of the digit keys;

Figure 24:
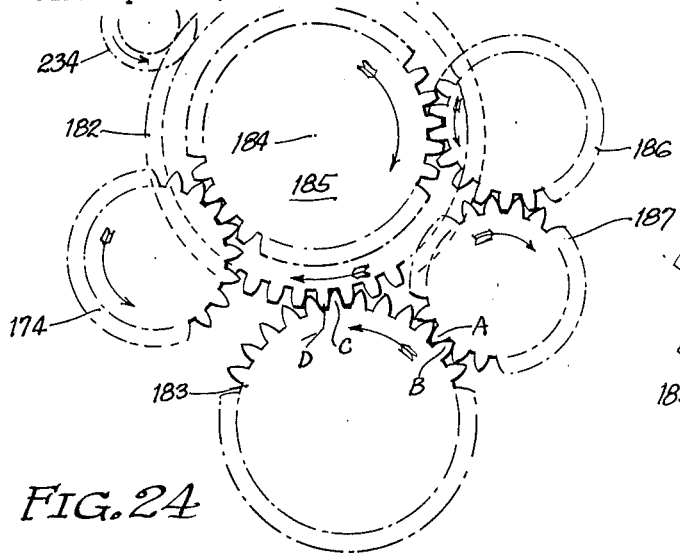
Figure 25:
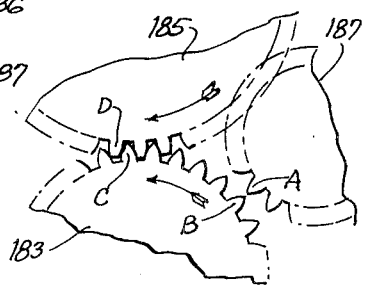
Figure 26:
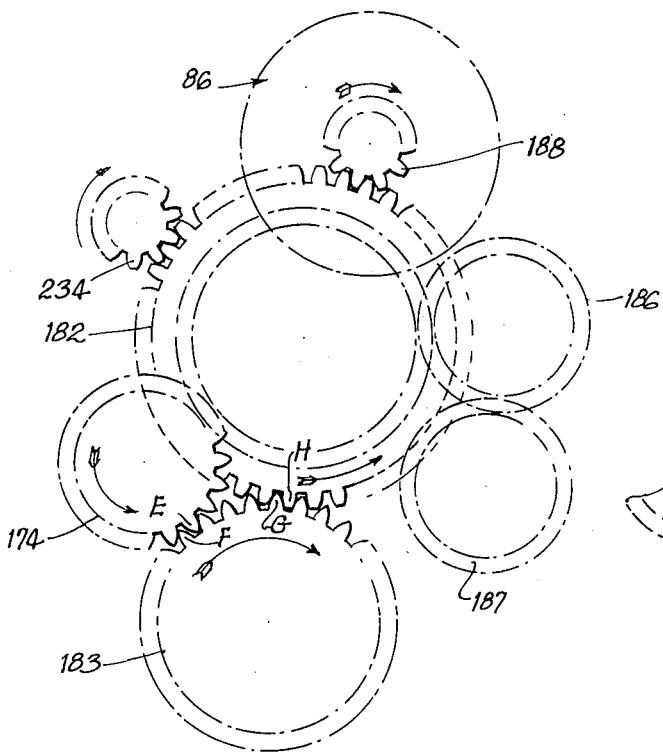
Figure 27:
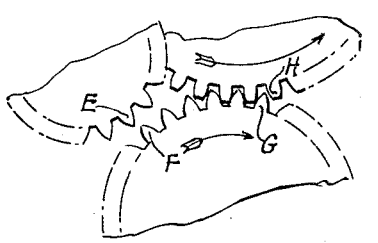
Figure 28:
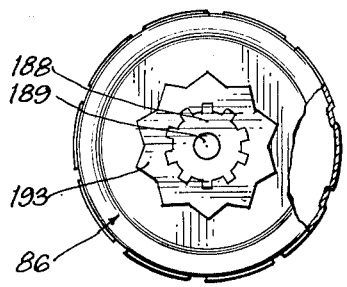
Figure 29:
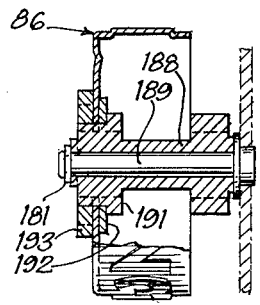
Figure 30:
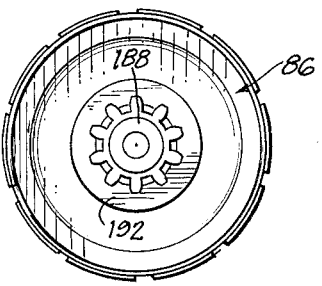
Figure 31:
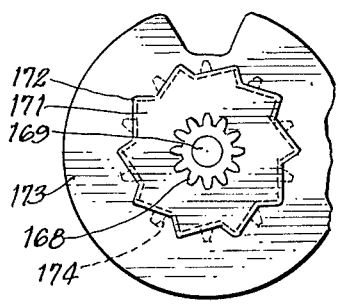
Figure 32:
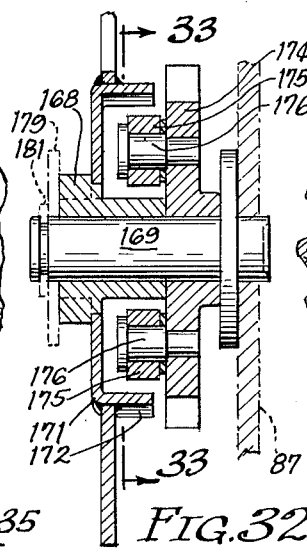
Figure 33:
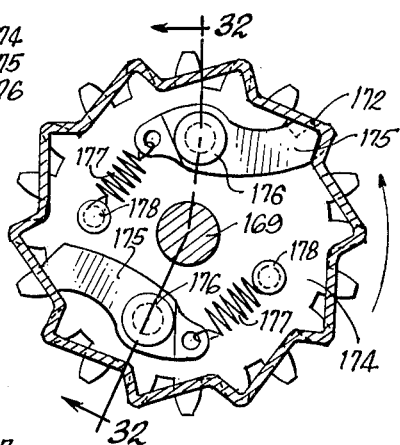
Figure 34:
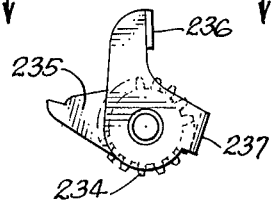
Figure 35:
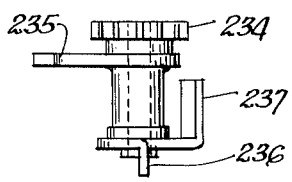
Figure 40:
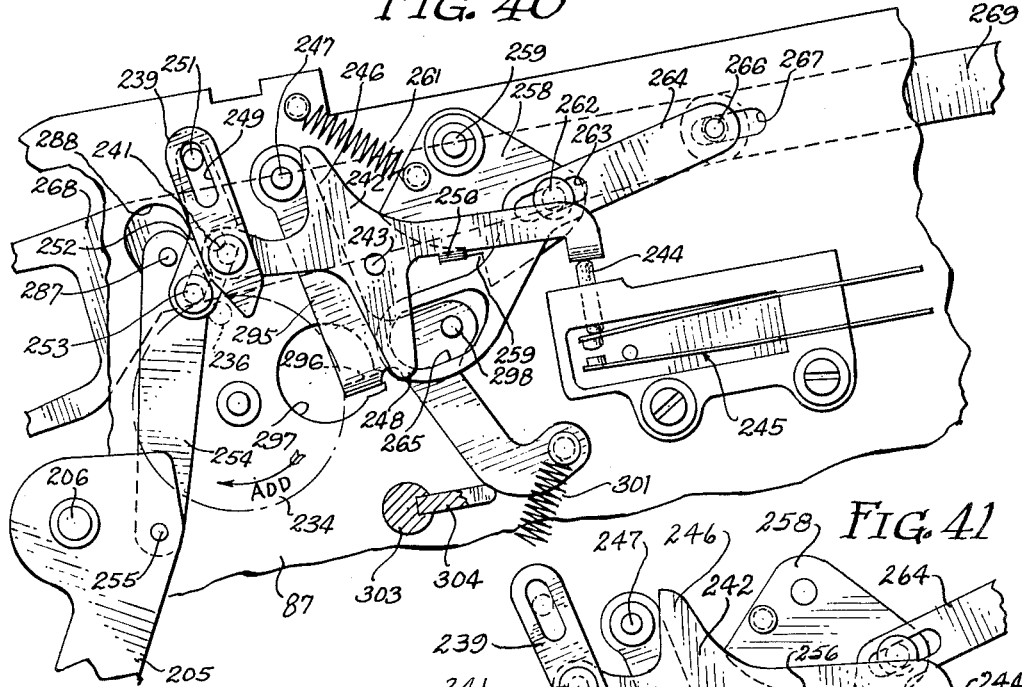
Figure 41:
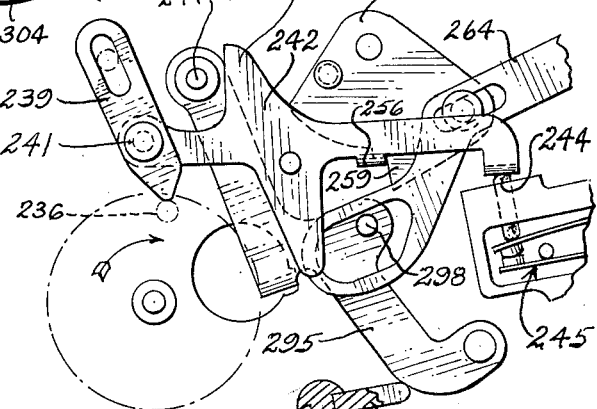
Figure 42:
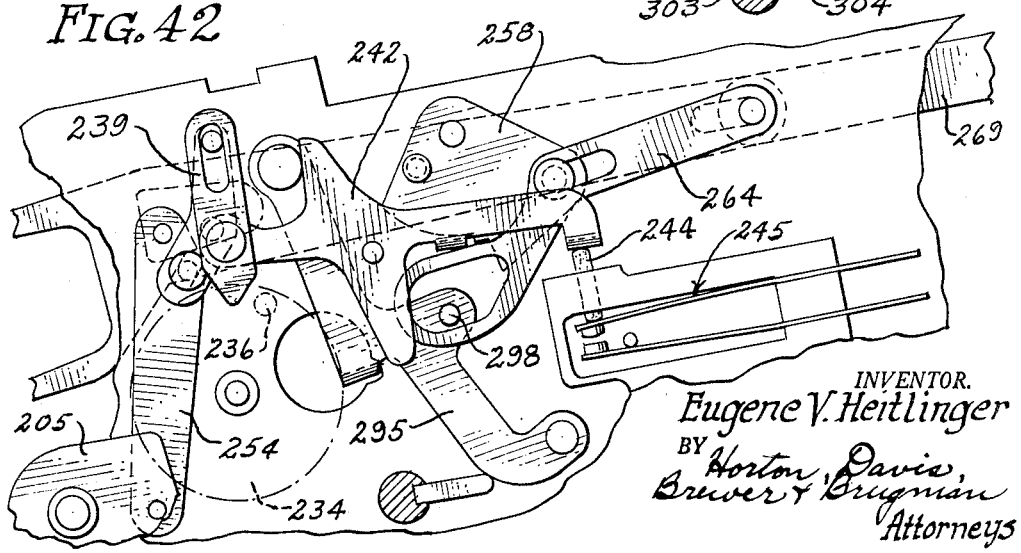
Figures 46, 47:
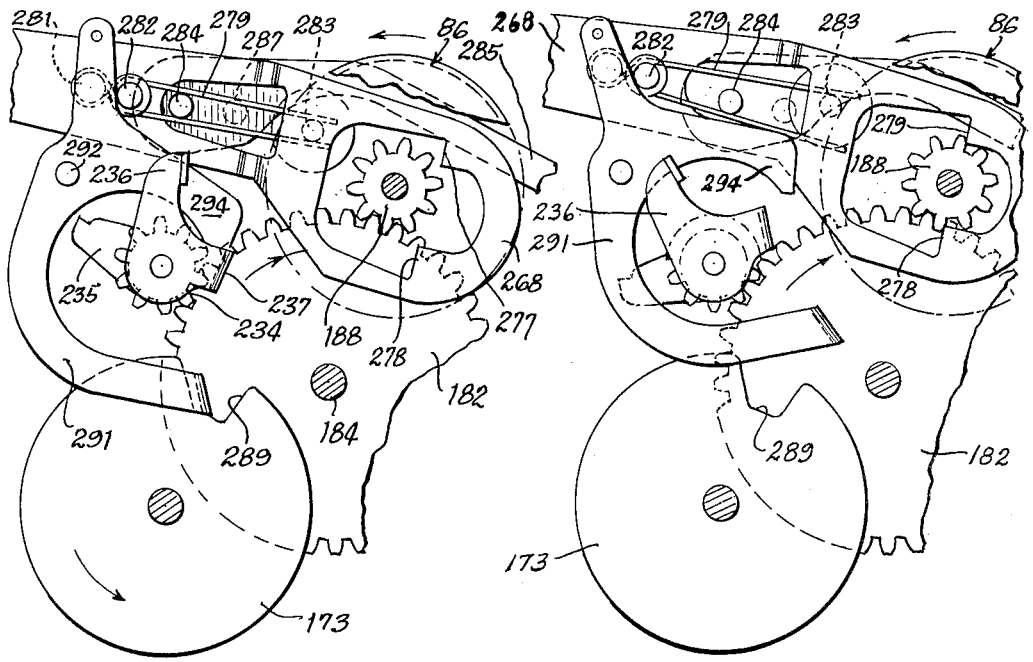
Figure 50:
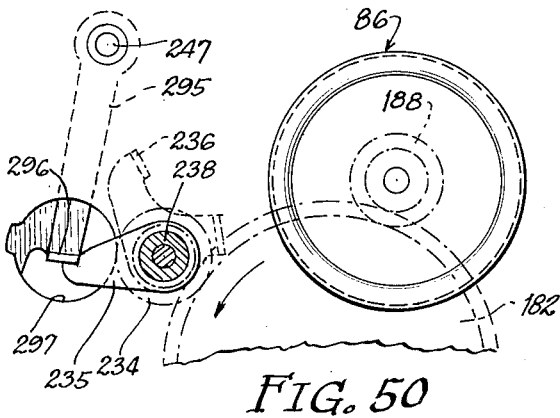
Figure 48:
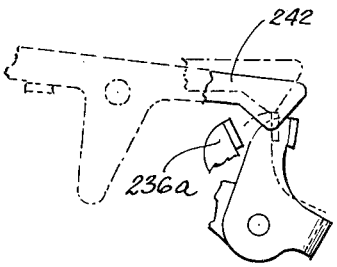
Figure 49:
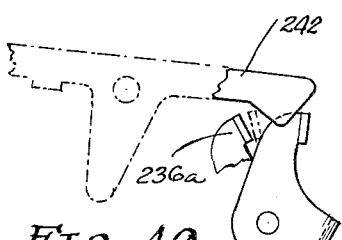
Figure 71:
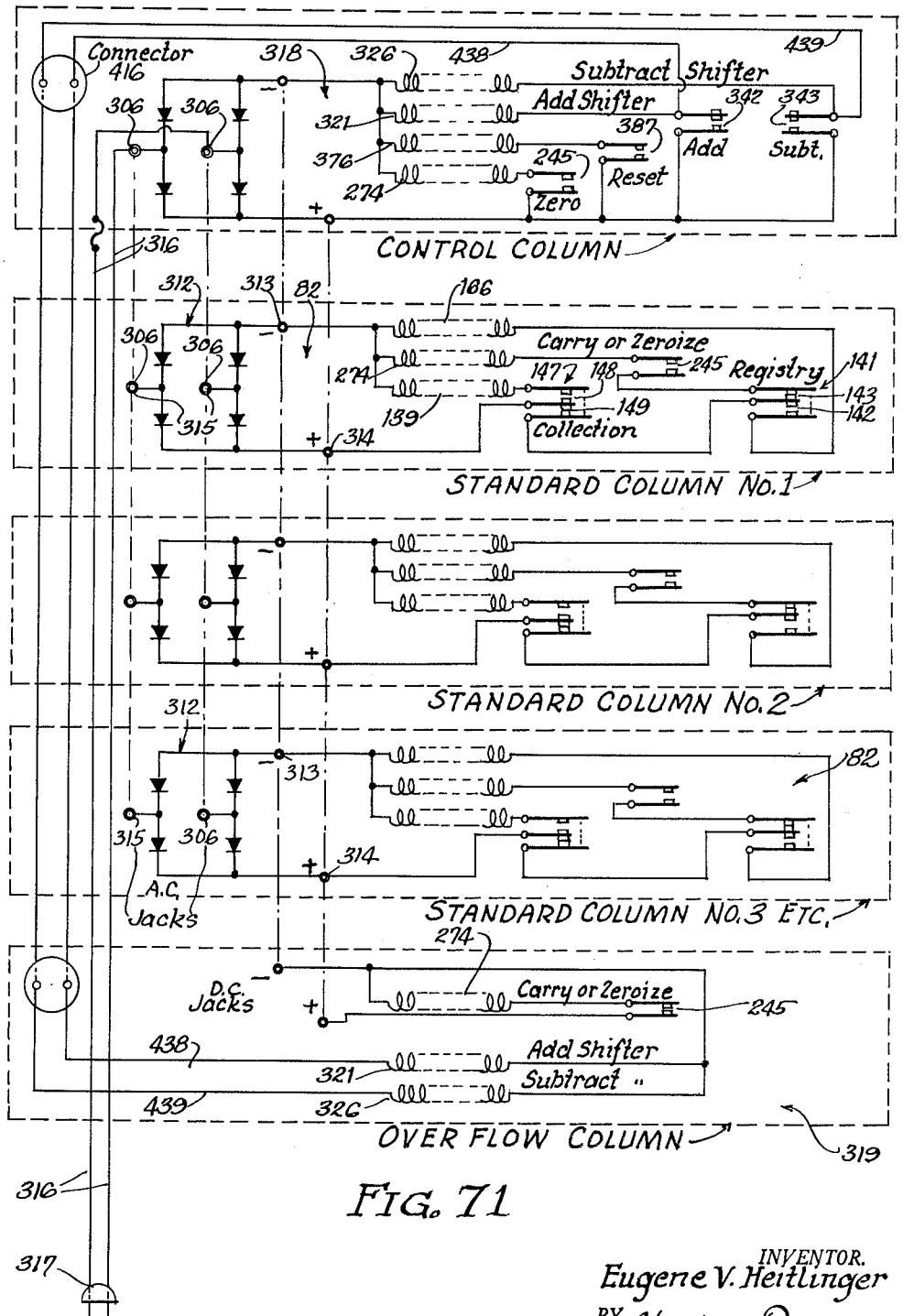

FIGS. 16 and 17 are detail horizontal sections taken substantially on the lines 16—16 and 17—17, respectively, of FIG. 15;

FIG. 18 is an enlarged detail elevation of an ordinal stop and associated mechanism similar to the illustration in FIG. 3, with the digit key in normal raised position;

FIG. 19 is a detail transverse section taken substantially on the line 19—19 of FIG. 18;

FIG. 20 is a view similar to FIG. 18 with the digit key in depressed position;

FIG. 21 is a detail transverse section taken substantially on the line 21—21 of FIG. 20;

FIG. 22 is a transverse section similar to FIGS. 19 and 21 showing details of the ordinal stop mounting means;

FIG. 23 is a similar detail section taken transversely through the stud slidingly supporting the rear end of the ordinal stop bar;

FIG. 24 is a schematic illustration of the ordinal drive transmitting means in add position;

FIG. 25 is a fragmentary view of the drive means of FIG. 24 illustrating the disengaged position of the shiftable gear during an additive ten's carry;

FIG. 26 is a view similar to FIG. 24 showing the shiftable gear moved to position to effect negative actuation of the associated numeral wheel;

FIG. 27 is a view similar to FIG. 25 illustrating the shiftable gear momentarily disengaged during a subtractive ten's carry;

FIG. 28 is a detail elevation of a numeral wheel as seen from the left side of the machine;

FIG. 29 is a transverse vertical section through the numeral wheel of FIG. 28;

FIG. 30 is an elevational view of the numeral wheel as seen from the right side thereof;

FIG. 31 is a detail elevational view of the one-way clutch of the drive transmitting means, as seen from the left side of the machine;

FIG. 32 is a transverse section of the clutch mechanism of FIG. 31 on a slightly larger scale, as seen from the line 32—32 of FIG. 33;

FIG. 33 is a longitudinal vertical section taken substantially on the line 33—33 of FIG. 32;

FIG. 34 is an end elevation of one of the zero stops and carry control members as seen from the left side of the machine;

FIG. 35 is a plan view of the control member of FIG. 34 as seen from the line 35—35 therein;

FIG. 36 is a side elevation of one of the digital columnar units as seen from the right side thereof, with the selectively shiftable means for predetermining the direction of actuation disposed in add position;

FIG. 37 is a similar view of some of the parts shown in FIG. 36 to illustrate the position thereof when the machine is set for subtraction;

FIG. 38 is a detail view of a carry striker in rest position when set for negative operation, as seen from the right side thereof, which is opposite to FIG. 4;

FIG. 39 is a view similar to FIG. 38 showing the carry striker in fully actuated subtract position;

FIG. 40 is an enlarged detail elevation, as seen from the right side of a columnar unit, of part of the ten's carrying mechanism shown in FIG. 36 set for addition in at rest position;

FIG. 41 is a similar view of the same mechanism during active operation by the carry control member of the next lower order;

FIG. 42 is a view similar to FIGS. 40 and 41 showing the position of the parts during subsequent retraction of the carry solenoid;

FIG. 43 is a detail elevation similar to FIG. 40 showing the ten's carrying mechanism set for subtraction in at rest position;

FIG. 44 is a similar view of the same mechanism as illustrated in FIG. 43 during active operation by the carry control member of the next lower order;

FIG. 45 is a view similar to FIGS. 43 and 44 showing the position of the parts during subsequent retraction of the carry solenoid;

FIG. 46 is a detail elevation, as seen from the left side of a columnar unit, of the means for preventing a premature carry in the position assumed thereby just prior to an additive ten's carry;

FIG. 47 is a view similar to FIG. 46 showing the parts in the positions immediately thereafter assuming upon completion of a resulting carry actuation;

FIG. 48 is a detail view similar to FIG. 46 showing in full lines the positions of the parts when the associated numeral wheel registers 9 and in broken lines the positions that may be assumed which normally might result in a premature carry, and including a modified form of carry switch actuator;

FIG. 49 is a view similar to FIG. 48 of the same modification for the purpose of illustrating why such a premature carry cannot be effected during subtraction;

FIG. 50 is a detail elevation, as seen from the left side of a columnar unit, illustrating the position assumed by a zero stop during a zeroizing operation when the associated numeral wheel displays "zero";

FIG. 51 is an elevational view of the left side of the right-hand control columnar unit in normal rest position of the parts;

FIG. 52 is a view similar to FIG. 51 of the control mechanism in the position assumed upon depression of the add key;

FIG. 53 is a view similar to FIGS. 51 and 52 showing the same parts in the position assumed upon depression of the subtract key;

FIG. 54 is an elevational view of the right side of the control columnar unit of FIG. 51, with the parts in normal position and the machine preset for addition;

FIG. 55 is a detail elevation of the part of the mechanism shown in FIG. 54 illustrating the positions immediately assumed by the parts thereof in response to depression of the zeroizing key;

FIG. 56 is a view similar to FIG. 55 showing the positions of the parts assumed in response to retraction of the zeroizing solenoid;

FIG. 57 is a detail elevation on an enlarged scale of some of the zeroizing control mechanism illustrated in FIG. 54 and showing the anvil lever in broken lines in the position assumed in response to depression of the zeroizing key;

FIG. 58 is a detail transverse section taken substantially on the line 58—58 of FIG. 57;

FIG. 59 is an elevational view siimlar to FIG. 57 showing the positions assumed by the parts in response to actuation of the subtract solenoids;

FIG. 60 is an elevational view of the left side of the overflow columnar unit at the left-hand side of the machine when the latter is set for addition;

FIG. 61 is a similar view showing part of the mechanism of FIG. 60 in the position assumed when the machine is set for subtraction;

FIG. 62 is a transverse vertical section taken adjacent the rear of the machine through the interengaging plug means for aligning adjacent columnar units and conducting current to the electric motor means, with some of such plug means omitted and some shown in elevation;

FIG. 63 is a similar transverse section through the columnar aligning pivot studs mounting the zero stop and carry control members;

FIG. 64 is a similar transverse section adjacent the front of the machine through the aligning studs pivotally mounting the gear sectors;

FIG. 65 is a longitudinal vertical section through the machine casing, with the digit keys and numeral wheels illustrated in broken lines;

FIG. 66 is a transverse sectional view taken substantially on the line 66—66 of FIG. 65;

FIG. 67 is a detail longitudinal vertical section through a portion of the base leg of one of the casing rails;

FGI. 68 is a detail transverse section through the mounting aperture of the rail of FIG. 67;

FIG. 69 is a top plan view of the portion of the casing rail shown in FIGS. 67 and 68;

FIG. 70 is a detail vertical section through the rearwardly disposed wire conduit and columnar spacer taken substantially on the line 70—70 of FIG. 66; and FIG. 71 is a wiring diagram for the machine's electrical circuit.

Figure 1:
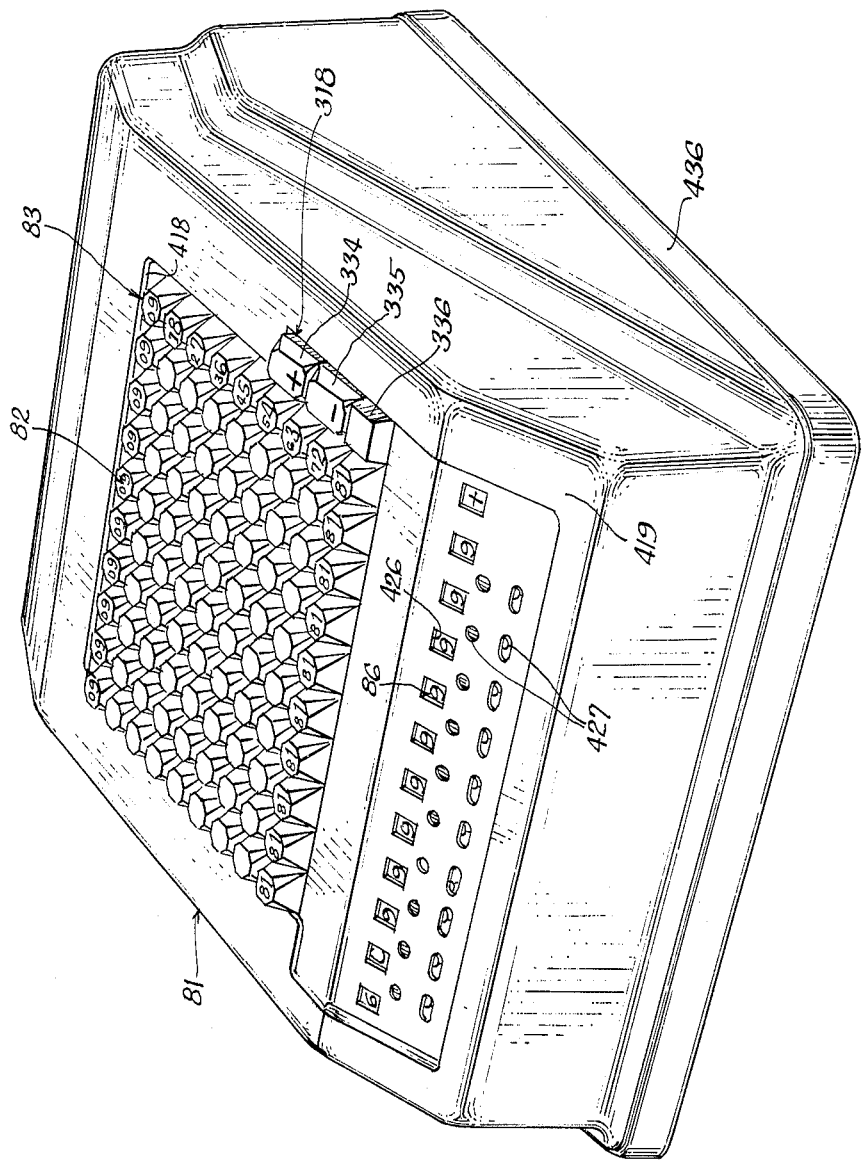
FIGURE 1 is a perspective view of a calculating machine embodying the features of this invention.

Referring more particularly to the drawings, a machine embodying this invention is illustrated in FIG. 1 as being housed within a casing 81 and comprising a plurality of individually complete digital or ordinal columnar units, each indicated generally by reference numeral 82. It is thought that the manner in which these units 82 are mounted within the casing 81 will be more readily understood following a detailed description of the units, so that further reference to specific features of the casing will be deferred until the operating parts of the machine have been described. Of course, it is to be understood that this invention contemplates the use of any desired number of columnar units 82, but since each one is the same as the other, it will be necessary to describe only one of them.

DIGITAL COLUMNAR UNIT

Each one of these units 82 comprises manually operable control means in the form of nine digit keys 83, the same number of ordinal stops, indicated generally by reference numeral 84 and each associated with one of the digit keys, a stop bar 85 cooperating with the stops 84 to determine the digital degree of operation of a unitary actuating mechanism, which is connected by a reversible drive transmitting means to an accumulator register element or numeral wheel 86 having novel ten's carrying mechanism associated therewith, and all mounted upon an ordinal frame plate 87.

Digit keys

The digit keys 83 and the mounting thereof on the associated ordinal frame plate 87 are shown in FIGS. 1–3, 9–11, and 15–19. As best seen in FIGS. 15 and 16, each digit key 83 comprises a key stem 88 having a molded finger button or cap 89 removably mounted on the upper end thereof. Preferably, the button 89 is die-formed of a suitable plastic or plastics and comprises an interior key stem receiving portion 91 formed integrally with a hollow main body portion 92 having a covering or cap portion 93 adhered to the outer surface thereof, the upper end of the button being concave or depressed to fit the finger tip and carrying suitable digital indicia, as seen in FIG. 1, which may be incorporated therein in any suitable manner. If desired, alternate keys in each columnar unit may have their top surfaces depressed in different degree to facilitate touch operation, as is well-known in the art.

Each of the several key stems 88 in a columnar unit 82 is slidably mounted for limited vertical movement relative to the associated frame plate 87 by means of an upper key stem guide 94 and a lower key stem guide 95 mounted on the frame plate. As best seen in FIGS. 9, 15 and 17, the upper key stem guide 94 is permanently attached to the frame plate 87, as by means of suitable rivets 96 (FIG. 9), is bent laterally in a horizontal plane at its upper end, and is provided in that upper horizontal portion with a plurality of key stem receiving and guiding notches or apertures 97 (FIGS. 2 and 17) spaced longitudinally from each other at equal intervals to dispose the adjacent key buttons 89 in closely disposed relationship to each other. The lower key stem guide 94 is provided with suitable notches or apertures 98 (FIG. 2) aligned vertically with the apertures 97 to slidingly receive the lower portions of the digit key stems 88 (FIG. 15), and also is secured to the frame plate 87, as by means of rivets 99, or the like. An upper key stop plate 101 is secured in any suitable manner to the lower surface of the horizontal portion of the upper key stem guide 94 and terminates at its inner or right-hand edge in a downwardly bent vertical flange extending longitudinally of the machine and adjacent the several key stems 88. Each key stem is provided with a suitable upper stop means to limit upward vertical movement which, as best seen in FIG. 15, comprises a stud 102 riveted thereto and adapted to contact the lower edge of the vertical flange of the upper key stop plate 101. A similar lower stud 103, which extends laterally from the key stem a greater distance than the upper stud 102, is provided for cooperation with the associated ordinal stop 84 in a manner to be later described in detail and has an enlarged central portion or flange directly adjacent and contacting the key stem for engagement with the lower key stem guide 95 to limit downward movement of the digit key.

Suitable means are provided for preventing depression of more than one digit key at a time in the same order, comprising anchor locks 104 (FIGS. 9, 11, and 15) which are pivotally mounted, respectively, at their upper ends on the upper key stem guide 94, as by means of studs 105, and are guided at their lower portions for swinging movement by slidably engaging an annular groove in a guide stud 106, one of which is riveted to the upper key stem guide 94 in substantial vertical alignment with each of the pivot studs 105. Normally these anchor locks 104 hang in their inactive positions of FIGS. 3 and 9, with the ends of their lower portions in substantial abutting relationship to each other. Each key stem 88 is provided at a point spaced slightly below its upper stud 102 with a laterally extending protuberance, preferably in the form of an extruded wad 107. This wad, as best seen in FIG. 15, extends toward the frame plate 87 a sufficient distance to be vertically aligned with, and spaced between adjacent ones of, the associated anchor locks 104, the engagement of the latter with their guide studs 106 insuring such vertical registration and alignment of the anchor locks longitudinally of the machine. Upon depression of any one of the digit keys 83, its wad 107 will contact both of the adjacent anchor locks 104 and swing the same about their pivots 105 away from each other and into tight abutting relationship with the remaining anchor locks in the order, as illustrated in FIG. 11 where the No. 5 key is shown depressed. Such spreading movement of the several anchor locks 104 is limited by their contact with the wads 107 on the remaining key stems 88 in well-known manner, and this arrangement thus prevents depression of more than one digit key at a time in the columnar unit. While this digit key interlock mechanism functions in similar manner to those employed in previous machines, its radically different design simplifies and reduces the cost of manufacture, and the horizontal portion of the upper key stem guide 94 performs the additional function of properly spacing adjacent frame plates 87, in the manner best seen in FIGS. 2, 15 and 17. The specific shape or design illustrated for the key buttons 89 provides improved operating qualities and reduces the likelihood of "brush strokes" to a minimum.

Ordinal stops

The details of construction and mounting of the several ordinal stops 84 in each digital columnar unit 82 are best illustrated in FIGS. 3, 10, 11 and 18–22. As viewed from the front of the machine, the ordinal stops 84 are farthest from the associated frame plate 87, to the left thereof, of all of the several parts of the digital control and actuating means. As previously noted, one of these stops 84 is provided for actuation by each of the nine digit keys 3. To this end, all of the ordinal stops 84 are carried by a mounting plate 108 disposed just outside, or to the left, of the stop bar 85 (FIGS. 19-22) and having a depending ear portion adjacent each end secured to and mounted upon a shouldered stud 109 (FIGS. 11 and 22). As best seen in the latter figure, each of these studs 109 is suitably secured, as by riveting, at its inner or right-hand end to the associated frame plate 87, and is tapped at its outer end to receive a retaining screw 111 adapted to rigidly attach the mounting plate thereto. Similarly riveted adjacent the upper edge of the mounting plate 108 and extending outwardly therefrom relative to the associated frame plate 87 are a plurality of centrally shouldered pivot studs 112 (FIG. 22) each of which pivotally mounts an ordinal stop 84 adjacent the rear end of the latter. The front edge of each ordinal stop 84 is recessed at 113 (FIGS. 18 and 20) to accommodate and cooperate with a grooved retainer stud 114 which is riveted or otherwise suitably secured at its inner end to the mounting plate 108 (FIG. 19). This grooved stud 114 thus functions to limit pivotal movement of the ordinal stop 84 about its pivot stud 112 and also retains the ordinal stop against any possible side play or lateral motion. A grasshopper type of spring 115 has its central portion coiled around the projecting head of each ordinal stop pivot stud 112 and its lower leg engaged in a groove in the outer end of the associated retainer stud 114. The upper end of this spring 115 terminates in an inwardly bent portion which engages in a suitable aperture 116 (FIG. 18) in the upper portion of the associated ordinal stop 84. This upper portion of the stop 84 is formed as an inwardly extending shelf terminating in a downwardly extending front end portion 117 which is movable downwardly into an associated notch 118 provided in the upper edge of the stop bar 85, as shown in FIG. 11. It will be understood, of course, that the several ordinal stops 84 are identical with each other and that their pivotal mountings relative to the associated key stems are the same in each instance, but that the several digital notches 118 in the top bar 85 are of graduated length from one end of the bar stop to the other in a manner to be more fully described hereafter. The substantially horizontal portion of the inwardly extending shelf at the upper forward end of each ordinal stop bar 84, which terminates in the stop portion 117, slidingly cooperates with the lower surface of the outer end portion of the associated lower key stem stud 103. The spring 115 functions to retain the ordinal stop 84 in contact with this lower key stem stud 103 at all times and, in addition to its function of normally maintaining the ordinal stop in its raised, inoperative position, also returns a depressed digit key to normal raised position following release of digital pressure therefrom. By virtue of this arrangement of the several ordinal stops 84, mounting of the same may be accomplished as a unit, and accurate disposition thereof relative to their associated notches 118 in the stop bar 85 may be attained with great facility. The extremely difficult and expensive operative of mounting the several digit key stems within very close tolerances thus is eliminated. And during operation when one of the ordinal stops 84 receives the operating impact of the stop bar 85 and the parts connected therewith, the resulting inertia and shock are dissipated to the main mass of the columnar unit 82 through the mounting plate 108, instead of through the key stem, and therefore there is no transmission of any portion of this shock to the operator's finger. As best seen in FIGS. 18 and 19, the upper edge of the mounting plate 108 is notched at 119 between the portions thereof mounting the several pivot studs 112 in order to provide clearance for downward movements of the laterally extending stop portions 117 of the ordinal stops 84 between their normal raised position of FIGS. 18 and 19 and their operative or depressed position of FIGS. 20 and 21.

Stop bar

The ordinal stop bar 85 of each digital columnar unit is seen best in FIGS. 3, 10, 11 and 18-23. It extends longitudinally beyond the ordinal stops 84 and their mounting plate 108, and, as shown in FIG. 19, lies inwardly of the mounting plate. Adjacent its rear end (FIG. 10), the stop bar 85 is provided with a longtiudinally disposed slot 121 that slidingly engages the outer end of a shouldered stud 122. As best seen in FIG. 23, the other or inner end of the stud 122 is suitably secured, as by riveting, to the frame plate 87. The stop bar 85 thus is held slidingly between the outer flange or shoulder on the stud 122 and the mounting plate 108 in the manner shown in FIG. 22. At its forward end (FIGS. 3 and 10), the ordinal stop bar 85 is suitably pivotally connected at 123 to a gear segment lever or sector 124 which is part of the accumulator actuating mechanism.

Actuating mechanism

FIGS. 2, 3, 9, 11-14 and 18-22 illustrate the actuating mechanism, which includes the sector 124 pivotally mounted at 125 at its lower end on the left side of the frame plate 87 in a manner later to be described in detail with respect to assembling a plurality of columnar units 82 and, specifically, FIG. 64. The gear tooth or rack portion on the upper end of the lever or sector 124 actuates the drive transmitting means for imparting ordinal rotation to the numeral wheel corresponding to the value of any depressed digit key 83, in a manner to be described later. The upper end of the sector 124 terminates at its front side in an upwardly and forwardly extending overadd hook 126, the function of which also will be described hereinafter. Above its pivotal connection 123 with the stop bar 85, the segment lever or sector 124 is pivotally connected at 127 to the forward end of a compensator 128 which comprises a front link 129 slidably interconnected by pin and slot connections 131 with a rear link 132. A tensioned coil spring 133 is connected at its ends over suitable studs, respectively secured to the front and rear links 129 and 132, which normally retains the compensator in its shortest condition of FIG. 3, while permitting movement of the rear link 132 relative to the front link 129 limited by the pin and slot connections 131.

The rear end of the rear link 132 of this compensator 128 is pivotally secured at 134 to the upper end of a pull solenoid lever 135 which is pivotally mounted intermediate its ends at 136 on the frame plate 87. Between these pivots 135 and 136, the lever 135 is connected by a link 137 to the forward end of a plunger 138 of a pull solenoid 139 which is mounted on the frame plate 87 in any suitable manner. The lower end of the lever 135 extends rearwardly for cooperation with a plunger of a secondary column switch assembly 141 that is mounted on the frame plate 87. This switch assembly 141 (as best seen in FIG. 9) includes a set of spring contacts comprising a secondary push solenoid switch 142, and a secondary or delayed ten's carry switch 143. In the normal home or rest position of the lever 135 shown in FIGS. 3 and 9, its lower end holds the plunger of switch assembly 141 rearwardly against the action of the switch contact springs to maintain switch 142 open and switch 143 closed, while forward movement of the lower end of the lever 135 permits these contact springs to close switch 142 and open switch 143, as seen in FIG. 11.

Pivotally connected to the lower end of the pull solenoid lever 135 is the rear end of a slider or latch-tripping link 144 which is slotted adjacent its forward end for substantially horizontal sliding movement on a stud 145 mounted on the frame plate 87. A column switch actuator 146 is pivotally mounted at its rear end on this same stud 145 and comprises a laterally disposed shelf extending forwardly from its pivot 145 and overlying and resting upon the upper end of a plunger of a column switch assembly 147. The latter is mounted in any suitable manner on the frame plate 87 and, like the secondary column switch assembly 141, includes a set of contacts consisting of outer spring blades biased to urge the switch plunger upwardly and a common or center stationary blade which, together, comprise an uppermost, normally open, pull solenoid switch 148 and a lower, normally closed, push solenoid switch 149. Overlying and cooperating with the actuator 146 is the upper, stepped end (FIG. 13) of a column switch actuator latch lever or lock pawl 151 which is pivotally mounted on frame plate 87 in any suitable manner at its lower end at 152 (FIG. 9). A grasshopper spring 153 (FIG. 12) is coiled around pivot 152 with one of its ends engaged under column switch assembly 147 and the other bent to embrace the forward edge of the column switch latch lever 151 to urge the upper end of the latter rearwardly into contact with the front edge of column switch actuator 146. The normal, at rest positions of these parts are shown in FIGS. 3 and 9 and in broken lines in FIG. 13, and their actuated or active positions are shown in full lines in FIG. 13 and in FIG. 12. A stud 154 extends laterally from the frame plate 87 to limit upward movement of the column switch actuator 146 in the event of forward movement of the latch lever 151 out of contact with actuator 146, as illustrated in broken lines in FIG. 14.

Also overlying the laterally extending portion of the forward end of column switch actuator 146, but normally not engaged therewith, is the lower end of a switch bar pawl 155 that is pivotally mounted adjacent its upper end on a stud 156 secured to the rear end portion of a switch bar 157. As shown in FIGS. 12 and 14, a grasshopper spring 158 is coiled around the pivot stud 156, with one of its ends engaged under a laterally extending flange on the switch bar 157 (note FIG. 19), and its other end disposed under a stud 159 on the pawl 155, so as to urge the latter in a clockwise direction about its pivot 156 and resiliently retain the upper end of the pawl in movement-limiting engagement with the lateral flange on switch bar 157. As best seen in FIGS. 3, 9, 11, and 18-22, the switch bar 157 is disposed longitudinally below the several digit keys 83 with its laterally extending flange normally in contact with the lower ends of all of the key stems 88. Adjacent each end, the bar 157 is formed to pass beneath the studs 109 which support the mounting plate 108 and are disposed, respectively, between the Nos. 1 and 2, and the Nos. 8 and 9 digit keys. The switch bar 157 is mounted for vertical movement by means of two parallel arms 161 which are pivotally connected in any suitable manner to the bar at their upper ends and pivotally mounted at their lower ends on the frame plate 87. A grasshopper spring 162 (FIG. 9) is coiled about a mounting stud 163 extending from the frame plate 87 and has its upper leg engaged under tension within the groove in a peripherally grooved spring roll 164 rotatably mounted on the switch bar 157. The lower leg of spring 162 rests upon a stud 165 mounted on frame plate 87, so that the spring resiliently maintains the switch bar 157 in, and returns the same to, its normal raised position of FIGS. 3 and 9. A push solenoid 166 is secured in any suitable manner to the frame plate 87 to the rear of the stop bar 85 with its plunger 167 aligned therewith and contacting its rear end.

*Operation of columnar actuating means*

In response to depression of any one of the digit keys 83, the switch bar 157 is moved downwardly and, because of the arrangement of its mounting arms 161, that movement is in the nature of the movement of one leg of a parallelogram. Consequently, the switch bar pawl 155 depresses the forward end of the column switch actuator 146 to close the normally open pull solenoid switch 148 and open the normally closed push solenoid switch 149 of the column switch assembly 147. Closing of switch 148 energizes the pull solenoid 139 which imparts counterclockwise movement to the lever 135 (as viewed in FIG. 3) about its pivot 136 for a definite distance. Such movement of lever 135 is transmitted to the compensator 128 and by its link 129 to the sector 124. The latter in turn pushes the stop bar 85 rearwardly, since this action of the pull solenoid 139 swings the sector 124 about its pivot 125 in a counterclockwise direction, as seen from the left side of the machine in FIG. 3.

The depressed digit key 83 in the meantime has swung its associated ordinal stop 84 downwardly from the normal position of FIG. 18 to the active position of FIG. 20. This depression of that ordinal stop 84 has moved its depending front end 117 into the associated notch 118 of the stop bar 85. Consequently, that particular ordinal stop 84 so actuated by key depression determines the extent of rearward movement of the stop bar 85 by virtue of the contact resulting between the front end portion 117 of the stop and the forward edge of the associated notch 118. As best seen in FIG. 10, the several notches 118 in the stop bar 85 are of graduated lengths, increasing in successively increasing, equal increments starting with the rightmost notch, which cooperates with the stop 84 associated with the units or No. 1 digit key. The rear or leftmost notch is associated with the No. 9 key, and the rear end of each notch 18 is spaced the same distance from its associated stop flange 117. Thus, in view of the differences in lengths of these slots 118, depression of the No. 9 digit key will result in rearward movement of the stop bar 85 for a distance nine times that resulting from depression of the No. 1 key. Regardless of which digit key is depressed, the pull solenoid, its lever 135, and the rear link 132 of the compensator 128 will always have movements of the same extent imparted thereto. However, the resulting movements of the stop bar 85, sector 124, and front link 129 of the compensator will be for lesser distances, and the resulting differences between the movements of the links 129 and 132 will merely cause extension of the compensator spring 133. Of course, the parts preferably are so designed and dimensioned relative to each other that the links 129 and 132 are moved the same distance when the No. 9 digit key 83 is depressed.

As soon as the pull solenoid lever 135 moves away from its normal rest position of FIGS. 3 and 9, the normally open push solenoid switch 142 will be closed and the normally closed delayed ten's carry switch 143 of the secondary column switch assembly 141 will be opened, as illustrated in FIG. 11. The opening of the switch 143 is for the purpose of preventing a ten's carry into a receiving column during digital actuation in that column, so that the carry will not be lost. The closing of the switch 142 does not result in immediate energization of the push solenoid 166 because of the described previous opening of the switch 149 which is in series therewith, as will be apparent from the specific disclosure of the electrical wiring following hereinafter.

Depression of the forward end of the column switch actuator 146 about its pivot 145 from its normal raised positions of FIGS. 3 and 9, and that shown in broken lines in FIG. 13, results in the upper end of its latch lever 151 being moved rearwardly by the spring 153 to the position shown in full lines in FIG. 13 and in FIG. 12 to hold the column switches 148 and 149 in their closed and open positions, respectively. This insures identical and complete cycling of the actuating mechanism in response to any depression of a digit key even if such key operation comprises a "flicking" action. The column switch actuator is thus retained in depressed position by its latch lever 151 until the final increment of movement of the plunger 138 of the pull solenoid 139. As illustrated in FIG. 11, wherein the pull solenoid lever 135 and slider 144 have reached the limit of their active movement, the forward or nose end of slider 144 has moved latch lever 151 and switch bar pawl 155 from their positions of FIG. 12 to those illustrated in full lines in FIG. 14. This results in immediate reopening of the pull solenoid switch 148 and closing of the push solenoid switch 149. Since the members 151 and 155 may be moved to a greater extent from the impact from slider 144, as illustrated in broken lines in FIG. 14, stud 154 will then limit upward movement of the column switch actuator 146, which will permit automatic return of latch lever 151 to its normal position of FIGS. 3 and 9 by the spring 153 as the slide 144 is retracted from its most forward position of FIGS. 11 and 14. The movement of the switch bar pawl 155 by the slider 14 above described insures disengagement of its lower end from the column switch actuator 146. Thus, if the depressed digit key 83 has been held down by the machine operator, another cycle will be prevented from being initiated, because the spring 158 cannot return pawl 155 to its normal position over the switch actuator 146. This is due to the lower end of the pawl striking against the front edge of actuator 146, as shown in full lines in FIG. 14.

Immediately upon closing of switch 149 as above described, the push solenoid 166 is energized because at that point the secondary push solenoid switch 142 also is closed. Such energization of push solenoid 166 causes its plunger 167 to move forwardly, which returns the ordinal stop bar 85, section 124, and front link 129 of the compensator 128 to their normal at rest positions of FIG. 3. Since the pull solenoid 139 at the same time has been de-energized by the opening of switch 148, such forward movement of the front link 129 and the action of spring 133 will return the rear link 132, lever 135, plunger 138, and slider 144 to their normal positions of FIG. 3. It will be understood that the spring-actuated returning of the parts of the switch assembly 147 is so timed that pull solenoid switch 148 is opened before push solenoid switch 149 is closed. The final increment of rearward returning movement of the lower end of pull solenoid lever 135 returns the secondary switches 142 and 143 to their normally open and closed positions, respectively. Opening of switch 142 breaks the circuit to the push solenoid 166 and completes the operative cycle of the ordinal actuating mechanism. The resulting closing of switch 143 permits a delayed ten's transfer into that order from the next lower denominational order in a manner to be later described in detail. In addition to the advantages of this novel columnar actuating mechanism previously previously noted herein, it will be appreciated that rebounding of the parts at the end of the operative cycle will be prevented because the movement of pull solenoid lever 135 resulting therefrom will permit reclosing of the switch 142 to re-energize push solenoid 166. It also will be apparent that this arrangement of two solenoids eliminates the necessity of employing an actuator spring for returning the parts to normal position, as is customary in prior machines having reciprocating or uni-directional actuating mechanisms. Elimination of such a spring also results in a further decrease in the required size of the solenoids in addition to that which is effected by use of two solenoids rather than a single one of push-pull type. By using solenoids as the source of power for the actuating mechanism, maximum power is applied when it is most needed and a full and complete stroke is assured with a minimum application of force. For example, the push solenoid 166 will be delivering its maximum power as the actuated sector 124 reaches its normal home position. In comparison, if a spring were employed to return the actuating mechanism to normal position, it would be applying its minimum force to the sector as the stroke of the latter is completed. It will also be appreciated that this novel actuating mechanism results in a very rapid speed of operation which, in turn, enables a minimum length of key stroke to be employed.

*Drive transmitting means*

The mechanism for drivingly transmitting ordinal operation of the actuating mechanism, such as that above described, to the associated accumulator numeral wheel 86 now will be described and is illustrated in FIGS. 3, 8, 9, 11, 24–27, and 31–33. The teeth at the upper end of the gear segment lever or sector 124 of the actuating mechanism mesh (at all times) with a small gear 168 (FIGS. 3, 11, 31, and 32) which preferably has ten teeth and is mounted for rotation on a pivot stud 169 riveted into, or otherwise secured in any suitable manner to, the frame plate 87, as best seen in FIG. 32. An accumulator gear shell 171 is provided with a splined center hole which meshingly engages the gear 168. The gear 168 is staked or otherwise suitably secured to the shell 171 so that it functions as a hub for the shell. The peripheral portion of the shell is formed as a toothed flange to provide ten ratchet teeth 172 (FIG. 33), and may have a notched ring 173 (FIGS. 31 and 32) mounted thereon and secured in any desired way thereto for co-operation with a premature carry stop in a manner later to be described in conjunction with the ten's transfer mechanism.

Also rotatably mounted on the pivot stud 169 between an anchoring flange thereon and the inner end of the gear 168, as best seen in FIG. 32, is a twenty tooth accumulator gear 174. A pair of identical accumulator pawls 175 are pivotally mounted on the outer side of gear 174 on studs 176 which extend therefrom toward, and into the interior of, the shell 171 (FIGS. 32 and 33). The outer ends of the pawls 175 cooperate with the shell teeth 172 and are resiliently maintained in engagement therewith by springs 177 interconnected between their inner ends and studs 178. These ratchet pawls 175 and their pivot studs 176 are not spaced 180 degrees apart, but 180 degrees plus or minus 18 degrees from pivot center to pivot center, the 18 degrees being one-half the angle subtended by each shell tooth 172. Consequently, only one pawl at a time is in active driving engagement with a tooth 172, as is the uppermost one in FIG. 33. This arrangement enables the use of coarse teeth 172 on the shell 171 having 36 degree spacing, which facilitates manufacture of the shell and gives a stronger structure with lightweight material. As shown in FIG. 32, the gear and shell 168, 171 and the gear 174 preferably are held on the pivot stud 169 by means of a washer 179 and a "Tru-arc" retainer 171, which is a split ring engaging a suitable peripheral groove in, and near the outer end of, the pivot pin stud 169. The washer 179 and the outer vertical face of the shell 171 also function to guide the movements of the upper end of the sector 124 and prevent lateral shifting thereof.

This accumulator gear portion of the drive transmitting means functions to render inactive or idle the rearward movements of the sector 124 previously described, and to translate its following return or forward movements into incremental rotations of the accumulator gear 174 exactly corresponding in degree to the ordinal values of the digit keys 83 whose depressions caused them. Rearward movement of sector 124 about its pivot 125 rotates its meshing gear 168 and the accumulator shell 171 clockwise, as seen from the left side of the machine and in FIGS. 3, 11, and 33  This is an idle movement because the teeth 172 merely ratchet over the pawls 175. On the return stroke of the sector 124, the accumulator shell 171 is rotated thereby in a counterclockwise direction, viewing the left side of the machine and FIG. 33, and this causes one of the teeth 172 drivingly to engage one or the other of the accumulator pawls 175 to rotate the accumulator gear 174 in like degree. It thus will be understood that this twenty tooth accumulator gear 174 is always rotated in the same direction, namely counterclockwise as seen from the left side of the machine and in FIGS. 3, 8, 11, 24, 26 and 33.

Such ordinal actuation of the accumulator gear 174 is transmitted either positively or negatively, as illustrated in FIGS. 24 and 26, respectively, to the numeral wheel 86, that is, the numeral wheel is rotated either forwardly or backwardly thereby to register an ordinally corresponding plus or minus amount. As shown in those figures, the forward and backward rotation of the numeral wheel is accomplished through two separate gear trains. In addition to the accumulator gear 174, a main forty tooth gear 182 and an add-subtract or shiftable gear 183 having thirty teeth are common to both of these trains. The main gear 182 is rotatably mounted on a pivot stud 184 (FIG. 46) which is anchored in any suitable manner on the main frame plate 87. Rotatably mounted at the same center 184 as the main gear 182 is a thirty tooth gear 185 which is in the add gear train, the hub of the main gear 182 preferably being formed to rotatably mount this intermediate add gear 185 thereon. The gear 185 is constantly in mesh with both the accumulator gear 174 and a twenty tooth add idler gear 186 which, in turn, meshes with a twenty tooth over-add gear 187.

When the add-subtract gear 183 is in its normal add position of FIGS. 3 and 24, the counterclockwise rotations of accumulator gear 174 will be transmitted to the main gear 182 as clockwise movements thereof by the gears 185, 186, 187, and 183. This constitutes the add gear train of the drive transmitting means. When subtraction is to be performed, the add-subtract gear 183 is shifted to its position of FIGS. 8 and 26, in a manner later to be described, where it directly interconnects the gears 174 and 182 to drive the latter in a counterclockwise direction, the gears 174, 183, and 182 comprising the subtract gear train to the numeral wheel. A ten tooth gear 188 forming part of the numeral wheel assembly is constantly in mesh with the main gear 182, so that such clockwise and counterclockwise movements of the latter are translated, respectively, into counterclockwise or positive, and clockwise or negative, ordinal actuations of the numeral wheel 86.

As seen best in FIGS. 28–30, the gear 188 functions as a hub for the shell of the numeral wheel 86 and is rotatably mounted on a pivot stud 189 that is riveted, or otherwise suitably secured, at its inner end, to the frame plate 87. It is preferred that a "Tru-arc" ring and washer like the arrangement 181, 179 be employed to retain the numeral wheel on its shaft or stud 189. The inner end of the numeral wheel hub portion 188 comprises the ten tooth gear meshing with the main gear 182, and this same numeral wheel gear also is actuated by the ten's transfer and zeroizing mechanism, as will be described later. The gear 188 preferably is formed from pinion stock and its central portion may be cut away to reduce its weight, as shown in FIG. 29. The outer end of the gear or numeral wheel hub 188 also is somewhat reduced to form a serrated shoulder 191. The shell of numeral wheel 86 comprises a peripheral flange bearing the numerals on its outer surface and a vertical body portion having a splined bore that is laterally slidable onto, and meshingly engages, the outer reduced end of the gear 188. A washer 192 is interposed between the shell body and the shoulder 191 as a strengthening feature, and a numeral wheel aligner disc in the form of a star wheel 193 having a splined bore like that of the numeral wheel shell is similarly mounted on the outer reduced end of gear 188. The shell and these members 192 and 193 are rigidly secured in assembled position on the gear 188, preferably by staking-over against the star wheel 193 of the outer end of each of the teeth of the gear 188.

As shown best in FIG. 3, the star wheel 193 is engaged by the upper end of a numeral wheel aligner lever 194 which is pivoted intermediate its ends on the stud supporting the add idler gear 186. A spring 195 is secured to the lower end of lever 194 to keep the nose at the upper end thereof in ratcheting contact with the star wheel 193 at all times. It will be appreciated that the purpose of these parts 193–195 is to insure proper alignment of the numeral wheel 86 whenever it is at rest, but that aligning movement is impaired thereby to the numeral wheel only in an amount equal to, or less than, the total amount of free play in the numeral wheel gear train.

As shown in FIGS. 3, 8, and 9, and best seen in FIG. 11, the previously described over-add gear 187 is part of a unitary rotatable assemblage which also includes an inner back stop ratchet wheel 196 and an outer over-add ratchet wheel 197. Each of these ratchet wheels has twenty teeth, with their active or blocking faces on opposite sides, respectively. The upper hooked end of the over-add arm 126 of the sector 124 normally engages the outer ratchet wheel 197, as shown in FIG. 3, to prevent clockwise rotation of gear 187. It is disengaged from the ratchet wheel 197 as the sector 124 starts an idle rearward movement. During forward return to "zero" or rest position from its "one" position or the rearmost position assumed in response to depression of the units digit key, the hook 126 engages ratchet wheel 197 to prevent over-adding or over-running of the accumulator gear 174. A spring 198 may be attached as shown in FIG. 3 to the hook 126 to hold the same in normal at rest position in engagement with ratchet wheel 197 to prevent accidental disengagement when the machine is disconnected from its source of electrical energy. The inner ratchet wheel 196 is constantly engaged by a back stop pawl 199 (FIGS. 8, 9, and 11) which is pivoted at 201 and spring urged into such engagement by a suitable grasshopper spring 202. This back stop pawl 199 thus prevents counterclockwise rotation of gear 187 which prevents following movement of the accumulator gear 174 in response to rotation of the accumulator gear shell 171 during rearward movement of the sector 124. It will be appreciated that the accumulator gear 174 thus never is permitted to rotate in a clockwise direction, as viewed from the left side of the machine, nor in either direction when the hook 126 is in engagement with the over-add ratchet wheel 197.

*Means for shifting add-subtract gear 183*

The columnar means for shifting the add-subtract gear 183 between its forward add position of FIGS. 3 and 24 and its rearward subtract position of FIGS. 8 and 26 to cause positive or negative rotation of the numeral wheel 86 by the drive transmitting means in response to subsequent operation of the actuating mechanism is best illustrated in FIGS. 36 and 37, as seen from the right side of a columnar frame plate 87. The add-subtract gear 183 is pivotally mounted in any suitable manner on a stud 203 which extends through a clearance slot 204 (FIG. 36) in the frame plate 87 and is secured to, and carried by, a mounting lever 205. This lever 205 is pivotally supported near its upper end at 206 on the right-hand side of the frame plate 87, and adjacent its lower end and forwardly of the gear stud 203, it carries a laterally extending shifter stud 207. A movement-limiting stud 208 extends laterally from the forward end of the mounting lever 205 into an angularly disposed slot 209 in the frame plate 87 for determining the extreme add and subtract positions, respectively, that may be assumed by the mounting lever 205 and the pivot stud 203 carried thereby, as shown in FIGS. 36 and 37.

The means for shifting these parts between such positions comprises a main shifter piece 211 having a substantially centrally disposed and laterally extending hub rotatably mounted on a pivot stud 212, which extends outwardly from the frame plate 87, front and rear shifter arms 213 and 214, and a shifter spring 215. The shifter arms 213 and 214 are pivotally mounted at their lower ends on the outer surface of the laterally extending hub of the main piece 211 and, as best seen in FIG. 37, the main piece 211 has a lateral extension 216 disposed between, and normally engaging the inner edges of, the arms 213, 214 above their pivotal mounting. The spring 215 (FIG. 36) interconnects the arms to resiliently maintain them in such engagement with the main piece extension 216. Adjacent their upper ends, the arms 213 and 214 engage opposite sides of the shifter stud 207. The lower end of the main piece 211 is provided with an aperture 217 which receives a trans-columnar shifter rod 218 that will be described in greater detail hereinafter.

When the shifter rod 218 is moved in a manner later to be described from its position of FIG. 36 to that of FIG. 37, it swings the main shifter piece 211 in a clockwise direction about its pivot point 212, which causes the upper lateral extension 216 (FIG. 37) thereon correspondingly to swing the rearward shifter arm 214. This causes the shifter spring 215 to effect a following movement of the forward shifter arm 213 which, through the agency of the shifter stud 207, swings the mounting lever 205 in a counterclockwise direction about its pivot point 206. Such swinging of lever 205 is limited positively by engagement of the stud 208 with the rearward end of the slot 209, and causes swinging of the gear-mounting stud 203 rearwardly to roll the add-subtract gear 183 from its position of FIG. 24, where it normally is in mesh with the over-add gear 187, to its position of FIG. 26 in meshing engagement with the accumulator gear 174. It will be noted that the movement-limiting function of the stud 208 and slot 209 thus prevents bottoming of the teeth of the add-subtract gear 183 into the spaces between the teeth of the accumulator gear 174. This shifting of gear 183 was described as including a rolling movement because it remains at all times in mesh with the main gear 182 and, during such shifting action, the latter is held stationary. Conversely, when the shifter rod 218 is moved from its position of FIG. 37 to that of FIG. 36, the lateral extension 216 of the main shifter piece 211 carries the front shifter arm 213 forwardly to cause the spring 215 to impart a following movement to the rear shifter arm 214 to return the parts to their normal add positions of FIG. 36. This includes rolling of the add-subtract gear 183 on the main gear 182 from its position of FIG. 26 to that shown in FIG. 24. In either of these positions of the add-subtract gear 183, it will be appreciated that the spring 215 maintains the gear resiliently in meshing engagement with one or the other of the gears 174 and 187, and that the stud 208 and slot 209 prevent undesirable bottoming of the gears. The primary reason for constructing this shifter mechanism so as to apply resilient force to the pivot for the add-subtract gear 183 is to enable instantaneous detraining and re-engagement between the gears 183 and 187 or 174 to permit ten's transfer operations, in a manner to be described in detail hereinafter.

At the same time, means also are provided to establish positive gear train engagement during ordinal actuation. This means comprises a latch lever 219 (FIGS. 36 and 37) pivotally mounted in any desired manner at 221 on the column frame plate 87 and urged in a counterclockwise direction about that pivot by a suitable spring 222. Forwardly of the pivot 221 and point of attachment of spring 222, the latch lever 219 is provided with a slot 223 which engages a headed stud 224 secured to the frame plate 87 for guiding the pivotal movement of the lever 219. The forward end of this latch lever 219 terminates in a downwardly extending hook or nose portion 225 engageable behind the shifter stud 207 when the parts are in add position, as shown in FIG. 36, and adapted to hook over and engage the stud 207 forwardly thereof when the parts are in their subtract position of FIG. 37. The latch lever 219 thus positively maintains the add-subtract gear 183 in entrained position, for both positive and negative actuations of the accumulator. It has the additional function of enabling the spring 222 to assist the spring 215 during a shifting operation in either direction, the nose portion 225 being shaped so as to effect a camming action upon the shifter stud 207 as the latch lever 219 is returned by the spring 222 to its operative position of FIGS. 36 and 37.

It will be appreciated that a shifting operation of the add-subtract gear 183 may be effected by the shifter rod 218 only if the latch lever 219 first is moved to an inoperative position. This entails lifting of the nose portion 225 out of movement-blocking relationship with the shifter stud 207. Such clockwise movement of the latch lever 219 is accomplished during any add-subtract setting of the machine by a cam stud 226 cooperating with a cam surface 227 formed on the lower edge of the forwardly extending arm of latch lever 219 adjacent the slot 223 therein. This cam stud 226 is carried by a cam segment 228 which is pivotally mounted at its lower end on an extension of the pivot pin 125 for the gear segment lever 124. As best seen in FIG. 64, this pivot pin 125 is provided with a shouldered flange 229 intermediate its ends that is mounted in a suitable aperture in the column frame plate 87 and rigidly secured to the latter, as by means of upsetting the right-hand peripheral portion of that flange toward its shoulder and against the frame plate. The cam segment 228 has the rear end of a link 231 pivotally connected thereto in any suitable manner, and the forward end of that link is pivotally connected to the main shifter piece 211 for movement between the positions illustrated in FIGS. 36 and 37 by the shifter rod 218. The cam portion or surface 227 of the latch lever 219 is not in engagement with the cam stud 226 in either operative position of FIG. 36 or FIG. 37, the engagement between the nose portion 225 and the shifter stud 207 then preventing such engagement. As soon as the shifter rod 218 starts to move during a shifting operation, it will carry one or the other of the arms 213 or 214 with it, but the follow-up operation of the other shifter arm previously described and effected by the spring 215 will be prevented by the nose 225 of the latch lever 219. However, such shifting movement of the rod 218 through the agency of the link 231 will move the cam segment 228 between its positions of FIGS. 36 and 37 first to raise the nose of the latch lever 219 and then to permit its lowering by the spring 222, by virtue of the shape of the cam surface 227 and the cooperation of cam stud 226 therewith. In order to guide such shifting movement of the cam segment 228, the same is provided with a slot 232 cooperatively engaging a headed stud 233 that extends outwardly from the column frame plate 87. It also will be appreciated that the latch lever 219 prevents rebound or disengaging bounce of the add-subtract gear 183 from either gear 174 or gear 187 as the registering or forward return stroke of the sector 124 is completed. Its forward nose 225 is lifted to inoperative position to permit intentional shifting of the add-substract gear 183 in the manner above described, and it also is lifted in a different manner to permit a ten's transfer operation, which will be described hereinafter.

*Ten's transfer mechanism*

The mechanism for effecting selective positive or negative ordinal actuations of the numeral wheel 86 in desired degrees having been described, ten's transfer mechanism operable in response thereto for initiating carrying actuations of single units of value in the next higher denominational order, and for imparting such carry actuations in a given order as determined in the next lower denominational order, now will be detailed. This ten's transfer mechanism is illustrated in FIGS. 3–9, 24–27, 34–49 and 63.

In constant mesh with the main forty tooth gear 182, like the numeral wheel gear 188, and so as to remain in registry therewith and with the numeral wheel 86 at all times, is a ten tooth carry gear 234 (FIGS. 8, 24 and 26). As shown in FIGS. 34, 35 and 63, this gear 234 is formed with an elongated hub and a zero stop arm 235, which is operative only in a zeroizing operation and in a manner later to be described. Secured in any suitable manner to the outer end of the hub of gear 234 is a part, preferably of sheet metal, formed to provide a carry arm 236, with a transversely and outwardly extending end flange disposed substantially 90 degrees from the upper surface of zero stop arm 235, and a premature carry arm 237 having a transversely flanged end extending inwardly toward the associated frame plate 87. As shown in FIG. 63, this unitary assembly 234–237 is rotatably mounted on the left side of the frame plate 87 on a flanged pivot stud 238 that is similar to stud 125 (FIG. 64) and extends through a suitable aperture in, and is secured in any desired manner, to the plate 87. The assembly may be retained on the stud 238 by a conventional "Tru-arc" or split ring 181. With this arrangement, and as best seen in FIG. 63, the active portion of the carry arm 236 is disposed in the vertical plane of a carry switch pawl 239 disposed in the next higher or next-to-the-left denominational order.

As seen from the right side of the machine in FIGS. 40–45, this pawl 239 is pivotally mounted at 241 on the forward portion of a carry switch actuator 242 which is pivotally supported intermediate its ends on the frame plate 87 at 243. The rear end of the actuator 242 overlies and is held up by a plunger 244 of a main ten's carry switch 245. This carry switch 245 normally is open, its upper, movable contact spring holding the rear end of the actuator 242 raised, as shown in FIGS. 40 and 43, and it is mounted in any suitable manner on the right side of the frame plate. Intermediate its ends, the actuator 242 has an upward extension 246 engageable against a suitable stop on a pivot pin 247 to limit counterclockwise movement about its pivot 243, as shown in FIG. 40. The actuator 242 also has a lower extension or arm 248 adapted to be engaged by a zero lever later to be described. The upper portion of the actuator pawl 239 is provided with a slot 249 which slidably engages a pin 251 extending laterally from the upper end of a bell crank 252 that is pivotally mounted intermediate its ends on the frame plate. The lower end of this bell crank 252 is slotted to receive a shouldered stud 253 carried by a carry shifter link 254 that is pivotally connected at its lower end at 255 to the add-subtract mounting lever 205. Between its pivot 243 and its rear end, the carry switch actuator 242 is provided with a laterally extending shelf or latching finger 256 which cooperates with a stepped shoulder 257 on a carry timing latch 258. The latch 258 is pivotally mounted at 259 on the frame plate 87, and is urged in a latching or clockwise direction about its pivot, as seen from the right side of the machine and in FIGS. 40–42, by a suitable spring 261. At its rear end, the latch 258 is provided with a laterally extending headed stud 262 that extends through a slot 263 in the central portion of a carry timing latch release link 264. The forward end of link 264 has an aperture 265 for use in connection with zeroizing, as will be described later, and the link is provided at its rear end with a pivot pin 266 which is secured thereto in any suitable manner and extends toward the left of the machine through a guide slot 267 (FIG. 40) in the frame plate 87.

Figure 2:
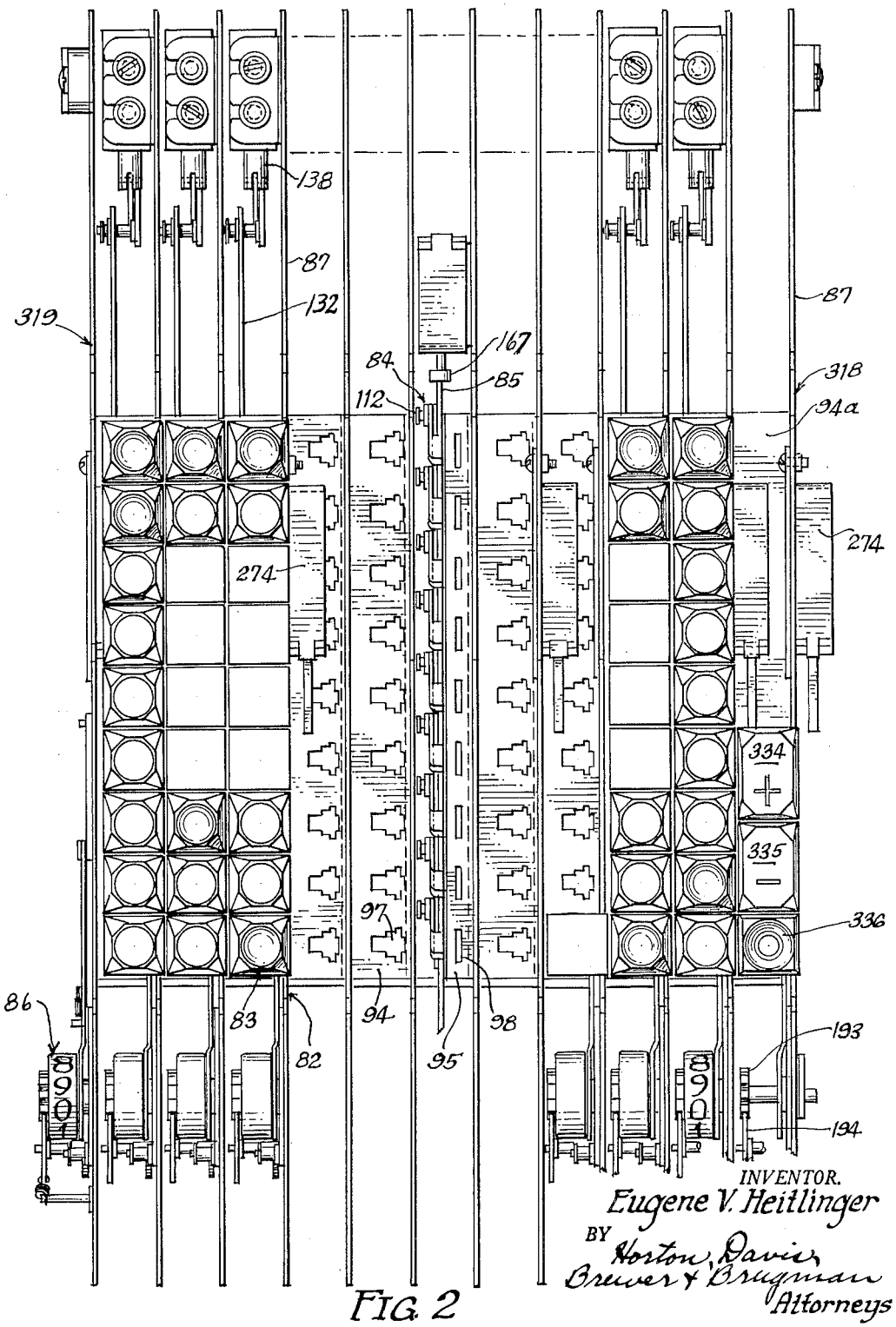
FIG. 2 is a plan view of the machine of FIG. 1 with the casing removed and parts omitted.

As shown in FIGS. 3 and 9, this pivot pin 266 extends to the left of the frame plate 87, terminates in a suitable head spaced therefrom, and pivotally interconnects the rear end of a carry striker 268 and the front end of a slide 269. The latter is mounted on the frame plate 87 for translational movements by suitable pin and slot connections 271, and is pivotally connected at its rear end by a pin 272, that extends laterally through a clearance aperture in the frame plate 87, to the forward end of a plunger 273 of a ten's carry solenoid 274. As seen in FIG. 2, the solenoid 274 is mounted in any suitable manner on the right side of the frame plate 87, and as shown in FIG. 36, the connecting pin 272 is attached to the rear end of a spring 275 and also cooperates with the upper end of a vertical extension 276 of the latch lever 219. The forward end of the spring 275 is anchored in any desired manner to the frame plate 87.

As shown in FIGS. 4–8, 38, 39, and 46, the forward end of the carry striker 268 is provided with an aperture peripherally surrounding the numeral wheel gear 188, normally spaced therefrom, and shaped to provide an upper tooth 277 and a lower tooth 278. Rearward movement of the striker causes one or the other of the striker teeth 277, 278 to rotate the numeral wheel 86 incrementally in a manner to be described later. The following means are provided for guiding such movements of the carry striker 268 and also for preselecting the resulting direction of rotation of the numeral wheel. Extending longitudinally along, and mounted on the inside surface or right side of the carry striker 268 is a carry striker shifting and guide spring 279. As best seen in FIGS. 46 and 47, the rear end of this spring is looped around and mounted on a stud 281 which is riveted or otherwise secured to the carry striker 268. The spring 279 comprises two forwardly extending legs and is held on the mounting stud 281 by a headed stud 282 extending through a suitable aperture in the carry striker 268 and removably secured thereto in any desired manner. The forward end portions of the legs of spring 279 are retained against lateral displacement by a headed stud 283 which is riveted or otherwise suitably secured to the carry striker. Disposed between the legs of the spring 279 is a carry shifter pin or guide stud 284 extending laterally from the rear end of a carry shifter lever 285. The forward end of the lever 285 is pivotally mounted on the frame plate at 286, as seen in FIGS. 9 and 38. The carry shifter lever 285 is pivotally connected near its rear end to the carry shifter link 254 by a pivot stud 287 which, as shown in FIG. 40, extends through a clearance aperture 288 in the frame plate 87.

The *operation of the ten's transfer mechanism* above described is as follows. Setting of the machine for positive or negative operations through the agency of the shifter rod 218, as has been noted hereinbefore, results in swinging of the add-subtract mounting lever 205 about its pivot 206 between its positions of FIGS. 36 and 40, on the one hand, and FIGS. 37 and 43 on the other hand. The resulting movement of link 254 and the pivot stud 287 will cause the carry striker 268 to be disposed either in its normal add position of FIGS. 6 and 46 or at its rest, subtract position of FIGS. 4, 38 and 43. At the same time, such movement of the shifter link 254 will dispose the carry switch actuator pawl 239 either in its add position of FIG. 40 or its subtract position of FIG. 43. In these latter two figures, the ten's carry arm 236 is represented diagrammatically to facilitate illustration of this mechanism. When the machine is set for addition with these parts arranged as shown in FIG. 40, the carry gear 234 and arm 236 will be rotating in a clockwise direction as seen therein. The illustrated position of the carry arm 236 in FIG. 40 is that which it will assume when its associated numeral wheel registers the digit "9." Consequently, any further additive actuation imparted to the operating mechanism and numeral wheel of that denominational order will result in the carry arm 236 lifting the carry switch actuator pawl 239 and its carry switch actuator 242 in the next highest or left-most denominational order to the position illustrated in FIG. 41. As shown therein, this resulting clockwise movement of the carry switch actuator 242 about its pivot 243 automatically results in the same being latched in its actuated position of FIG. 41 by engagement between its shelf 256 and the shoulder 257 on the carry timing latch 258. It will be appreciated that the carry arm 236 does not come to rest in the position shown in FIG. 41, but moves therepast to the position shown in FIG. 42, which represents the "0" indicating position of the associated numeral wheel. Such movement of the carry switch actuator 242 to its actuated position of FIG. 41 results in its rear end depressing the plunger 244 to close the main ten's carry switch 245. As will be detailed hereinafter in describing the wiring diagram for this machine, that main ten's carry switch 245 is connected in series with the auxiliary or delayed ten's carry switch 143 and the denominationally associated ten's carry solenoid 274. If the actuating mechanism in that denominational order thus being intended to receive a ten's carry actuation is in its normal, at rest postion so that the delay carry switch 143 is closed, the above-described closing of the main carry switch 245 results in immediate energization of the associated carry solenoid 274. The solenoid plunger 273 resultingly will be pulled rearward from its normal position of FIG. 36 against the action of its spring 275.

Through the agency of the pin 272 and slide 269 (FIG. 9), such energization of the carry solenoid 274 results in rearward movement of the carry striker 268. If the machine is set for adding operation, such movement of the carry striker 268 will be from its at rest position of FIG. 6 to its fully engaged or rearmost position of FIG. 7. These parts are illustrated in the same positions in FIGS. 46 and 47, respectively. Referring to FIG. 46, it will be noted that movement toward the rear of the machine, or to the left in that figure, of the carry striker 268 first causes engagement of the upper tooth 277 with the numeral wheel gear 188. Continued rearward movement of the carry striker, initially guided by the engagement of the guide stud 284 by the legs of the carry shifter spring 279, will result in a lifting of the rear end of the carry striker by virtue of the resulting camming action between the striker tooth 277 and the adjacent tooth of the numeral wheel gear 188. Such movement of the carry striker will be terminated when its lower tooth 278 arrives at the position shown in FIG. 47, wherein the two striker teeth 277 and 278 engage against opposite sides of diametrically opposed teeth of the numeral wheel gear 188. That movement of the carry striker from its normal, at rest posiion of FIG. 46 to its rearmost position of FIG. 47 resultingly imparts an incremental actuation to the numeral wheel gear 188 to the extent of 36 degrees rotation in a counterclockwise direction, as viewed from the left side of the machine. As will be appreciated, the rearmost position of the carry striker 268 thus provides an over-add control feature which positively prevents rotation of the numeral wheel gear to a greater extent than the single or unitary ordinal value desired.

It will also be appreciated that the arrangement of the carry striker spring 279 eliminates what otherwise would be extremely critical manufacturing tolerances for these parts. This is of particular importance when considering the shifting of the carry striker 268 from its normal, at rest add position of FIGS. 6, 40, and 46, to its at rest subtract position of FIGS. 5, 38 and 43. When the machine is set for subtraction, and a numeral wheel is in its "0" registering position, the carry arm 236 in that denominational order and the carry switch actuator pawl 239 in the order to the left thereof or the next higher denominational order will be disposed in their positions of FIG. 43. Further negative actuation in the lower of these two orders will result in counterclockwise movement of the carry arm 236, as viewed from the left side of the machine, through the position illustrated in FIG. 44 to move the carry switch actuator 242 to its active, latched position for closing the main carry switch 245. This results in rearward movement of the carry striker 268 from its subtract, at rest position of FIGS. 4 and 38, first to engage its lower tooth 278 with the numeral wheel gear 188 as shown in FIG. 5, and then into its rearmost or fully engaged position of FIGS. 39 and 45 which, so far as the carry striker is concerned, is the same as that resulting from additive actuation and illustrated in FIGS. 7 and 47. Of course, it will be appreciated that the resulting incremental actuation of the numeral wheel gear 188 will be in a negative direction, or clockwise as viewed in FIGS. 4 and 8. And whereas the carry striker spring 279 is tensioned or spread during rearward movement of the striker from its position of FIG. 46 to that shown in FIG. 47 by virtue of the resulting lifting of the guide stud 283 while the carry shifter pin 284 remains stationary, the spring 279 similarly will be tensioned as a result of the downward movement of the stud 283 during a subtractive carry operation as these parts are moved from their positions of FIG. 38 to those shown in FIG. 39. At the same time, the arrangement of these parts, and particularly of the carry striker spring 279, facilitates shifting of the carry striker 268 during setting of the machine for postive or negative operations without requiring the extreme accuracy of manufacture that would be necessary were such connections nonresilient.

As previously noted, if the normally closed delayed ten's carry switch 143 in the order receiving or intended to receive a ten's carry actuation is open because its associated pull solenoid lever 135 is not in its normal, at rest position, movement of the carry switch actuator 242 to its active, switch closing position by the carry arm 236 of the next lower denominational order cannot result in immediate energization of the ten's carry solenoid 274. The ten's transfer operation so initiated, however, will not be lost, since the carry switch actuator 242 will be retained in its active position by the carry timing latch 258 until the associated solenoid 274 has been energized. Under such conditions, this will take place immediately upon the denominationally associated pull solenoid lever 135 returning to its rest position of FIG. 3 to close the auxiliary or delayed carry switch 143. Actuation of the solenoid plunger 273 in response to energization of the solenoid 274 effects counterclockwise movement of the carry timing latch 258 from its active position of FIG. 41 to its inactive position of FIG. 42 to release the carry switch actuator 242 and enable the upper blade of the main ten's carry switch 245 to separate itself from the lower blade and to return the switch actuator 242 to its normal position through the agency of the plunger 244. Such actuation of the carry timing latch 258 is accomplished during the final increment of rearward movement of the carry solenoid plunger 273 through the agency of the link 269, pin 266, link 264, and stud 262, as best seen in FIG. 42. Immediately upon such opening of the main ten's carry switch 245, the solenoid 274 will be de-energized and the spring 275 will return the plunger 273, link 264, and carry striker 268 to their normal forward, at rest positions. Of course, such automatic release of the carry switch actuator 242 will be effected in identical manner regardless of whether the carry or transfer operation involved is positive or negative.

As will be appreciated from the earlier description of the function of the latch lever 219 to maintain the add-subtract gear 183 in its entrained positions of either FIG. 24 or FIG. 26, and the resulting immobilization of the actuating gear train by virtue of engagement of the hook 126 with the over-add ratchet wheel 197 and of the back stop pawl 199 with the ratchet wheel 196, such ten's transfer actuation of the numeral wheel gear 188 is incapable of physical accomplishment, unless the latch lever 219 is moved to release position from its active positions of either FIG. 36 or FIG. 37. Such release of the latch lever 219 or rendering the same inoperative is accomplished in response to the initial increment of active rearward movement of the plunger 273 of the ten's carry solenoid 274 from its position of FIG. 36, and through the agency of the connecting pin 272 striking the upper end of the vertical arm 276 of the latch lever. The nose 225 of the latch lever 219 thus is lifted and maintained in inoperative position until the final increment of the return or forward movement of the plunger 273 by the spring 275 after the ten's carry actuation has been effected. Consequently, during an additive ten's transfer actuation, the previously described incremental rotation of the numeral gear 188, which is in a counterclockwise direction as viewed from the left side of the machine, will correspondingly incrementally rotate the main gear 182 in a clockwise direction from its position of FIG. 24. Because the gear 187 is then being held stationary as above noted, such rotation of the main gear 182 will carry the add-subtract gear 183 from its position of FIG. 24 to that shown in FIG. 25. This will be against the action of the shifter spring 215, since it entails a swingng movement of the mounting lever 205. In the meantime, the numeral wheel 86 has been rotated through an angle of 36 degrees to dispose the nose of the aligner lever 194 in engagement with the next succeeding tooth space of the numeral wheel aligner star wheel 193. The spring 195 is of sufficient strength to retain the numeral wheel in such new position during forward return of the carry striker 268 to normal position. During the latter part of such return movement of the carry striker, spring 222 is permitted to return the latch lever 219 to its active position of FIG. 36. During that return movement of latch lever 219, its nose 225 functions to assist the spring 215 in returning the add-subtract gear 183 from its position of FIG. 25 to that of FIG. 24. During such movement, the main gear 182 is being held stationary as previously noted, so that the gear 183 rolls thereon and back into meshing engagement with the over-add gear 187. However, such re-engagement will be angularly displaced relative to the preceding engagement of those gears an amount equal to the angle subtended by one gear tooth. Release of the latch lever 219 is effected in identical manner during a subtractive or negative ten's carry operation. Of course, the add-subtract gear 183 is disposed in engagement with the accumulator gear 174, as shown in FIG. 26, when the machine is set for subtraction. Inception of a ten's carry under those circumstances will release the latch lever 219 as above described and result in clockwise rotation of the numeral wheel gear 188. This causes swinging of the add-subtract gear 183 from its position of FIG. 26 to that shown in FIG. 27, since the gear 174 is held stationary and thereby prevents rotation of the gear 183 in response to the incremental rotation thereby applied to the main gear 182. Upon completion of this negative carry actuation, the latch lever 219 is permitted to be returned to its operative position of FIG. 37 by its spring 222 which, together with the shifter spring 215, returns the mounting lever 205 to its normal subtract position. This causes a rolling of add-subract gear 183 about the main gear 182 and back into mesh with the accumulator gear 174 from its detrained position of FIG. 27. As in the case of a positive ten's transfer, the teeth of gear 183 thus are remeshed with those of gear 174 in a position displaced angularly from the meshed position thereof before the transfer actuation in an angular degree equal to that subtended by one gear tooth.

When accumulative actuation of a numeral wheel is such as to bring the associated carry arm 236 to a stop just before its "carry-kickoff" point, normal back-lash or play in the gear train from the pawl-restrained over-add gear 187 to the carry gear 234 might be sufficient to permit the carry arm 236 to move to its "carry-kickoff" point and effect a premature carry, if the carry arm contacted an integral portion of the carry switch actuator 242. That is why the pawl 239 is provided on the actuator 242 for shifting to its two different positions of FIGS. 40 and 43 when the machine is set, respectively, for addition or subtraction. With such an arrangement, both the angular distance of travel of the carry arm 236 from its "9" position of FIG. 40 toward it active "carry-kickoff" position of FIG. 41 during addition, and its angular distance of travel from its "0" position of FIG. 43 toward its active position of FIG. 44 during subtraction, that is required to effect closing of the main carry switch 245, may be a maximum portion of its incremental rotation between adjacent ordinal positions. Then the play in the gear train will not be sufficient to enable a premature carry either during addition or substraction. If the shiftable pawl 239 is not used, and a forwardly disposed and downwardly extending nose formed as an integral part of the actuator 242, as shown in FIGS. 48 and 49, is that part contacted by the carry arm 236 in the next lower denominational order, it is difficult to so position that nose between the "9" and "0" positions of carry arm 236 as to eliminate premature carrying in both addition and subtraction. As seen in FIG. 48, carry arm 236 rotates counterclockwise during addition. As explained above, when additive ordinal actuation is effected that is supposed to stop the arm 236 in its "9" position (rightmost in that figure), gear train play may permit inertia to carry the arm 236 to its dotted line position of FIG. 48 to lift the forward end of actuator 242 and close the carry switch. At the same time, during subtractive ordinal actuation when the carry arm 236 is supposed to stop in its "0" position 236a, as it is rotating in a clockwise direction viewing FIG. 49, the same degree of free movement thereof by virtue of gear train play to its broken line position of FIG. 49 would not be sufficient to move the actuator 242 to initiate a premature carry.

Means may be provided to insure against the premature carry action of the carry arm 236 during additive actuation, as illustrated in FIG. 48, which includes the ring 173 previously described as being mounted upon the accumulator gear shell 171. As shown in FIG. 3, this ring 173 is provided with a notch 289 which is disposed below the depending end of a premature carry stop lever 291 when the actuating mechanism and sector 124 are in their normal, at rest positions. As better illustrated in FIG. 46, this lever 291 is pivotally mounted on the frame plate at 292, and is urged in a clockwise direction about that pivot, as seen from the left side of the machine, by a suitable coil spring 293 (FIGS. 3 and 11). This lever 291 is provided with a forwardly extending arm 294 (FIG. 46). When the actuating mechanism comes to rest so that the notch 289 of the ring 173 is in registry with the depending end of lever 291, the spring 293 will move the lever 291 to its active position of FIG. 46, wherein the arm 294 is disposed in the path of movement of the premature carry arm 237 which is formed integrally with the carry arm 236. The arm 294 thus blocks the arm 236 against movement beyond its "9" position and a premature carry cannot take place. As also will be seen best in FIG. 46, the left edge of the notch 289 in the ring 173 is sloped to provide a cam surface. During the next ordinal actuation, the ring 173 will be rotated initially in a clockwise direction, as viewed from the left side of the machine in FIG. 46, by the initial rearward movement of the sector 124. This cam edge of the notch 289 therefore will raise the depending arm of lever 291 against the action of its spring 293 to an inoperative position with respect to the premature carry arm 237, and the peripheral portion of the ring 173 will retain the premature carry lever 291 in such inoperative position until return of the gear sector 124 forwardly to its normal position. Before arriving at that position, it will be appreciated that the resulting return in a counterclockwise direction of the ring 173 will permit swinging of premature carry stop lever 291 to its active position of FIG. 46 before the carry arm 236 reaches its intended terminal position resulting from that particular ordinal actuation. Therefore, if that intended terminal position is the "9" position of FIGS. 46 and 48, the arm 294 of lever 291 will be dropped into the path of movement of the arm 237 before carry arm 236 reaches such position. If a ten's transfer operation is initiated from the next lower denominational order when these parts in the carry receiving order are in their position of FIG. 46, the resulting rearward movement of the carry striker 268 will cause the stud 282 of the carry striker to contact the upper portion of the premature carry stop lever 291 to swing the latter in a counterclockwise direction about its pivot 292 to the fully released position of FIG. 47. Such release of the arm 237 from being blocked by the arm 294 of the lever 291 will be effected just before driving contact of the striker tooth 277 with the numeral wheel gear 188, so that the latter may be rotated in normal fashion by the carry striker 268. As shown in FIG. 47, this resulting incremental rotation of the numeral gear 188 causes a similar rotation of the ten's carry gear 234 to move the arm 237 past the lower end of arm 294.

From the above description of the ten's transfer mechanism and its operation, it will be appreciated that the provision of an independent source of power (the solenoid 274) to effect such transfer operations materially reduces the power requirements of the ordinal actuating mechanism and, together with the novel features of the latter, provides the basis for the completely independent columnar design of the instant machine. As a result, any desired number of columnar units may be assembled together. The locking of the shiftable add-substract gear 183 in either of its operative positions by the latch lever 219 and the above-described automatic release of the latter by a ten's carry solenoid 274 during a ten's transfer operation eliminates what otherwise would be the necessity of releasing the detenting of the gear train to permit a ten's transfer operation, while maintaining constant engagement between the gear sector 124 and the gear 168. It will also now be better appreciated how and why this novel columnar mechanism makes direct substraction possible in a calculating machine having uni-directional or non-reversible actuating mechanism. And it also will be understood more clearly why a machine embodying this ten's transfer mechanism has an outstandingly rapid speed of operation.

*Zeroizing mechanism*

When it is desired to clear the accumulator in the machine comprising the illustrated embodiment of this invention, depression of a zero control key sets the machine for subtraction or negative actuation, in a manner later to be described in conjunction with the disclosure of the multi-denominational control mechanism, and also sets the ten's transfer mechanism in each order into repeat operation. The ten's carry mechanism resultingly is repeatedly operated in each column to impart successive incremental rotations of units value negatively to the associated numeral wheel until the same is returned to its "0" position, whereupon operation of the ten's transfer mechanism automatically is stopped.

Pivotally mounted on the right side of each frame plate 87, as seen in FIG. 40, on the previously mentioned pivot pin 247 is the upper end of a zeroizing repeat lever 295. Intermediate its ends, this lever 295 is provided with a shelf portion or lateral extension 296 which passes to the left of the machine through a suitable aperture 297 in the associated frame plate 87 for cooperation with the zero stop arm 235 in that denominational order in a manner hereinafter to be described. The lever 295 also is provided intermediate its ends with a pin 298 extending laterally therefrom to the right and disposed within the previously described aperture 265 in the front end of the carry timing latch release link 264. Secured to the depending end of the zeroizing repeat lever 295 is the upper end of a coil spring 301 that is attached in any suitable manner at its lower end to the frame plate 87, as shown in FIG. 36. The several frame plates 87 each are provided with a keyhole-shaped aperture 302 (FIGS. 3 and 36) to receive, and to facilitate mounting of, a transordinal zeroizing control shaft 303 (FIG. 40) which is provided in each denominational order with a rearwardly extending pin 304 normally adapted to engage the depending end of the associated lever 295 to retain the same against the action of its spring 301 in an inoperative raised position, as illustrated in FIG. 40.

Depression of the zero-control key results in clockwise movement of the control shaft 303 and dropping of its pins 304, in a manner later to be described specifically in conjunction with the disclosure of the multi-denominational control mechanism. Such dropping of each pin 304 releases its associated zeroizing repeat lever 295 for clockwise swinging about its pivot pin 247 by the spring 301. This results in pin 298 striking against the depending finger or lower extension 248 of the carry-switch actuator 242 to swing the latter clockwise about its pivot 243 to close the associated ten's carry switch 245. The resulting energization of the ten's carry solenoid 274 will effect an incremental rotation of the numeral wheel in that denominational order to the extent of a single unit of value will be in a negative direction, because of the previously noted automatic setting of the machine for subtraction in response to depression of the zeroizing key. The resulting rearward movement of the associated carry striker 268 (to the right in FIG. 40) will cause sufficient counterclockwise movement to be imparted to the zeroizing repeat lever 295 against the action of its spring 301 to release the carry-switch actuator 242 to open the switch 245 and de-energize the solenoid 274. This rearward or release movement of the zeroizing repeat lever 295 is effected during the final rearward incremental movement of the carry striker 268 by means of the forward portion of the aperture 265 in the link 264 contacting and carrying rearwardly the pin 298. The resulting de-energization of the solenoid 274 permits its associated spring 275 to return the parts of the ten's transfer mechanism to their normal positions of FIG. 40. Since the associated pin 304 is still in its lowered or inoperative position, such return of the link 264 will permit initiation of an immediately succeeding ten's carry operation by operation of the switch actuator 242 by the repeat lever 295 and its pin 298 in response to the forward swinging of the depending end of the lever by its spring 301. Consequently, repeated negative carry actuations are continued until the numeral wheel 86 thus incrementally negatively rotated is returned to its "0" position. At that point in this zeroizing operation, the zero stop arm 235 will have been returned in a clockwise direction, as seen from the left side of the machine, into its operative or active position of FIG. 50. In that location, the zero stop arm 235 prevents the above-described automatic forward movement of the depending end of the zeroizing repeat lever 295 by its spring 301. Consequently, the repeating ten's carry operation automatically is stopped independently in each denominational order when the numeral wheel 86 in that order has been returned to "0" position. It will be understood, of course, that if any numeral wheel is in its "0" position when the zeroizing control key is depressed, the zero stop arm 235, being disposed in the position illustrated in FIG. 50, will prevent movement of the associated zeroizing repeat lever 295 sufficient to effect closing of the switch 245 in that denominational order. It will be better appreciated now why the use of an independent source of power in each columnar unit for effecting ten's transfer reduces the power requirements of the actuating mechanism to a minimum. This result of minimum energy requirements particularly follows use of that same ten's transfer mechanism for zeroizing, because only sufficient power is needed to move the numeral wheel through one incremental step, rather than nine.

MULTI-DENOMINATIONAL MOUNTING AND CONTROL MEANS

Any number of the ordinal columnar units 82 hereinbefore described may be mounted in side-by-side relationship, as illustrated in FIG. 2, to provide a calculating machine of desired capacity. In such assembly of the columnar units, the pivot pin 125 for the sectors 124 and segment cams 228, and the pivot studs 238 for the ten's carry gear and arm and zero stop assemblies 234–237 function as guide and aligning means for the forward portions of these units. As shown in FIGS. 63 and 64, each of the pivot members 125 and 238 is provided with an axial aperture or socket 305 in its right-hand end for slidably receiving the left-hand end of the pivot members 125 and 238, respectively, in the next lower or right-most denominational order. Means also are provided for similarly guiding the rearward portions of the columnar units into, and aligning the same in proper transordinal relationship. As shown in FIGS. 3 and 62, this means comprises top and bottom jack plugs 306, the left end of each of which is formed with an axial aperture or socket for frictionally receiving the reduced and longitudinally slotted right-hand extension 307 of the associated jack plug in the next higher or left most denominational order. Each jack plug 306 is provided with a flange 308 intermediate its ends against which abuts a male or flanged insulator ring 309 that is frictionally mounted on the inner part of the reduced portion of the plug. This male insulator 309 projects into and engages a suitable aperture in the frame plate 87, and the reduced portion 307 of the plug extends laterally to the right of the frame plate. The inner portion of this extension 307 is outwardly threaded to receive a female insulator 311 which functions as a nut and is screwed up against the frame plate 87 to retain the jack plug in proper position on, and electrically insulated from, the frame plate. Thus, in addition to insuring proper alignment and guiding of the rearward portions of adjacent columnar units during their assembly, engagement of the slotted portions 307 with the axial socket of the associated plug in the next lower order provides for conducting electric current to the solenoids 139, 166 and 274.

A selenium rectifier 312 (FIG. 3) of well-known construction is electrically interconnected between the jack plugs 306 and the three solenoids 139, 166 and 274 in each columnar unit in the following manner. As best seen in the wiring diagram of FIG. 71, the top D.C. contact 313 of the rectifier is connected to one end of each of the pull solenoid 139, the push solenoid 166, and the ten's carry solenoid 274, while the lower D.C. contact 314 of the rectifier is connected to the common middle contact of the column switch 147. A.C. contacts 315, preferably of the spade type, connect the rectifier 312 to the jack plugs 306 which, in turn, are connected by leads 316 to a suitable source or supply 317 of alternating current.

With particular reference to FIG. 71, it will now clearly be understood how the operation of these electrical components in any given columnar section is effected. The switches 142, 148 and 245 normally are open, and the switches 143 and 149 normally closed, as shown therein. Consequently, the circuits through any of the solenoids 139, 166 and 274 normally are open. When the main column switch 147 is depressed, in addition to opening the switch 149, the resulting closing of column switch 148 completes a circuit from the A.C. source 317 through the conductor 316, jack plug 306, the denominationally associated rectifier 312, its D.C. contact 313, the pull solenoid 139, switch 148, D.C. contact 314, and rectifier 312 back to the negative side of the A.C. source. As previously explained, this results in closing of the secondary push solenoid switch 142 and opening of the normally closed delayed ten's carry switch 143, neither of which has any immediate effect, unless the switch 245 in the meantime has been closed in response to the attempt to effect a ten's transfer into that denominational order. Completion of the rearward movement of the plunger 138 of the pull solenoid 139, as previously described, causes release of the column switch 147 for return to its condition of FIG. 71, wherein switch 148 is open and switch 149 closed. The opening of switch 148 de-energizes pull solenoid 139 and is accomplished slightly in advance of the closing of switch 149. The latter results in energization of the push solenoid 166 through a circuit from the D.C. contact 313 of the rectifier 312 to solenoid 166 and from the latter through switches 142 and 149 back to the rectifier. As the resulting movement of the plunger 167 of push solenoid 166 is completed, the secondary column switch assembly 141 will be returned to its normal condition of FIG. 71. This includes opening of the secondary push solenoid switch 142 which immediately de-energizes the push solenoid 166. At the same time, the closing of the delayed ten's carry switch 143 will trigger a previously received ten's carry action or enable a ten's carry into that order in response to closing of the carry switch 245. This causes energization of the ten's carry solenoid 274 by completing a circuit from the D.C. contact 313 of the rectifier 312 through the solenoid and switches 245, 143 and 149 back to the rectifier.

The use of the rectifiers 312 enables operation of the machine on both alternating and direct current. The use of direct current solenoids saves space and weight, since D.C. solenoids producing the necessary power are smaller than the alternating current solenoids which would be required for the same power output. As previously noted, the separate solenoid 274 for effecting ten's transfer and zeroizing, instead of storing and using excess power from the actuating mechanism for performing those functions, results in a minimum power requirement for the actuating mechanism. Also, use of the two solenoids 139 and 166 minimizes space requirements and power consumption, as compared to use of a single solenoid and a spring extended thereby for subsequently returning the parts to normal position. And, with the mechanism herein disclosed, there are no limitations on the number of columnar units 82 which may be assembled together.

In addition to the selected number of standard columnar units 82, the complete machine includes a control columnar unit 318 at the right side (FIG. 2), and preferably an overflow columnar unit 319 at the left side. The latter is a stripped standard columnar unit, retaining only the numeral wheel 86 and its aligner 194 and main gear 182 (FIG. 60), the ten's transfer and zeroizing mechanisms and a rectifier 312, and adding an add solenoid 321. Aside from the latter, the sole objects of this overflow columnar unit 319 are to receive ten's transfers from the next lower denominational order, and to zeroize itself when required. The add solenoid 321 is mounted in any suitable manner on the standard frame plate 87 employed in this overflow columnar unit, and is electrically connected to its rectifier 312 through a control switch later to be described. The plunger of the solenoid 321 is connected by a link 322 to a rocker arm 323 that is pivotally mounted on the frame plate at 324. A forwardly extending link 325 interconnects the rocker arm 323 and the left end of the transcolumnar shifter rod 218. When energized, the add solenoid 321 thus will draw the shifter rod 218 rearwardly from its subtraction position of FIG. 61 to its addition position of FIG. 60.

*Control column*

The control columnar unit 318 is best illustrated in FIGS. 1, 2 and 51–59, and is mounted on a frame plate 87 similar to that of the standard columnar unit 82. The control unit 318 includes a modified numeral wheel assembly (FIG. 2) which omits the numeral wheel shell but employs the numeral wheel gear and its star wheel 193 and aligner 194 (FIG. 51). The main gear 182 also is included, and on its right side (FIG. 54), this control unit 318 carries the standard add-subtract shifter, mounting and rebound latch mechanisms. The standard ten's carry and zeroizing mechanisms also are included, except that a modified gear 234a having fifteen teeth is substituted for the standard ten tooth carry gear 234. Since a major portion of the ordinal gear train and its over-add and back stop detents are omitted, release of the rebound latch lever 219 during each operation of the carry solenoid 274 in zeroizing is not necessary, so that it is preferred to modify the latch lever 219 in this control column by eliminating the extension 276 at the rear end of the regular lach lever 219. As shown in FIG. 54, subtract solenoid means, preferably in the form of two subtract solenoids 326 arranged in tandem to operate together, are mounted in any suitable manner on the outer or right-hand side of the frame plate 87 of the control unit 318. These are push-type solenoids having their plungers axially aligned, with the forward end of the plunger of the front one abutting a laterally extending face or flange of a lever 327 pivotally mounted at its lower end in any suitable manner at 328. As best seen in FIG. 59, the flange of this lever 327 also cooperates with a roll 329 on a rocker arm 331 that is pivotally supported by the frame plate 87 at 332. A link 333 pivotally interconnects the rocker arm 331 and the right-hand end of the transcolumnar shifter rod 218. As an electrical safety factor, individual rectifier 312 (FIG. 51) are provided for each subtract solenoid 326, and the extra rectifier is connected to auxiliary jack plugs 306a which, in turn, are connected to the regular jack plugs 306 as shown in FIG. 54.

Referring again to the left side of the control columnar unit 318, as seen in FIG. 51, three control keys, comprising an add key 334, a subtract key 335, and a zero key 336, are mounted thereon by means of a modified upper key stem guide 94a and upper key stop plate 101, and slots in the lower ends of their key stems that cooperate with headed studs 337. Suitable springs 338 normally maintain these control keys 334-336 in their raised positions, and anchor locks 104 are mounted on the key stem guide 94a, as previously described relative to the ordinal columnar units 82, to prevent depression at any one time of more than one of the keys 334, 335 and 336. The key stem guide 94a also preferably is modified in providing apertures only for the three control keys 334-336 and having an otherwise imperforate horizontal portion (as shown in FIG. 2). Disposed below the add and subtract keys 334 and 335 and pivotally mounted intermediate their stems at 339, is a cross-shaped switch lever 341. The substantially horizontal arms of lever 341 are each provided with a pad disposed below, and adapted to be contacted by, the lower end of the stem of the control keys 334, 335, respectively. Consequently, depression of the add key 334 will rock lever 341 in a counterclockwise direction about its pivot 339, as viewed from the left side of the machine, from its normal position of FIG. 51 to that of FIG. 52, and depression of the subtract key 335 will rock the lever 341 oppositely, or clockwise, from its position of FIG. 51 to that of FIG. 53.

As shown in FIG. 52, such depression of the addition key 334 causes the rear arm of lever 341 to close a normally open add shifter solenoid switch 342. And depression of the subtraction key 335, as seen in FIG. 53, causes the front arm of lever 341 to close a normally open subtract shifter solenoid switch 343. Means are provided for locking the switch lever 341, in either of its active or actuated positions of FIG. 52 or 53, and for preventing any attempted movement thereof by subsequently depressing the subtract control key 335 or the add control key 334, respectively, until completion of the resulting shifting action, regardless of whether or not the initially depressed control key is manually maintained in its lower position or merely was given a "flip" stroke. This means for locking the switch lever 341 in active position comprises a rear pawl 344 and a front pawl 345 pivotally mounted on the frame plate 87, respectively, at 346 and 347, and having their depending arms interconnected by a coil spring 348. The upper arms of these pawls 344 and 345 extend substantially horizontally from their respective pivots toward each other and are provided at their upper end surfaces with latching notches normally disposed below and engageable with a transversely extending shelf 349 formed on the lower end of the depending arm of the switch lever 341. With this arrangement, depression of the addition control key 334 to swing the switch lever 341 into its position of FIG. 52 results in lifting of the latching end of the rear pawl 344 by the spring 348 into locking engagement with the shelf 349, which will retain the switch lever in that actuated position regardless of whether or not pressure is maintained on the add key 334. Similarly, depression of the subtraction control key 335 to rock the switch lever 341 to its actuated position of FIG. 53 enables the spring 348 to lift the latching arm of the front pawl 345 into locking engagement with the shelf 349. Closing of the switch 342 as a result of depression of the add control key 334 to its position of FIG. 52 energizes the pull-type add solenoid 321 to effect a rearward movement of the transordinal shifter rod 218 from its position of FIG. 61 to that shown in FIG. 60 through the agency of the link 322, rocker arm 323, and link 325. This also will return the plungers of the subtract solenoids 326 and the lever 327 to their positions of FIG. 54 through the agency of the link 333, rocker arm 331, and roll 329. If the subtract control key 335 moves the switch lever 341 to its position of FIG. 53, the switch 343 is closed, which results in energization of the subtract solenoids 326. This causes the plungers of those solenoids to rock the lever 327 from its position of FIGS. 54 and 57 forwardly to its position of FIG. 59. Through the agency of the lever 331 and link 333 this moves the shifter rod 218 forwardly to set the machine for subtractive operation, as previously described.

In response to the final increment of the energized movement of either the add or subtract solenoids during a shifting operation, means are provided for releasing the switch lever 341 from its active position of either FIG. 52 or FIG. 53 for automatic return to its normal inactive position of FIG. 51. A slide 351 is mounted on the left side of the frame plate 87 adjacent the depending arms of the pawls 344, 345, as by means of suitable pin and slot connections 352. Intermediate its ends, this slide is provided with laterally extending pins 353, one forwardly of the rear pawl 344 and the other rearwardly of the front pawl 345. The slide 351 also is provided with a vertical slot that slidably receives a pin 354 which extends laterally of the machine through a suitable aperture in the frame plate 87 from the rocker arm 331 to which it is secured. As previously noted, this rocker arm 331 is moved between its positions of FIGS. 54 and 59 during setting of the machine for either addition or subtraction. In such movement, the pin 354 carries the slide 351 with it. When the machine is being set for addition and the parts are in their positions of FIG. 52, this sliding movement of the member 351 is rearward or to the left in that figure, so that that final increment of that movement results in the rear pin 353 striking against the depending arm of the rear pawl 344 and rotating the pawl about its pivot 346 out of locking engagement with the shelf 349. This permits the upper spring contact of the add solenoid switch 342 to move the lever 341 sufficiently to insure the shelf 349 being cleared from latching engagement by the pawls 344, 345; and the spring 348 will assist such action and maintain the switch lever 341 in its released normal position of FIG. 51. Likewise, when the add-subtract mechanism is being shifted to render the machine operable for negative calculations, the resulting movement of slide 351 by the pin 354 will be toward the front of the machine. The final increment thereof will cause the forward pin 353 to strike against the depending arm of the front pawl 345 to move the same from its locking position of FIG. 53 to release the switch lever 341 for similar automatic return to its normal position of FIG. 51.

*Multi-denominational zeroizing*

As will best be seen from FIG. 51, depression of the zeroizing key 336 in the control columnar unit 318 functions in the following manner to set the machine for subtraction. The lower end of the stem of the zero key 336 strikes against a suitable pad on a lever 355 as the key is depressed. The forward end of this lever 355 is pivoted to the frame plate 87 at 356, and its rearward end overlies a lateral shelf on the forward arm of the switch lever 341 that also cooperates with the plunger of the subtract solenoid switch 343. Consequently, the switch lever 341 is rocked to its active position of FIG. 53 in response to depression of the zeroizing key 336.

In addition to this subtraction-setting function, depression of the zeroizing key 336 also unlocks and renders operative all of the zeroizing repeat levers 295. As shown in FIG. 51, the stem of the zeroizing key 336 is provided with a rearward extension 357 having a downturned end which cooperates with a laterally extending shelf at the upper end of a two-armed lever 358 that is pivotally mounted on the right-hand side of the frame plate 87 at 359, as best seen in FIG. 57. This shelf on the upper end of the upper arm of the lever 358 extends through a suitable aperture 361 in the frame plate 87 for cooperation with the down-turned end of the extension 357 of the stem of the zeroizing key 336. The other arm of the lever 358 extends rearwardly of the machine and is provided adjacent its end with a laterally extending pin 362 which overlies an anvil lever or member 363 that is pivotally mounted at its forward end at 364 on the lower end of a latch lever 365 which, in turn, is pivotally mounted intermediate its ends at 359 with the lever 358. The member 363 has a latching nose 366 formed on its upper surface adjacent its pivot 364 which cooperates with a protuberance 367 (FIG. 59) formed on the rear edge of a two-arm latch lever 368. This lever 368 is pivotally mounted intermediate its ends at 369 on the lever 358, and its upper, rearwardly extending arm is interconnected with the member 363 by a coil spring 370. The depending arm of the latch lever 368 is maintained by the spring 370 in engagement with a stationary pin 371. The upper end of the latch lever 365 is resiliently urged forwardly by a coil spring 372 and is cut away to provide a shelf portion 373 which normally engages the undersurface of a finger 304a extending rearwardly from the transordinal zeroizing control shaft 303. As shown in FIGS. 57 and 58, this finger 304a also cooperates with the zeroizing repeat lever 295 in the same manner as is previously explained herein with respect to the pins 304 in the several columnar units. FIG. 58 also illustrates the preferred arrangement for rigidly securing to the right-hand end of the transordinal zeroizing control shaft 303 a lever 374. The lower end of the lever 374 is pivotally connected to the forward end of a link 375 which, as shown in FIG. 54, is pivotally connected at its rear end to the plunger of a zeroizing solenoid 376 mounted in any suitable manner on the outer or right-hand face of the frame plate 87 of the control unit 318.

Also mounted on this side of the control unit frame plate on the pivot pin 266 of the associated carry timing latch release link 264 is the rear end of a lever 377. This lever 377 carries a striker 378 at its forward end, the striker being pivotally mounted intermediate its ends on the lever 377 and having a spring 379 connected between its upper end and the stud anchoring the latch spring 261. The lower end of the striker 378 overlies the rear arm of the associated carry switch actuator 242. Consequently, depression of the zeroizing control key 336 from its position of FIG. 54 will cause a lateral extension 381 on the stem thereof to move the striker 378 downwardly to its position of FIG. 55 which depresses the rear end of the actuator 242 to close the associated carry switch 245. This arrangement is such that holding down of the zeroizing key 336 will not interfere with the resulting zeroizing operation. As the plunger of the ten's carrying solenoid 274 is retracted due to closing of the switch 245, the lever 377 is carried rearwardly by its pivot pin 266 to the position shown in FIG. 56, wherein the striker 378 has been moved from under the extension 381 of the stem of the zero key. Even though the key 336 thereafter is retained in its full line position of FIG. 56, the forward return of the solenoid plunger and the lever 377 by the spring 275 and with the assistance of the spring 379 merely will result in clockwise pivoting of the striker 378 against the action of its spring 379 when it encounters the extension 381 of the stem of key 336. Thus, automatic termination of the zeroizing operation will be assured even though the operator manually maintains the zeroizing control key 336 depressed after the zeroizing has been accomplished.

As previously mentioned, the gear 234a of this control column differs from the ten's carrying gears 234 in the other columns in that it has fifteen teeth. As best seen in FIGS. 53 and 63, this gear assembly, in addition to the usual zero stop arm 235, also is provided with a snail cam 382 secured thereto in any suitable manner. The cam 382 cooperates with a laterally extending pin 383 (FIGS. 51 and 53), mounted on, and projecting inwardly from, a slide bar 384 slotted adjacent its front end for sliding engagement on the hub portion of the carry gear 234a and similarly slotted adjacent its rear end for sliding engagement with a headed stud 385. Intermediate its ends, the slide bar 384 is provided with a depending finger 386 adapted to cooperate with the plunger of a zeroizing solenoid switch 387 and the rearwardly extending arm of a latch lever 388. Another depending finger 389 on the bar 384 is connected to a spring 391 for urging the slide bar 384 forwardly. The latch lever 388 is pivotally mounted intermediate its ends on a stud 392 extending laterally from the frame plate 87, and its upper end is adapted to cooperate with a pin extending laterally from the upper end of a latch release lever 393. This lever 393 is pivotally mounted in any suitable manner at 394 at its lower end, and is pivotally interconnected intermediate its ends with the upper arm of the switch lever 341 by a link 395. The latch release lever 393 also is provided with an aperture adapted to cooperate with a pin 396 extending laterally through a suitable aperture in the frame plate 87 from the zeroizing solenoid link 375 (FIG. 54).

It will be appreciated from the above that the overflow columnar unit 319 and the control columnar unit 318 will be assembled at the left and right end, respectively, of the selected number of ordinary columnar units 82, as best illustrated in FIG. 2. In this connection it will be noted that the only operating parts which extend uninterruptedly completely across the resulting assemblage of columnar units are transcolumnar shifter rod 218 and the transordinal zeroizing control shaft 303. Mounting of the shifter rod 218 presents no difficulties, particularly because the apertures 217 in the several main shifter pieces 211 are considerably greater in diameter than the rod 218 which is slidable therethrough during assembly and suitably connected at its left end to the add solenoid 325 (FIG. 60) and at its right end to the substract solenoid link 333 (FIG. 54). As has been described hereinbefore, the pins 304 and finger 304a are permanently secured to the shaft 303. It is for this reason that the frame plates 87 of all of the columnar units have each been provided with the keyhole-shaped aperture 302 which enables insertion of the shaft 303 therethrough following assembling of the several columnar units. When so disposed in its proper position, the shaft 303 is rotated to its normal position of FIGS. 54 and 57, and the right-hand end thereof is secured to the lever 374 in the manner shown in FIG. 58.

The *operation of the zeroizing mechanism* in response to depression of the zeroizing control key 336 is as follows. The resulting depression of the lever 355 (FIG. 51) closes the switch 343 to actuate the subtract solenoids 326 and set the machine for subtraction, as previously described. The final increment of downward movement of the depressed key 336 closes the carry switch 245 in the control unit 318 through the agency of the striker 378 on the lever 377, as illustrated in FIGS. 54 and 55. Referring particularly to FIGS. 57–59, the downward movement of the zeroizing control key 336, through its extension 357, also will swing the two-armed lever 358 from its full line position to its broken line position of FIG. 57. This causes the pin 362 to swing the member 363 downwardly about its pivot 364 and against the action of spring 370 from the full line position to the broken line position shown in FIG. 57. Such movement of member 363 carries its rearward end downwardly into the path of movement of the lever 327. Consequently, energization of the subtract solenoids 326 results in movement of these parts from their broken line positions of FIG. 57. This causes the pin 362 to swing the member 363 downwardly about its pivot 364 and against the action of spring 370 from the full line position to the broken line position shown in FIG. 57. Such movement of member 363 carries its rearward end downwardly into the path of movement of the lever 327. Consequently energization of the subtract solenoids 326 results in movement of these parts from their broken line positions of FIG. 57 to those illustrated in FIG. 59. This includes swinging of the latch lever 365 about its pivot 359 in a clockwise direction, as seen from the right side of the machine, which is insured because relative movement at that time between the member 363 and the latch lever 365 on which it is pivotally mounted at 364 is prevented by virtue of a laterally extending shelf 397 on the lower end of the latch lever 365. This shelf 397 is so disposed with relation to the pivot 364 and the lower edge of the member 363 that it permits the above-described downward movement of the member 363 from its full line position to its broken line position of FIG. 57. In the latter position, the lower edge of member 363 rests against the upper surface of the shelf 397, so that subsequent application of force downwardly and forwardly against the rear end of the member 363 is compelled to rotate the latch lever 365 about its pivot 359. As will be apparent from the showing of FIG. 57, a "flick" operation of the zeroizing key 336 also will result in the above-described release movement being imparted to the latch lever 365 because of the cooperation between the latch elements 366 and 367 to retain the member 363 in its initially depressed, active position, shown therein in broken lines. It also will be appreciated that operation of the subtract solenoids 326 in response to depression of the subtraction control key 335 will have no effect upon this zeroizing mechanism, since the member 363 at such time will be in its raised, inoperative position, as shown in full lines in FIG. 57. And it will be understood that the timing of the operation of the several parts actuated in response to depression of the zeroizing control key 336 results in the member 363 being depressed to its operative, broken line position of FIG. 57 before the subtract solenoids 326 are energized, and the accomplishment of the latter before the carry solenoid switch 245 is closed.

The above-described movement of the latch lever 365 to its release position of FIG. 59 removes the shelf 373 thereon from engagement with the finger 304a. This permits clockwise movement of the zeroizing control shaft 303 by the combined action of the several springs 301 and through the agency of the zeroizing repeat levers 295 camming the associated pins 304 downwardly to the position of the finger 304a shown in FIG. 59. This also moves the link 375 and the plunger of the zeroizing solenoid 376 forwardly from their normal position of FIG. 54. The clockwise movement of the zeroizing repeat levers 295 (as seen from the right side of the machine) results in the numeral wheel 86 in each standard columnar unit 82 and the overflow unit 319 being successively incrementally actuated negatively and returned to zero position in the manner hereinbefore described. At the same time, similar zeroizing action takes place in the control unit 318, although no numeral wheel is contained in the latter. Nevertheless, by virtue of repeated operations of the carry solenoid 274 in that control unit, the associated carry striker 268 imparts repeated negative incremental rotations to the gear 188 (FIG. 53), which are transmitted to the fifteen tooth carry gear 234a by the main gear 182. This results in clockwise rotation of the snail cam 382 from its normal position of FIG. 53 which moves the slide bar 384 rearwardly until, as the high point of the cam contacts the pin 383, the finger 386 closes the zeroizing solenoid switch 387 and is latched in that rearmost position by the latch lever 388. After a complete rotation thus is imparted to the snail cam 382, the repeating operations of the zeroizing solenoid 274 in the control unit 318 are terminated, in the manner hereinbefore described with respect to the regular columnar units, by contact of the zero stop lever 235 with the lateral extension 296 of the repeat lever 295. In the meantime, the zeroizing of each of the numeral wheels will have been effected, and it is in order to insure completion of such action before energization of the zeroizing solenoid 376, that the gear 234a is given fifteen teeth, as compared to the ten teeth of the standard transfer gears 234.

The zeroizing of the accumulator thus has been accomplished, but it is necessary that the several parts actuated in such operation automatically be returned to their normal positions. This is the function of the zeroizing solenoid 376. When so energized, it retracts the link 375 from the position shown in FIG. 59 to its normal position of FIG. 54. The several pins 304 on the shaft 303 thereby swing their associated zeroizing repeat levers 295 upwardly against the action of their springs 301 to normal inoperative position. At the same time, the finger 304a similarly returns the lever 295 in the control unit 318 to inoperative position, and moves the upper end of the latch lever 365 rearwardly against the action of its spring 372. As the shaft 303 reaches its normal position of FIGS. 54 and 57, this spring 372 swings the upper end of the latch lever 365 forwardly into its operative position to retain the shaft 303 in such inactive position. At the same time, the pin 396 on the link 375 will be returned in a rearward direction to its normal position of FIG. 54. This results in a rearward swing of the latch release lever 393 about its pivot 394 from the position of FIG. 51, which, through the agency of the link 395, rocks the switch lever 341 to the position shown in FIG. 52 to close the add solenoid switch 342 to effect re-setting of the machine for addition. Such counterclockwise movement of the latch release lever 393 (as viewed from the left side of the machine) effects similar movement of the latch 388 about its pivot 392 to depress the lower end thereof from latching engagement with the finger 386. This permits spring 391 to return the slide bar 384 to its normal forward position of FIG. 51, which opens the zeroizing solenoid switch 387. Of course, during the final portion of the rearward rocking of lever 331 as the same is returned to its normal position of FIG. 54 in response to movement of the shifter mechanism from the position of FIG. 61 to that of FIG. 60 by the add solenoid 321, the pin 354 (moving to the left in FIG. 52) will actuate slide 351 to release switch lever 341 for return to its normal position of FIG. 51 and de-energization of add solenoid 321. The machine thus is re-set automatically for addition as a final step in a zeroizing operation.

*Casing and columnar unit mounting means*

The bottom of the machine casing 81, as best seen in FIGS. 65 and 66, comprises a base plate 398 adapted to be supported on any suitable horizontal surface at a predetermined angle relative thereto by the usual rubber or other resilient pads 399 at its front end and higher rubber feet 401 at its rear end. As shown in FIG. 65 each of these rear feet 401 is wider longitudinally of the machine at the top than at the bottom, or flares upwardly toward the front and rear, for retention in a similarly shaped recess extending through a foot-mounting member 402. These members 402 may be made of a suitable plastic, preferably flexible, and are secured to the base plate 398 by screws 403, or the like. Riveted, or otherwise suitably secured, to the base plate 398 are front and rear columnar unit supporting and aligning channels or positioning means 404 and 405 which extend parallel to each other transversely of the machine. The rear channel 405 has upstanding front and rear flanges or ribs 406 which are provided in their upper edges with slots 407 (FIG. 66) spaced transversely from each other and laterally dimensioned to frictionally receive and properly position the lower edges of the several columnar frame plates 87. Each of the frame plates 87, of the standard and control columnar units 82, 318, and 319, has a pair of notches 408 (FIGS. 3 and 65) in its lower edge between the center and the rear end thereof which are spaced from each other at their longitudinal center lines the distance between the tranversely extending center lines of the ribs 406, and the length of each of which is greater than the thickness of the ribs 406. The front channel 404 has a similar rear flange or rib 406 with slots 407, and each frame plate 87 another notch 408 in its lower edge longitudinally disposed to cooperate therewith. The front channel 404 also has a flange or rib 409 upstanding along its front edge which is provided with slots 407, as in the ribs 405 (FIG. 65), but this rib 409 is machined to a more accurate and lesser thickness than the ribs 406 (FIG. 65). Each plate 87 has a notch 411 in its lower edge which is spaced forwardly from the longitudinal center of the front notch 408 the same distance as is the rib 409 from the transverse center of rib 406 on channel 404. The notch 411 is of just sufficient length to slidably receive the rib 409. The notches 408 are employed to avoid accidental injury to those portions of the lower edge of the frame plate 87 which are employed with the members 404 and 405 to properly position the plate laterally and vertically. In addition to assisting in such function, the rib 409, its slots 407, and the notches 411 in the plate 87 also properly position the latter longitudinally of the machine.

After the several columnar units have been assembled on the channels 404 and 405 in their positions of FIGS. 62–66, the following means are employed to retain the same therein. Each frame plate 87 is provided near its lower edge with a suitable aperture, preferably adjacent the intermediate notch 408, to slidably receive a holddown rod 412 (FIGS. 65 and 66) which extends therethrough transversely of the machine. The rod 412 preferably is peripherally grooved adjacent its ends to cooperate with eyebolts 413 to prevent longitudinal movement of the rod after the eyebolts are drawn down. Downward force is applied to the eyebolts 413 by means of suitable screw-headed nuts 414 extending upwardly through properly located apertures in the base plate 398. Each frame plate 87 also may be provided with an aperture near its rear end to receive a transversely extending rod 415 for retaining a notched tubular conduit and plate spacer 416 in assembled and plate-aligning position. As best seen in FIG. 70, each notch 417 in the tube 416 extends half way through the same so that the ends of the notch are held against the rear edge of the frame plate 87 by the retaining rod 415. This leaves the rear half of the tube free to receive electrical wires which it is desired to carry across the machine, as from the add solenoid switch 342 in the right-hand control column of unit 318 to the add solenoid 321 in the left-hand overflow column or unit 319. As shown in FIG. 66, the same width and spacing is employed for the notches 417 as is used for the slots 407 in the guide and supporting members 404 and 405.

To further assure proper alignment or qualification of the several columnar units relative to each other and prevent shifting or relative movement of their upper portions, a rear column plate 418 and a front numeral wheel sight plate 419 are provided as aligning means for cooperation with the upper edges of the several columnar frame plates 87 (FIGS. 1, 65 and 66). As shown in the latter two figures, the rear plate 418 is provided with a depending rail 421 extending transversely across the machine and having grooves 422 in its undersurface which slidingly engage the upper edges of the frame plates 87, with the rail disposed in notches 423 in the upper edge of the frame plates near their rear ends. The rear portion of the front numeral wheel sight plate 419 is provided with a similar rail 424 cooperating with notches 425 in the upper edges of the frame plates 87. This plate 419 also is provided with sight apertures 426 that are aligned with the respective numeral wheels 86, together with decimal point indicators 427 mounted thereon intermediate the sight apertures 426. The plates 418 and 419 fill similarly shaped cut-out portions in the top wall of the casing 81 to the rear and forwardly, respectively, of the digit keys 83. It will be noted that the upper key stem guide 94 and key stop plate 101 (FIGS. 15 and 17) in the several denominational orders function to close the otherwise open portion of the top wall of the casing 81 through which the digit keys protrude. This casing 81 preferably is formed from a suitable plastic of desired color and texture and vacuum-molded to reduce machining and eliminate finishing steps in its manufacture. When mounted in the manner now to be described on the base plate 398, the rear and front marginal portions of the opening in its top walls overlie the plates 418 and 419, respectively, to retain the same in guiding and positioning engagement with the several frame plates 87.

As best seen in FIG. 66, a right-angled rail 428 extends along each side of the casing 81 adjacent its lower edge. The vertical flange of this rail 428 is riveted, or otherwise suitably secured, to the side wall of the casing at 429 to position the horizontal flange of the rail somewhat above the lower edge of the casing. Spaced at suitable intervals along the length of the rail 428 are transversely extending grooves 431 (FIGS. 67 and 68) in the bottom surface of the horizontal flange of the rail. Each of these grooves receives and retains the lower leg of a U-shaped clip 432, with the upper leg thereof engaging the upper surface of the horizontal flange of the rail. This upper leg of the clip 432 is perforated and struck upwardly to form a "speed nut" 433, and the rail 428 is provided with a vertical aperture 434 in its horizontal flange centered in each of the grooves 431, and the lower legs of the clips 432 with similar apertures, to give access to the associated speed nut 433 from the bottom of the machine. Correspondingly located apertures are provided in the base plate 498, so that casing-retaining screws 435 may be threadedly engaged with the speed nuts 433. A trim or gasket strip 436, shaped as shown best in FIGS. 65 and 66, is pressed upwardly upon the lower edges of the casing 81, which hides the rivets 429. This trim strip 436 is provided with an inwardly extending, horizontal flange 437 which is interposed between the base plate 398 and the rail 428 as a gasket, being provided with suitable apertures to receive the several screws 435. It will be understood that this casing construction permits a wide selection in color and finish and is so inexpensive, compared to a metal case, as to enable the manufacturer to maintain casings of a great number of different widths on hand to accommodate assemblages of a wide range of columnar units.

In the event of repair of a machine being required, it will be necessary only for the repairman to remove the particular columnar unit or units in which the malfunction requiring repair is located and substitute other properly functioning units therefor. This obviously will materially reduce the time and cost necessary to effect repairs, even in the field or at the factory. For example, if one of the columnar units 82 develops a malfunction, it is only necessary for the repairman first to remove the casing 81, which can be done simply by removing the screws 435, remove the screw-headed nuts 414 to permit lifting of the several units 82, 318, and 319 as a complete assemblage from the base plate 398 and its channels 404, 405, and slide the hold-down rod 412 laterally to free the malfunctioning unit 82. If the latter is closer to the right-hand end of the machine than to the left-hand end, it will be best to so partially remove the rod 412 to the left of the machine. In any event, it would facilitate matters to effect such movement of the rod 412 by pushing the same longitudinally with a similar rod until the regular rod 412 has been displaced beyond the malfunctioning unit 82. Retraction of the pushing rod beyond that particular columnar unit 82 then will permit ready removal of the latter from the machine and substitution of a properly functioning unit therefor. This also may entail removal of the notched tubular plate spacer 416 and its retaining rod 415 to enable lateral separation from the unit to be replaced of the columnar units or groups thereof on either side of that unit. It will be understood, of course, that lateral separation of the columnar units in the two groups to the left and right, respectively, of the unit to be replaced will be required in sufficient degree to permit removal of the slotted extension 307 of the jack plugs 306 in the malfunctioning unit from the bores of the jack plugs in the next higher denominational order. Such lateral separation of the two groups of units at either side of the affected order will be more than sufficient to enable simultaneous separation of adjacent pivot stud 125 or 238. As soon as a properly functioning substitute columnar unit has been assembled in place of the one removed, it is a relatively simple matter to remount the tubular spacer 416 and its retaining rod 415, return the hold-down rod 412 to normal position by longitudinal movement thereof, and replace the assembled columnar units on the base plate 398. Re-engagement of the screw-headed nuts 414 with the eye bolts 413, replacement of the casing 81 and insertion of the screws 435 will complete the re-assembly of the machine. It will be appreciated that the guide plates 418 and 419 will be required to be lifted from the columnar units after removal of the casing and replaced thereon before assembly of the casing in the manner described. The repairman can do a much better and quicker job of repairing the removed columnar unit on his own premises than at the site of use of the machine, or, if desired, shipment of the malfunctioning unit back to the factory will be a relatively simple matter. And, as will be readily appreciated, the embodiment of this invention herein disclosed lends itself to a greater degree than prior machines to manufacture in subassemblies for easy assembly into the completely separate and interchangeable columnar units. The fact that any desired number of such columnar units readily may be assembled together to provide a desk-type calculating machine of selected denominational capacity also greatly facilitates stock-piling and production control, as compared with the prior practice of estimating the required numbers of machines of 10, 12, or other numbers of denominational orders.

Referring particularly to FIG. 71, it will be seen how the add solenoid switch 342 in the right-hand control column or unit 318 is connected to the add solenoid 321 in the left-hand overflow column or unit 319 by an electrical conduit 438 which is carried across the machine in the connector tube 416. A similar conduit 439 likewise may be employed to electrically interconnect the subtract switch 343 in the control unit 318 and a subtract solenoid 326 in the overflow column 319, if it is desired to use a subtract solenoid in each of those units. Such arrangement is illustrated diagrammatically in FIG. 71, instead of the two subtract solenoids 326 in the control unit or column 318 as previously described. This wiring diagram also differs from the earlier described embodiment in showing an alternative arrangement of an add solenoid 321 in the control unit 318 as well as in the overflow unit 319. Such variations, of course, will be understood as being well within the scope of the invention herein described.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. An electrically powered multi-order mechanical calculating machine, comprising an accumulator having a numeral wheel in each order, and actuating mechanism for said accumulator, comprising discrete, reciprocally operable members for each order and means exclusive to each order and mechanically disconnected from all other orders, for imparting actuations to said members.

2. In an electrically powered, mechanical calculating machine, a plurality of discrete columnar units each comprising a register element, means for digitally actuating the same including discrete electrically energizable means, a plurality of digit keys for controlling said actuating means, each said electrically energizable means comprising two separate electrically operated sources of mechanical energy, and a second actuating means in each columnar unit for actuating the associated said register element incrementally in amounts of a single unit of value.

3. A calculating machine according to claim 2, wherein each said second actuating means comprises a solenoid.

4. In a calculating machine, a columnar unit physically separable as an entity from the machine, comprising a register element, electrically energizable means for actuating said register element, a plurality of digit keys, means operable by said keys for controlling digital actuation of said register element by said actuating means, means operable to impart repeating single actuations of unit value to said register element, and means operable coincidentally with said register element to terminate operation of said last recited means when said register element registers "zero."

5. In a calculating machine, a columnar unit physically separable as an entity from the machine, comprising a register element, electrically energizable means for actuating said register element, a plurality of digit keys, means operable by said keys for controlling digital operation of said actuating means, drive transmitting means interposed between said actuating means and said register element selectively settable to predetermine positive or negative actuation of said register element by said actuating means, means operable to impart repeating single actuations of unit value to said register element and conditioned in response to setting of said drive transmitting means to predetermine negative actuation of said register element to result in successive substractions therefrom of unit value each, and means controlled by said register element to prevent operation of said last recited means when said register element is in zero position.

6. A digital columnar unit for a manually controlled, key-responsive calculating machine, comprising a frame plate, a numeral wheel rotatably mounted on said frame plate, a reciprocal actuator operable in an idle movement in one direction and to actuate said numeral wheel when moved in the opposite direction, a pair of solenoids serially operable to reciprocate said actuator, and digital control means for selectively determining the ordinal extent of reciprocal movement of said actuator, comprising a series of normally inoperative ordinal stops pivotally mounted on said frame plate, and a series of digit keys slidably mounted on said frame plate and selectively operable, respectively, to render said ordinal stops operative.

7. A discrete columnar assembly for a manually controlled calculating machine, comprising an ordinal frame plate supporting a numeral wheel, reciprocable actuating mechanism for rotating said numeral wheel in selected ordinal amounts, drive transmitting gear means interposed between said actuating mechanism and said numeral wheel, including selectively settable means for shifting said gear means for predetermining the resulting direction of rotation of said numeral wheel, and ten's transfer mechanism for imparting unitary incremental rotations to said numeral wheel, including means positionable by said selectively settable means to determine the direction of said unitary incremental rotations.

8. A unit according to claim 7 wherein said last-recited means positionable by said selectively settable means comprises a reciprocal member, and said ten's transfer mechanism includes a solenoid for reciprocating said member.

9. A calculating machine, comprising a multidenominational accumulator having a register element in each order, a uni-directional actuator in each denominational order operable to effect actuation of the denominationally associated register element only during a movement in one direction, drive means peculiar to each order and each interposed between a said actuator and the denominationally associated register element and including a drive transmitting member in that order shiftable between two operable positions, selectively settable control means for moving all of said members to one or the other of such positions to set the machine for direct positive or negative actuation of said register elements by said actuators, and latching means in each denominational order for locking said members in one or the other of such positions and releasable by said selectively settable control means.

10. In a calculating machine having a multidenominational accumulator and actuators therefor, gearing in each denominational order between said actuators and said accumulator and including a shiftable gear, shifting means selectively settable to move all of said shiftable gears between add and subtract positions to set the accumulator for direct positive or negative actuation by said actuators, and latching means in each denominational order operable to lock the associated said shiftable gear in add or subtract position and movable to release position by said shifting means during operation thereof to enable movement of said shiftable gears between add and subtract positions.

11. In a calculating machine according to claim 10, ten's carrying means selectively settable by said shifting means to add or subtract positions to effect a direct transfer of "one" into or from any order of the accumulator in response to the registration in the next lower order passing from "nine" to "zero" or "zero" to "nine" and means in each denominational order operable, in response to actuation of said ten's carrying means to effect a transfer into or from that order, to move the associated said latching means to release position to unlock the shiftable gear in that order to permit such transfer to take place.

12. In a discrete columnar unit for a manually controlled calculating machine having an accumulator element, mechanism for ordinally actuating said element, comprising a reciprocal actuator, a first solenoid energizable to move said actuator in one direction, a second solenoid energizable in response to completion of operation and de-energization of said first solenoid for moving said actuator in the opposite direction, means operable automatically to de-energize said second solenoid upon return thereby of said actuator to normal position, and means operable in response to rebound of said actuator from normal position automatically to effect re-energization of said second solenoid.

13. A calculating machine, comprising a multi-denominational order accumulator having a register element in each order, actuating means for imparting digital actuations to said register elements, ten's carrying mechanism including a solenoid in each order for imparting a single unit of actuation to the denominationally associated register element, carry control means in each denominational order including a normally open switch connected to the denominationally associated said solenoid, including means operable coincidentally with each register element for closing the said switch in the next highest denominational order, and zeroizing means for clearing said accumulator including means for closing all of said switches and means in each denominational order operable by said carry control means for opening the said switch in the same order when the register element in that order registers zero.

14. A calculating machine, comprising a multi-denominational order accumulator having a register element in each order, actuating means for said accumulator including a digital actuator in each order movable from and to a home position to digitally actuate the denominationally associated register element, and duplex ten's carrying mechanism including an electrically energized carry actuator in each denominational order, control means in each order operable coincidentally with the denominationally associated register element to effect energization of the carry actuator in the next higher denominational order, and means operable to delay such energization of a carry actuator whenever the digital actuator in said higher denominational order is out of, and until the same is in, home position, said last recited delay means comprising a switch in the circuit of each carry actuator open whenever the denominationally associated digital actuator is out of home position and closed by that digital actuator when the same is in home poistion.

15. A calculating machine according to claim 14, wherein each said carry actuator comprises a solenoid, and said ten's carrying mechanism includes a normally open switch in the circuit of each said solenoid and a member in each order for effecting closing of said normally open switch in the next higher denominational order.

16. A calculating machine, comprising a multi-denominational order accumulator having a register element in each order, actuating means for imparting digital actuations to said register elements, selectively settable means for predetermining positive or negative operation of said accumulator by said actuating means, ten's carrying mechanism including a carry striker in each order for imparting single unit actuations to the denominationally associated register element, and means operable by said selectively settable means for predetermining positive or negative actuation of said register elements by said carry strikers.

17. In a calculating machine according to claim 16, means for zeroizing said accumulator including means for operating said settable means to predetermine negative operation of the machine and for initiating automatic repeated actuations of said carry strikers.

18. A calculating machine according to claim 17, wherein said zeroizing means includes cyclically operable means for re-setting the machine for positive actuation following clearing of the accumulator.

19. A calculating machine according to claim 17, wherein said zeroizing means includes means operable in each denominational order coincidentally with the associated register element to terminate actuation of the associated carry striker when that register element is returned to zero position.

20. A calculating machine, comprising a multi-denominational order accumulator having a numeral wheel in each order, actuating means for imparting digital actuation to said numeral wheels, selectively settable means for predetermining positive or negative operation of said accumulator by said actuating means; ten's carrying mechanism including a carry striker in each order for imparting single unit actuations to the denominationally associated numeral wheel, a solenoid for actuating each said carry striker, a switch for controlling each said solenoid, and carry control means in each denominational order operable coincidentally with the associated said numeral wheel for closing the said switch in the next highest denominational order; and means operable by said selectively settable means for predetermining positive or negative actuation of said numeral wheels by said carry strikers.

21. In a calculating machine according to claim 20, zeroizing means for clearing said accumulator, comprising manually operable means for initiating operation of said settable means to predetermine negative operation of the machine and for initiating automatic repeated actuations of said carry strikers, and means in each denominational order operable by the denominationally associated said carry control means for terminating actuation of the denominationally associated carry striker when the numeral wheel in that order registers zero.

22. In a calculating machine having an accumulator element, ten's carrying mechanism for imparting unitary incremental actuations to said element, comprising a reciprocal member operable in one direction to actuate said element through a unitary increment of movement in a given direction and to block all further movement thereof, means for reciprocating said member, means for selectively moving one end of said reciprocal member relative to said element in a direction substantially normal to that of the reciprcoal movements of said member to cause subsequent movement of said member in said one direction to actuate said element in a direction opposite said given direction, and a solenoid pivotally connected to one end of said member to reciprocate the same, said means for selectively moving said member relative to said element comprising guide means slidably cooperating with said member adjacent the other end thereof.

23. In a calculating machine having a register element, a gear connected to said register element, and means for imparting a single increment of rotation to said gear and for positively limiting rotation of said gear to such single increment, comprising a striker having opposed shoulders spaced from each other for a distance less than the diameter of said gear, means for moving said striker relative to said gear first to cause one of said shoulders to engage a trailing face of one tooth of the gear to rotate the same and then to cause the other said shoulder to engage the leading face of another tooth of said gear trailing said one tooth to limit rotation of the gear, means for normally maintaining said striker out of engagement with said gear, and selectively settable means for positioning said striker to cause subsequent operation of said striker moving means to first engage one or the other of said shoulders with said gear to impart positive or negative incremental rotation thereto.

24. In a calculating machine having a register element, a gear connected to said register element, and means for imparting a single increment of rotation to said gear and for positively limiting rotation of said gear to such single increment, comprising a striker having opposed shoulders spaced from each other for a distance less than the diameter of said gear, yieldable means constraining movement of said striker to translation, means pivotally connected to said striker for moving the same relative to said gear first to cause one of said shoulders to engage a trailing face of one tooth of the gear to rotate the same and then to cause the other said shoulder, in conjunction with pivotal movement of the striker by the gear against the action of said yieldable means, to be engaged with the leading face of another tooth of said gear trailing said one tooth to limit rotation of the gear, selectively settable means coacting with said yieldable means to initially position said striker to cause subsequent operation of said striker moving means to first engage one or the other of said shoulders with said gear to impart positive or negative incremental rotation thereto.

25. A calculating machine, comprising a multi-denominational order accumulator having a numeral wheel in each order; digital actuating mechanism for said accumulator; ten's carrying mechanism receiving its mechanical energy from a source other than said digital actuating mechanism and including a carry actuator in each order for imparting a single unit of actuation to the associated said numeral wheel, and carry control means operable with each numeral wheel to effect an operation of the said carry actuator in the next highest denominational order; and means for zeroizing said accumulator, including means for initiating repeated operations of said carry actuators to impart repeated unit actuations to said numeral wheels and said carry control means, and means operable by each said carry control means to prevent operation of the carry actuator in the same denominational order when the denominationally associated numeral wheel registers zero.

26. In a calculating machine, a discrete columnar unit, comprising an accumulator element, actuating mechanism for ordinally actuating said accumulator element, reversible drive transmitting means interposed between said actuating mechanism and said accumulator element to effect either positive or negative actuation of the latter, ten's carrying mechanism including a reciprocal member positionable to effect positive or negative unitary actuations of said accumulator element, and zeroizing mechanism, comprising means for positioning said reciprocal member for negative actuation, and means for causing automatic repeated actuations of said reciprocal member until said accumulator element is returned thereby to "zero" position.

27. A calculating machine, comprising a multidenominational order accumulator having a register element in each order, control means for setting said machine for positive or negative operation, actuating mechanism for said accumulator including means in each denominational order settable by said control means to positive or negative position, and zeroizing mechanism including zeroizing means in each order for imparting an actuation of unit value to the denominationally associated said register element, selectively operable manual means for conditioning said zeroizing means to effect repeated negative actuations of said register elements of unit value each and for effecting movement of said settable means to negative position, zeroizing control means in each order operable coincidentally with the denominationally associated register element to prevent actuation of said zeroizing means when that register element is in zero position, and cyclically operable means initiated for operation by said manual means and operable after a predetermined time interval automatically to reposition said settable means to positive position.

28. A calculating machine, comprising an accumulator, actuating mechanism for digitally actuating said accumulator including settable means for predetermining positive or negative actuation of the machine, and zeroizing mechanism for clearing said accumulator including selectively operable means for effecting positioning of said settable means to condition the machine for negative operation, and cyclically operable means initiated for operation by said selectively operable means and operable after a predetermined time interval automatically to position said settable means to condition the machine for positive actuation.

29. A calculating machine according to claim 28, wherein said settable means includes solenoid means, and said zeroizing mechanism includes control means operable by said cyclically operable means for energizing said solenoid means.

30. A calculating machine according to claim 28, wherein said cyclically operable means includes a solenoid and means for effecting a predetermined number of repeated energizations thereof.

31. In a calculating machine having a numeral wheel, zeroizing means, comprising a reciprocal member operable to rotate said numeral wheel negatively for an increment of unitary value, a solenoid energizable to reciprocate said member, automatic means for repetitively initiating energizations of said solenoid, control means operable by said numeral wheel for rendering said automatic means inoperative when said numeral wheel registers "zero," a normally open switch electrically interconnected with said solenoid and closeable by said automatic means, a normally inoperative latch automatically operable to hold said switch closed when the same is closed by said automatic means, means operable by said reciprocal member as it completes its movement in one direction to render said latch inoperative, said last recited means also being operable to return said automatic means to an inoperative condition, spring means connected to said reciprocal member for returning the same to a normal inoperative position to release said automatic means for operation when said latch is rendered inoperative and to release said switch for return to normal open condition, and a zero stop forming a part of said control means for blocking further operation of said automatic means when said numeral wheel registers "zero."

32. A calculating machine, comprising a readily variable number of individually complete ordinal columnar units each including a frame plate, and a register element, unitary actuating mechanism comprising denominationally separate electric motor means for said register element, digit control means for said actuating mechanism, and ten's carrying mechanism having a carry actuator for said register element and carry control means, all mounted on said frame plate; and mounting means for securing said columnar units in laterally stacked relationship with each said carry control means disposed to co-operate with the carry actuator in the next unit to the left thereof to provide a multi-denominational order calculating machine with said register elements and ten's carrying mechanism constituting an accumulator, said mounting means being so constructed and arranged as to facilitate separation and selective removal and replacement of any one or more of said columnar units.

33. A calculating machine according to claim 32, wherein said mounting means includes interengageable plug means for aligning adjacent columnar units and conducting current to said electric motor means.

34. A calculating machine according to claim 32, wherein each said actuating mechanism includes a reciprocable member and solenoid means for reciprocating said member.

35. A calculating machine according to claim 34, wherein each said carry actuator comprises a solenoid.

36. A calculating machine according to claim 35, wherein each said carry actuator includes a normally open switch connected to said solenoid, and each said carry control means comprises a member operable coincidentally with the denominationally associated said register element to close the switch in the next unit to the left thereof.

37. A multi-denominational order calculating machine, comprising a plurality of discrete columnar units; each said unit including a frame plate, and accumulator means, actuator means for said accumulator means, ordinal control means for determining the degree of actuation of said accumulator means by said actuator means, digit keys selectively depressible to operate said control means, reversibly operable drive transmitting means interposed between said accumulator and actuator means selectively positionable to cause said actuating means to impart positive or negative ordinal actuation to said accumulator means, ten's transfer means including a reciprocal member selectively positionable to impart positive or negative unitary actuations to said accumulator means, and selectively settable means for positioning said drive transmitting means and said reciprocal member for either positive or negative actuation, all operatively mounted on the associated said frame plate; mounting means for securing said columnar units in laterally stacked relationship, comprising a base having guide means for receiving and positioning said frame plates to prevent relative movement thereof longitudinally and laterally of the machine, and means for securing said frame plates on said base to prevent relative movement thereof vertically of the machine.

38. A calculating machine according to claim 37, in which means for mounting parts of each said actuating and ten's transfer means on said frame plates are respectively interengageable with the same means in denominationally adjacent orders to properly align the columnar units relative to each other.

39. A calculating machine, comprising a plurality of ordinal columnar units each including a frame plate, and accumulator means, unitary actuating mechanism for imparting uni-directional digital actuations to said accumulator means, digital control means for said actuating mechanism, and drive transmitting means interposed between said actuating mechanism and said accumulator means and including means shiftable between an add and a subtract position, all mounted on said frame plate, mounting means for securing said columnar units in laterally stacked relationship, and selectively settable means mounted transordinally of said columnar units for actuating said shiftable means to set the machine for positive or negative calculations.

40. In a calculating machine according to claim 39, a control columnar unit at the right side, and an overflow columnar unit at the left side, of the machine secured by said mounting means and each including means for moving said settable means, and manually operable means forming a part of said control columnar unit for controlling said last recited moving means.

41. In a calculating machine according to claim 40, zeroizing means including single unit actuating means for said accumulator means forming a part of each ordinal columnar unit, and selectively operable control means forming a part of said control columnar unit for initiating repeating operations of said single unit actuating means.

42. In a calculating machine according to claim 41, a base member having guide means secured thereto for receiving the several said columnar units to prevent shifting of the latter relative to said base member, and an outer casing enclosing said columnar units and secured to said base member.

43. A calculating machine according to claim 42, wherein said outer casing is provided with an aperture adapted to overlie said accumulator means and the latter includes numeral wheels, a front plate adapted to underlie said casing aperture and having sight apertures for said numeral wheels and means cooperating with each of said frame plates as part of said mounting means.

References Cited by the Examiner
UNITED STATES PATENTS

| | | | |
|---|---|---|---|
| 681,240 | 8/1901 | Meyer | 235—82 |
| 1,016,501 | 2/1912 | Horton | 235—82 |
| 1,262,702 | 4/1918 | Rinsche | 235—82 |
| 1,318,395 | 10/1919 | Malcher | 235—60.31 |
| 1,371,526 | 3/1921 | Teetor | 235—60.31 |
| 1,858,778 | 5/1932 | Horton | 45—68.1 |
| 1,930,870 | 10/1933 | Ball | 235—60.31 |
| 1,930,871 | 10/1933 | Ball | 235—60 |
| 2,471,150 | 5/1949 | Goodale | 235—133.5 |
| 2,480,744 | 8/1949 | Lake | 235—61.61 |
| 2,503,004 | 4/1950 | Sochaczewski | 235—133 |
| 2,522,671 | 9/1950 | Gourdon | 235—145 |
| 2,543,899 | 3/1951 | Dickinson | 235—145 |
| 2,568,616 | 9/1951 | Gourdon | 235—79 |
| 2,568,617 | 9/1951 | Gourdon | 235—79 |
| 2,598,342 | 5/1952 | Boyden | 45—68.1 |
| 2,623,695 | 12/1952 | Chi Liang Cho | 235—82 |
| 2,646,929 | 7/1953 | Gourdon | 235—137.1 |
| 2,651,462 | 9/1953 | Gourdon | 235—145 |
| 2,662,691 | 12/1953 | Webb | 235—82 |
| 2,745,601 | 5/1956 | Fowler | 235—60 |
| 2,756,932 | 7/1956 | Webb | 235—82 |
| 2,759,671 | 8/1956 | Turck | 235—82 |
| 2,833,472 | 5/1958 | Johnson | 235—61.61 |
| 2,920,816 | 1/1960 | Greenhow | 235—1.3 |
| 2,945,624 | 7/1960 | Nicolaus | 235—144 |
| 2,956,741 | 10/1960 | Webb | 235—62 X |
| 2,969,175 | 1/1961 | Bliss | 235—1.3 |
| 2,969,177 | 1/1961 | Gubelmann | 235—63.232 |
| 3,013,717 | 12/1961 | Mehan | 235—60 |
| 3,064,891 | 11/1962 | Nicolaus | 235—117 |

References Cited by the Applicant
UNITED STATES PATENTS

| | | |
|---|---|---|
| 1,252,826 | 1/1918 | Messiter. |
| 2,130,723 | 9/1938 | Kottman. |

LEO SMILOW, *Primary Examiner.*